(12) United States Patent
Qian et al.

(10) Patent No.: US 11,237,706 B2
(45) Date of Patent: Feb. 1, 2022

(54) INFORMATION PROCESSING METHOD AND TERMINAL

(71) Applicant: Huawei Technologies Co., Ltd., Shenzhen (CN)

(72) Inventors: Kai Qian, Beijing (CN); Liwei Huang, Beijing (CN); Whan Woong Kim Stransom, Shanghai (CN); Xin Wu, Shenzhen (CN); Dongliang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/050,364

(22) PCT Filed: Apr. 25, 2018

(86) PCT No.: PCT/CN2018/084525
§ 371 (c)(1),
(2) Date: Oct. 23, 2020

(87) PCT Pub. No.: WO2019/205038
PCT Pub. Date: Oct. 31, 2019

(65) Prior Publication Data
US 2021/0117058 A1 Apr. 22, 2021

(51) Int. Cl.
*G06F 3/0484* (2013.01)
*G06F 3/0483* (2013.01)
(Continued)

(52) U.S. Cl.
CPC .......... *G06F 3/0484* (2013.01); *G06F 3/0481* (2013.01); *G06F 3/0483* (2013.01);
(Continued)

(58) Field of Classification Search
None
See application file for complete search history.

(56) References Cited

U.S. PATENT DOCUMENTS 7,941,753 B2 * 5/2011 Meisels ................ G01C 21/343
715/751
8,712,810 B2 * 4/2014 Meisels ................ G06Q 10/109
705/5
(Continued)

FOREIGN PATENT DOCUMENTS

CN 101299851 A 11/2008
CN 104240067 A 12/2014
(Continued)

*Primary Examiner* — Jordany Nunez
(74) *Attorney, Agent, or Firm* — Leydig, Voit & Mayer, Ltd.

(57) ABSTRACT

A method includes: extracting first structured information from a first screen in response to a first operation performed by a user on the first screen, and generating a first prompt message based on the first structured information; extracting second structured information from a second screen in response to the first operation performed by the user on the second screen; and when the first time and the second time have an intersection, and the first address is different from the second address, automatically changing the first time in the first prompt message, so that a changed first time and the second time have no intersection.

10 Claims, 67 Drawing Sheets

(51) Int. Cl.
*G06F 3/0481* (2013.01)
*G06F 9/451* (2018.01)
*H04M 1/72403* (2021.01)
*G06Q 10/06* (2012.01)

(52) U.S. Cl.
CPC ...... *G06F 9/451* (2018.02); *G06Q 10/063114* (2013.01); *H04M 1/72403* (2021.01)

(56) References Cited

U.S. PATENT DOCUMENTS

| | | | |
|---|---|---|---|
| 9,460,406 B1* | 10/2016 | Hopper | G06Q 10/1093 |
| 11,004,041 B2* | 5/2021 | Stratvert | H04L 51/02 |
| 2008/0086455 A1* | 4/2008 | Meisels | G01C 21/26 |
| 2009/0276497 A1* | 11/2009 | Gupta | G06Q 10/109 |
| | | | 709/206 |
| 2011/0137690 A1* | 6/2011 | Louch | G06Q 30/0641 |
| | | | 705/5 |
| 2012/0233563 A1 | 9/2012 | Chakra et al. | |
| 2012/0295597 A1* | 11/2012 | Louch | G06Q 10/02 |
| | | | 455/414.1 |
| 2014/0229560 A1* | 8/2014 | Gray | G06Q 10/1095 |
| | | | 709/206 |
| 2018/0060826 A1* | 3/2018 | Stratvert | G06Q 10/1095 |

FOREIGN PATENT DOCUMENTS

| | | |
|---|---|---|
| CN | 104484116 A | 4/2015 |
| CN | 103678502 B | 2/2017 |

* cited by examiner

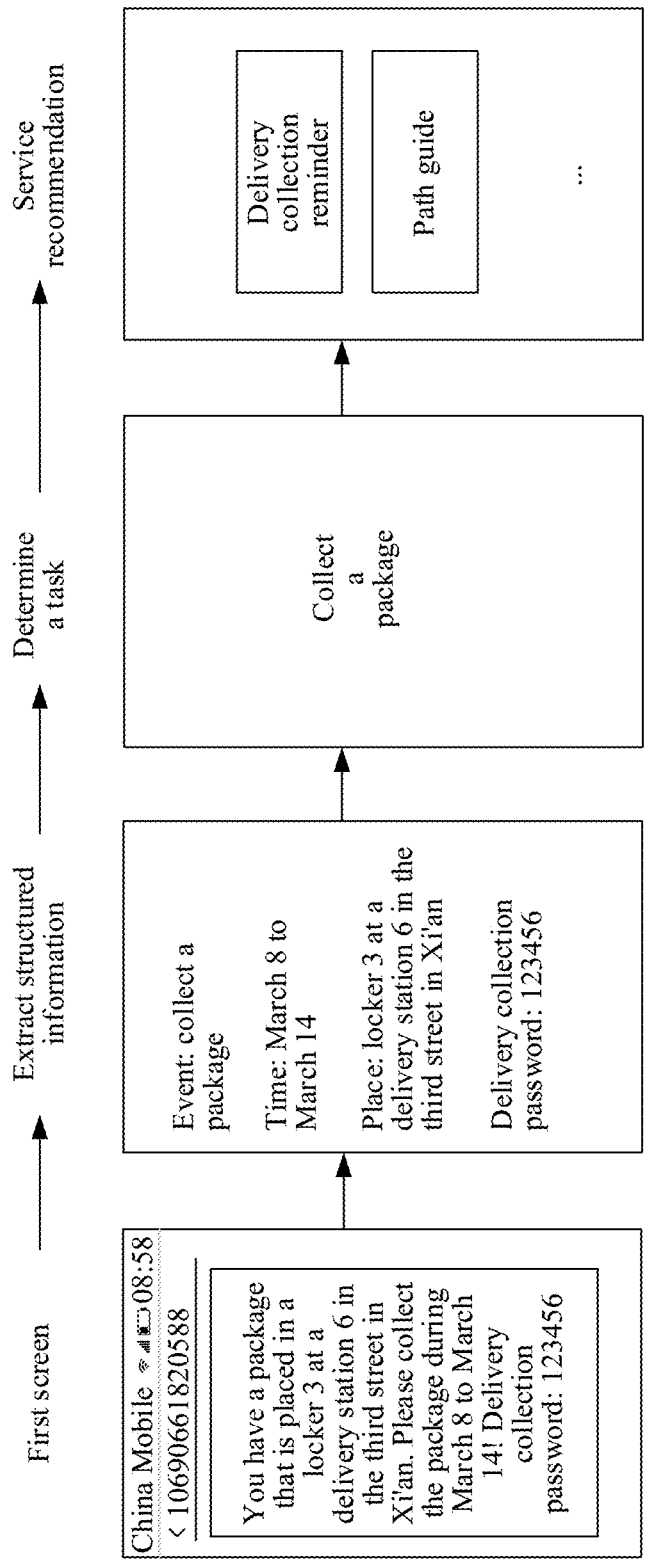

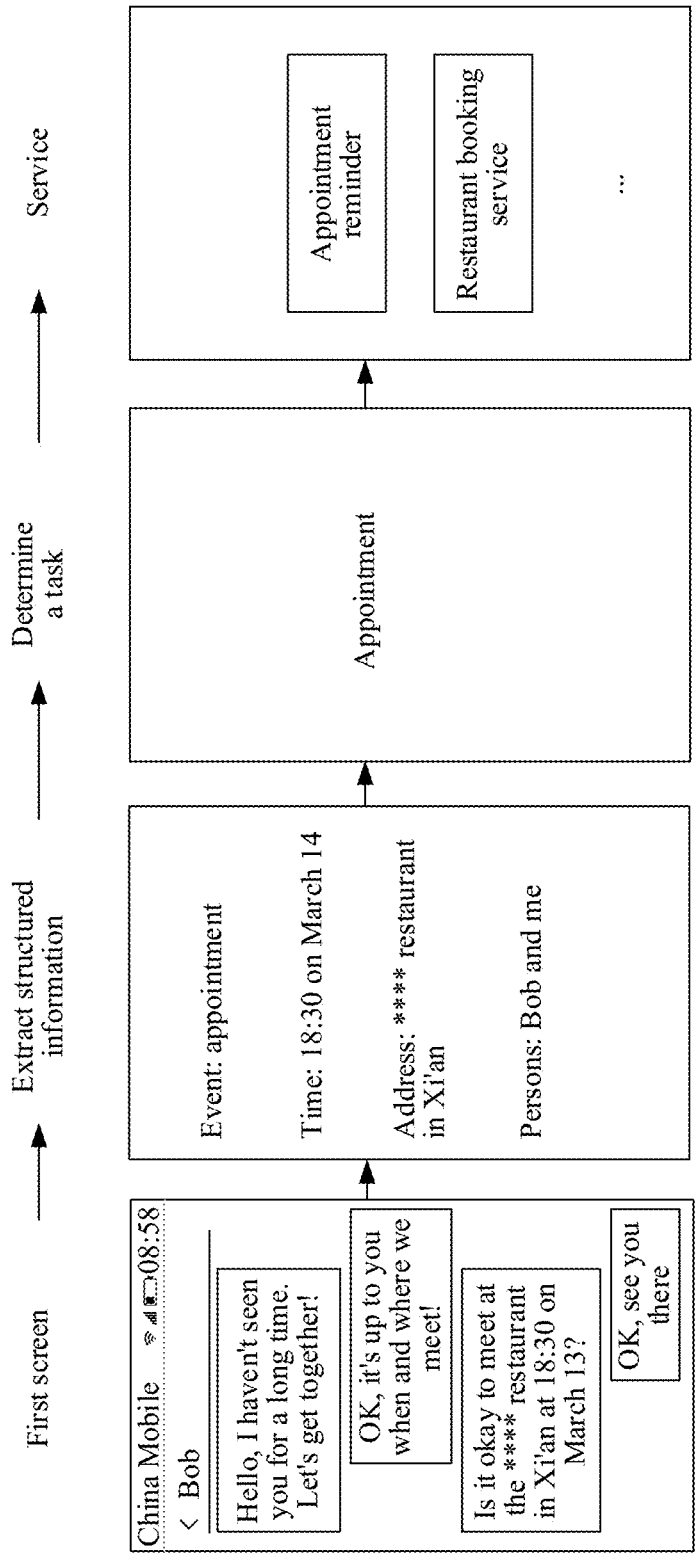

TO FIG. 8(c)

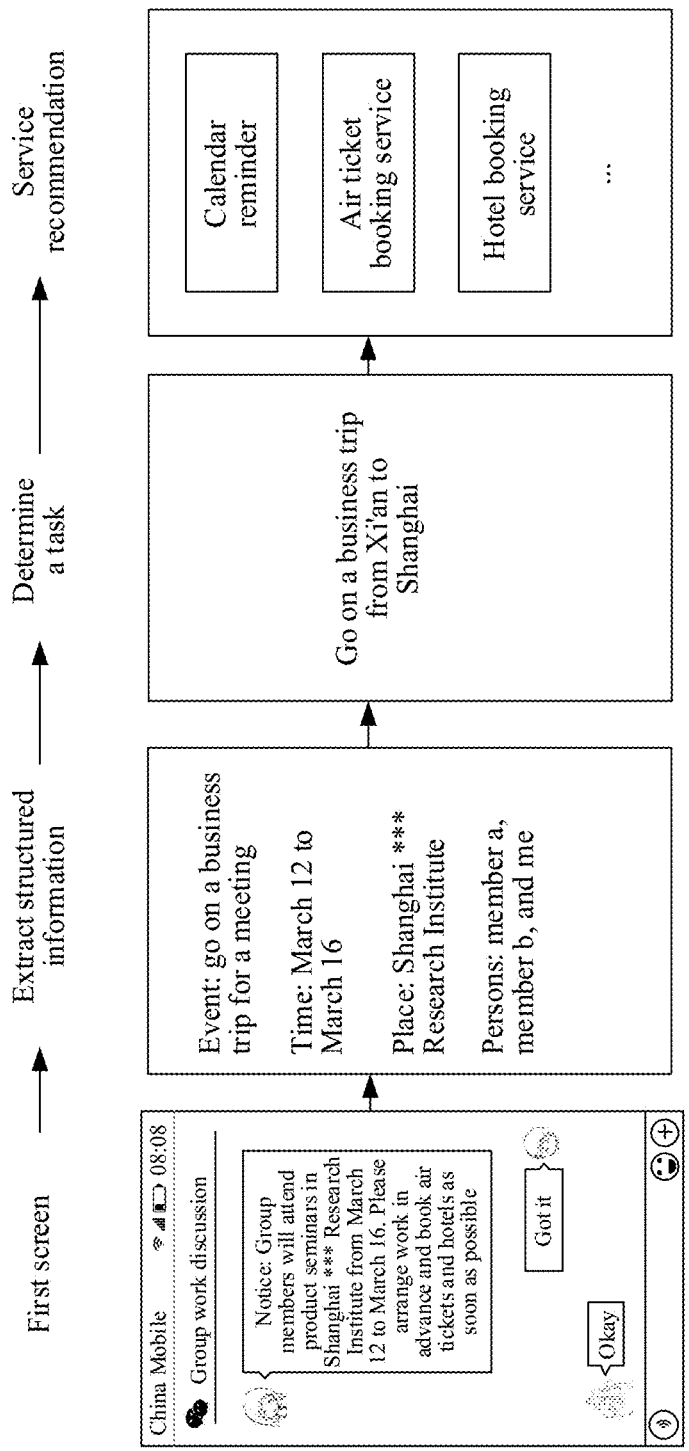

INFORMATION PROCESSING METHOD AND TERMINAL

CROSS-REFERENCE TO RELATED APPLICATIONS

This application is a national stage of International Patent Application No. PCT/CN2018/084525, filed on Apr. 25, 2018, which is hereby incorporated by reference in its entirety.

TECHNICAL FIELD

This application relates to the field of electronic technologies, and in particular, to an information processing method and a terminal.

BACKGROUND

With development of electronic technologies, increasingly more applications may be installed on a terminal. A user may collect, by using applications (such as memo, notepad, messaging, calendar, and WeChat) in the terminal, information (such as a shopping list and news information) to which the user pays attention in corresponding applications; and then the terminal may analyze the collected information, to provide the user with corresponding services.

For example, when the terminal collects, in response to an operation of the user, a reminder SMS message for instructing the user to pick up a package, the terminal may provide the user with a calendar reminder service for instructing to pick up the package.

However, when the terminal collects a plurality of pieces of information, the terminal recommends, to the user, a reminder service corresponding to each piece of information, to remind the user to perform a corresponding task at a specific time, without considering whether task execution times conflict.

SUMMARY

Embodiments of this application provide an information processing method and a terminal, to avoid a conflict when a user performs a plurality of tasks.

According to a first aspect, an embodiment of this application provides an information processing method. The method includes: extracting, by a terminal, first structured information from a first screen in response to a first operation performed by a user on the first screen, and generating a first prompt message based on the first structured information, where the first prompt message is used to remind the user to perform a first task at a first address at a first time; further extracting, by the terminal, second structured information from a second screen in response to the first operation performed by the user on the second screen, where the second structured information is used to instruct the user to perform a second task at a second address at a second time; and when the first time and the second time have an intersection, and the first address is different from the second address, automatically changing, by the terminal, the first time in the first prompt message, so that a changed first time and the second time have no intersection.

Therefore, the terminal may remind, by using the first prompt message, the user to perform the first task at the changed first time. In this way, if the user performs the first task at the changed first time, a case in which the user cannot perform the first task because the time of performing the first task and the time of performing the second task have the intersection and the addresses are different can be avoided, to avoid a conflict when the user performs the first task and the second task.

In a possible design of the first aspect, the terminal may change the first time after obtaining consent from the user. Specifically, the automatically changing, by the terminal, the first time in the first prompt message, so that a changed first time and the second time have no intersection includes: prompting, by the terminal, the user with first change information; and automatically changing, by the terminal, the first time in response to a confirmation operation performed by the user on the first change information, so that the changed first time and the second time have no intersection, where the first change information is used to indicate that the first time in the first prompt message is to be changed, and the changed first time and the second time have no intersection.

In another possible design of the first aspect, the terminal may send the first prompt message by using a first control. The first control includes any one of a memo board, a notification bar, HiBoard, and a widget (Widget).

In this embodiment of this application, the first time is a moment, and the second time is a moment. Alternatively, the first time is a time period, and the second time is a moment. Alternatively, the first time is a time period, and the second time is a time period. Alternatively, the first time is a moment, and the second time is a time period.

In this embodiment of this application, that the first address is different from the second address may include at least the following five cases: A distance between the first address and the second address is greater than a preset distance threshold; the first address and the second address are in different cities; the first address and the second address are in different areas (namely, urban areas) of a same city; the first address and the second address are in different provinces; or the first address and the second address are in different countries.

According to a second aspect, an embodiment of this application provides an information processing method. The method includes: extracting, by a terminal, first structured information from a first screen in response to a first operation performed by a user on the first screen, and generating a first prompt message based on the first structured information, where the first prompt message is used to remind the user to perform a first task at a first address at a first time; further extracting, by the terminal, second structured information from a second screen in response to the first operation performed by the user on the second screen, where the second structured information is used to instruct the user to perform a second task at a second address at a second time; and when the first time and the second time have an intersection, and the first address is different from the second address, automatically adding, by the terminal, first instruction information to the first prompt message, to remind the user to perform the first task at a third time that has no intersection with the second time.

Therefore, the terminal may remind, by using the first prompt message, the user that the time of performing the first task is changed. In this way, if the user performs the first task at the changed first time, a case in which the user cannot perform the first task because the time of performing the first task and the time of performing the second task have the intersection and the addresses are different can be avoided, to avoid a conflict when the user performs the first task and the second task.

In another possible design of the second aspect, the terminal may send, by using a first control, the first prompt message including the first instruction information. The first control includes any one of a memo board, a notification bar, HiBoard, and a widget (Widget).

According to a third aspect, an embodiment of this application provides an information processing method. The method includes: displaying, by a terminal, a first screen; extracting first structured information from the first screen in response to a first operation performed by a user on the first screen, where the first structured information is used to instruct the user to perform a first task at a first address at a first time; generating a first prompt message based on the first structured information, where the first prompt message is used to remind, at a second time, the user to perform the first task at the first address at the first time; displaying, by the terminal, a second screen; extracting second structured information from the second screen in response to the first operation performed by the user on the second screen, where the second structured information is used to instruct the user to perform a second task at a second address at a third time; and generating a second prompt message when the first time and the third time have an intersection and the first address is different from the second address, where the second prompt message is used to remind, at a fourth time, the user to perform the first task at the first address at the first time.

The terminal may send the first prompt message at the second time, to remind the user to perform the first task at the first address at the first time. Because the first time of performing the first task and the second time of performing the second task have the intersection, the terminal may further send the second prompt message at the fourth time, to remind the user to perform the first task at the first address at the first time. Although the second prompt message is also used to remind the user to perform the first task at the first address at the first time, the second prompt message is sent at the fourth time, and different reminding effects can be achieved by prompting, at different times, the user to perform a same event. In this embodiment of this application, the second prompt message is sent at the fourth time, so that a possibility that the user performs the first task at a time that has no intersection with the third time can be increased.

In another possible design of the third aspect, after the generating a first prompt message based on the first structured information, the terminal may send the first prompt message at the second time, to remind the user to perform the first task at the first address at the first time. After the generating a second prompt message, the terminal may send the second prompt message at the fourth time, to remind the user to perform the first task at the first address at the first time. In other words, the terminal may not only remind, at the second time, the user to perform the first task at the first address at the first time, but also remind, at the fourth time, the user to perform the first task at the first address at the first time, so that a possibility that the user performs the first task at a time that has no intersection with the third time can be increased.

According to a fourth aspect, an embodiment of this application provides an information processing method. The method includes: displaying, by a terminal, a first screen; extracting first structured information from the first screen in response to a first operation performed by a user on the first screen, and generating a first prompt message based on the first structured information, where the first structured information is used to instruct the user to perform a first task at a first address at a first time, and the first prompt message is used to remind the user to perform the first task at the first address at the first time; displaying, by the terminal, a second screen, and extracting second structured information from the second screen in response to the first operation performed by the user on the second screen, where the second structured information is used to instruct the user to perform a second task at a second address at a second time; and modifying the first prompt message when the first time and the second time have an intersection and the first address is the same as the second address, so that the first prompt message is used to remind the user to perform the first task and the second task at the first address at the intersection of the first time and the second time.

It may be understood that because the first time and the second time have the intersection, and the first address is the same as the second address, the terminal may modify the first prompt message, so that the first prompt message is used to remind the user to perform the first task and the second task at the first address at the intersection of the first time and the second time. In other words, the terminal may integrate prompt messages of the first task and the second task, and prompt, in one prompt message, the user to perform both the first task and the second task. Therefore, efficiency of performing the first task and the second task by the user can be improved.

According to a fifth aspect, an embodiment of this application provides an information processing method. The method includes: displaying, by a terminal, a first screen, extracting first structured information from the first screen in response to a first operation performed by a user on the first screen, and generating a first prompt message based on the first structured information, where the first structured information is used to instruct the user to perform a first task at a first address at a first time, and the first prompt message is used to remind the user to perform the first task at the first address at the first time; displaying, by the terminal, a second screen, and extracting second structured information from the second screen in response to the first operation performed by the user on the second screen, where the second structured information is used to instruct the user to perform a second task at a second address at a second time; and modifying, by the terminal, the first prompt message when the first time and the second time have an intersection, the first address is the same as the second address, and the first task is the same as the second task, so that the first prompt message is used to remind the user to perform the first task at the first address at the first time and the second time.

It may be understood that because the first time and the second time have the intersection, the first address is the same as the second address, and the first task is the same as the second task, the terminal may modify the first prompt message, so that the first prompt message can be used to remind the user to perform the first task at the first address at the first time and the second time. In other words, the terminal may integrate prompt messages of the first task and the second task, and prompt, in one prompt message, the user to perform the first task at different times.

According to a sixth aspect, an embodiment of this application provides an information processing method. The method includes: displaying, by a terminal, a first screen, extracting first structured information from the first screen in response to a first operation performed by a user on the first screen, and generating a first prompt message based on the first structured information, where the first structured information is used to instruct the user to perform a first task at a first time, and the first prompt message is used to remind the user to perform the first task at the first time; displaying, by the terminal, a second screen, and extracting second structured information from the second screen in response to the first operation performed by the user on the second screen, where the second structured information is used to instruct the user to perform a second task at a second time; and modifying the first prompt message when the first time and the second time have an intersection, so that the first prompt message is used to remind the user to perform the first task and the second task at the intersection of the first time and the second time.

It may be understood that because the first time and the second time have the intersection, the terminal may modify the first prompt message, so that the first prompt message is used to remind the user to perform the first task and the second task at the intersection of the first time and the second time. In other words, the terminal may integrate prompt messages of the first task and the second task, and prompt, in one prompt message, the user to perform both the first task and the second task at the same time. Therefore, efficiency of performing the first task and the second task by the user can be improved.

In another possible design of any one of the first aspect to the sixth aspect, after the terminal displays the first screen, the terminal may store content on the first screen in a nonvolatile storage medium of the terminal in response to the first operation performed by the user on the first screen. The content on the first screen includes at least one of a web page link, a screenshot of the first screen, and the first structured information.

In another possible design of any one of the first aspect to the sixth aspect, the method in the embodiments of this application may further include: displaying, by the terminal, a memo board on a current screen in response to a second operation of the user, where the memo board is used to display at least one first information item corresponding to the content stored in the nonvolatile storage medium; and displaying, by the terminal, a third screen in response to a selection operation performed by the user on any one of the at least one first information item, where the third screen includes content corresponding to the first information item selected by the user.

In another possible design of any one of the first aspect to the sixth aspect, the memo board further includes at least one second information item. The at least one second information item is used to recommend at least one associated service and at least one potential service to the user, the at least one associated service is associated with the first task, and the at least one potential service is associated with a potential task of the first task. The method in the embodiments of this application may further include: displaying, by the terminal, a fourth screen in response to a selection operation performed by the user on any one of the at least one second information item, where the fourth screen is a service recommendation screen corresponding to the second information item selected by the user.

Optionally, the third screen and the fourth screen may further include a "Share" key, an "Edit" key, and a "Delete" key. The terminal may invoke an instant messaging application (such as WeChat, Messaging, or QQ) in response to a tap operation performed by the user on the "Share" key to send a corresponding prompt message to another terminal. The terminal may edit information on the third screen in response to a tap operation performed by the user on the "Edit" key. For example, the terminal may modify the information on the third screen or the like in response to an operation of the user. In response to a tap operation performed by the user on the "Delete" key, the terminal may delete the third screen and delete a corresponding information item from the memo board.

According to a seventh aspect, an embodiment of this application provides a terminal. The terminal includes a display unit, an extraction unit, a generation unit, and a modification unit. The display unit is configured to display a first screen. The extraction unit is configured to extract, in response to a first operation performed by a user on the first screen, first structured information from the first screen displayed by the display unit, where the first structured information is used to instruct the user to perform a first task at a first address at a first time. The generation unit is configured to generate a first prompt message based on the first structured information extracted by the extraction unit, where the first prompt message is used to remind the user to perform the first task at the first address at the first time. The display unit is further configured to display a second screen. The extraction unit is further configured to extract, in response to the first operation performed by the user on the second screen, second structured information from the second screen displayed by the display unit, where the second structured information is used to instruct the user to perform a second task at a second address at a second time. The modification unit is configured to: when the first time and the second time have an intersection, and the first address is different from the second address, automatically change the first time in the first prompt message, so that a changed first time and the second time have no intersection.

In a possible design of the seventh aspect, the modification unit is specifically configured to: prompt the user with first change information, where the first change information is used to indicate that the first time in the first prompt message is to be changed, and the changed first time and the second time have no intersection; and automatically change the first time in response to a confirmation operation performed by the user on the first change information, so that the changed first time and the second time have no intersection.

In another possible design of the seventh aspect, the terminal further includes a storage unit. The storage unit is configured to: after the display unit displays the first screen, store content on the first screen in response to the first operation performed by the user on the first screen. The storage unit is a nonvolatile storage medium of the terminal, and the content on the first screen includes at least one of a web page link, a screenshot of the first screen, and the first structured information.

In another possible design of the seventh aspect, the display unit is further configured to: display a memo board on a current screen in response to a second operation of the user, where the memo board is used to display at least one first information item corresponding to the content stored in the nonvolatile storage medium; and display a third screen in response to a selection operation performed by the user on any one of the at least one first information item, where the third screen includes content corresponding to the first information item selected by the user.

In another possible design of the seventh aspect, the memo board further includes at least one second information item, the at least one second information item is used to recommend at least one associated service and at least one potential service to the user, the at least one associated service is associated with the first task, and the at least one potential service is associated with a potential task of the first task. The display unit is further configured to display a fourth screen in response to a selection operation performed by the user on any one of the at least one second information item, where the fourth screen is a service recommendation screen corresponding to the second information item selected by the user.

In another possible design of the seventh aspect, the display unit is further configured to: after the modification unit automatically changes the first time in the first prompt message, so that the changed first time and the second time have no intersection, send a changed first prompt message by using a first control, where the first control includes any one of a memo board, a notification bar, HiBoard, a widget, and an instant messaging message.

According to an eighth aspect, an embodiment of this application provides a terminal. The terminal includes a display unit, an extraction unit, a generation unit, and a modification unit. The display unit is configured to display a first screen. The extraction unit is configured to extract, in response to a first operation performed by a user on the first screen, first structured information from the first screen displayed by the display unit, where the first structured information is used to instruct the user to perform a first task at a first address at a first time. The generation unit is configured to generate a first prompt message based on the first structured information extracted by the extraction unit, where the first prompt message is used to remind the user to perform the first task at the first address at the first time. The display unit is further configured to display a second screen. The extraction unit is further configured to extract, in response to the first operation performed by the user on the second screen, second structured information from the second screen displayed by the display unit, where the second structured information is used to instruct the user to perform a second task at a second address at a second time. The modification unit is configured to: when the first time and the second time have an intersection, and the first address is different from the second address, automatically add first instruction information to the first prompt message, where the first instruction information is used to remind the user to perform the first task at a third time, and the third time and the second time have no intersection.

In a possible design of the eighth aspect, the display unit is further configured to: after the modification unit automatically adds the first instruction information to the first prompt message, send, by using a first control, the first prompt message including the first instruction information, where the first control includes any one of a memo board, a notification bar, HiBoard, a widget, and an instant messaging message.

According to a ninth aspect, an embodiment of this application provides a terminal. The terminal includes a display unit, an extraction unit, and a generation unit. The display unit is configured to display a first screen. The extraction unit is configured to extract, in response to a first operation performed by a user on the first screen, first structured information from the first screen displayed by the display unit, where the first structured information is used to instruct the user to perform a first task at a first address at a first time. The generation unit is configured to generate a first prompt message based on the first structured information extracted by the extraction unit, where the first prompt message is used to remind, at a second time, the user to perform the first task at the first address at the first time. The display unit is further configured to display a second screen. The extraction unit is further configured to extract, in response to the first operation performed by the user on the second screen, second structured information from the second screen displayed by the display unit, where the second structured information is used to instruct the user to perform a second task at a second address at a third time. The generation unit is further configured to generate a second prompt message when the first time and the third time have an intersection and the first address is different from the second address, where the second prompt message is used to remind, at a fourth time, the user to perform the first task at the first address at the first time.

In a possible design of the ninth aspect, the display unit is further configured to: after the generation unit generates the first prompt message based on the first structured information, send the first prompt message at the second time, to remind the user to perform the first task at the first address at the first time. The display unit is further configured to: after the generation unit generates the second prompt message, send the second prompt message at the fourth time, to remind the user to perform the first task at the first address at the first time.

According to a tenth aspect, an embodiment of this application provides a terminal. The terminal includes a processor, a memory, and a display, and the memory and the display are coupled to the processor. The display is configured to: display a screen and receive a touch operation from a user. The memory includes a nonvolatile storage medium, the memory is configured to store computer program code, and the computer program code includes a computer instruction. When the processor executes the computer instruction, the display is configured to display a first screen; the processor is configured to: extract first structured information from the first screen in response to a first operation performed by the user on the first screen, where the first structured information is used to instruct the user to perform a first task at a first address at a first time; and generate a first prompt message based on the first structured information, where the first prompt message is used to remind the user to perform the first task at the first address at the first time; the display is further configured to display a second screen; the processor is further configured to extract second structured information from the second screen in response to the first operation performed by the user on the second screen, where the second structured information is used to instruct the user to perform a second task at a second address at a second time; and the processor is further configured to: when the first time and the second time have an intersection, and the first address is different from the second address, automatically change the first time in the first prompt message, so that a changed first time and the second time have no intersection.

In a possible design of the tenth aspect, the processor is specifically configured to: prompt the user with first change information, where the first change information is used to indicate that the first time in the first prompt message is to be changed, and the changed first time and the second time have no intersection; and automatically change the first time in response to a confirmation operation performed by the user on the first change information, so that the changed first time and the second time have no intersection.

In another possible design of the tenth aspect, the memory is further configured to: after the display displays the first screen, store content on the first screen in response to the first operation performed by the user on the first screen, where the content on the first screen includes at least one of a web page link, a screenshot of the first screen, and the first structured information.

In another possible design of the tenth aspect, the display is further configured to: display a memo board on a current screen in response to a second operation of the user, where the memo board is used to display at least one first information item corresponding to the content stored in the nonvolatile storage medium; and display a third screen in response to a selection operation performed by the user on any one of the at least one first information item, where the third screen includes content corresponding to the first information item selected by the user.

In another possible design of the tenth aspect, the memo board displayed by the display further includes at least one second information item, the at least one second information item is used to recommend at least one associated service and at least one potential service to the user, the at least one associated service is associated with the first task, and the at least one potential service is associated with a potential task of the first task. The display is further configured to display a fourth screen in response to a selection operation performed by the user on any one of the at least one second information item, where the fourth screen is a service recommendation screen corresponding to the second information item selected by the user.

In another possible design of the tenth aspect, the display is further configured to: after the processor automatically changes the first time in the first prompt message, so that the changed first time and the second time have no intersection, send a changed first prompt message by using a first control, where the first control includes any one of a memo board, a notification bar, HiBoard, a widget, and an instant messaging message.

According to an eleventh aspect, an embodiment of this application provides a terminal. The terminal includes a processor, a memory, and a display, and the memory and the display are coupled to the processor. The display is configured to: display a screen and receive a touch operation from a user. The memory includes a nonvolatile storage medium, the memory is configured to store computer program code, and the computer program code includes a computer instruction. When the processor executes the computer instruction, the display is configured to display a first screen; the processor is configured to: extract first structured information from the first screen in response to a first operation performed by the user on the first screen, where the first structured information is used to instruct the user to perform a first task at a first address at a first time; and generate a first prompt message based on the first structured information, where the first prompt message is used to remind the user to perform the first task at the first address at the first time; the display is further configured to display a second screen; the processor is further configured to extract second structured information from the second screen in response to the first operation performed by the user on the second screen, where the second structured information is used to instruct the user to perform a second task at a second address at a second time; and the processor is further configured to: when the first time and the second time have an intersection, and the first address is different from the second address, automatically add first instruction information to the first prompt message, where the first instruction information is used to remind the user to perform the first task at a third time, and the third time and the second time have no intersection.

In a possible design of the eleventh aspect, the display is further configured to: after the processor automatically adds the first instruction information to the first prompt message, send, by using a first control, the first prompt message including the first instruction information, where the first control includes any one of a memo board, a notification bar, HiBoard, a widget, and an instant messaging message.

According to a twelfth aspect, an embodiment of this application provides a terminal. The terminal includes a processor, a memory, and a display, and the memory and the display are coupled to the processor. The display is configured to: display a screen and receive a touch operation from a user. The memory includes a nonvolatile storage medium, the memory is configured to store computer program code, and the computer program code includes a computer instruction. When the processor executes the computer instruction, the display is configured to display a first screen; the processor is configured to: extract first structured information from the first screen in response to a first operation performed by the user on the first screen, where the first structured information is used to instruct the user to perform a first task at a first address at a first time; and generate a first prompt message based on the first structured information, where the first prompt message is used to remind, at a second time, the user to perform the first task at the first address at the first time; the display is further configured to display a second screen; the processor is further configured to extract second structured information from the second screen in response to the first operation performed by the user on the second screen, where the second structured information is used to instruct the user to perform a second task at a second address at a third time; and the processor is further configured to generate a second prompt message when the first time and the third time have an intersection and the first address is different from the second address, where the second prompt message is used to remind, at a fourth time, the user to perform the first task at the first address at the first time.

In a possible design of the twelfth aspect, the display is further configured to: after the processor generates the first prompt message based on the first structured information, send the first prompt message at the second time, to remind the user to perform the first task at the first address at the first time.

The display unit is further configured to: after the processor generates the second prompt message when the first time and the third time have the intersection and the first address is different from the second address, send the second prompt message at the fourth time, to remind the user to perform the first task at the first address at the first time.

According to a thirteenth aspect, an embodiment of this application provides a computer storage medium. The computer storage medium includes a computer instruction, and when the computer instruction is run on a terminal, the terminal is enabled to perform the method according to any one of the first aspect to the sixth aspect and the possible designs of the first aspect to the sixth aspect.

According to a fourteenth aspect, an embodiment of this application provides a computer program product. When the computer program product is run on a computer, the computer is enabled to perform the method according to any one of the first aspect to the sixth aspect and the possible designs of the first aspect to the sixth aspect.

In addition, for technical effects brought by the seventh aspect to the twelfth aspect and any design of the seventh aspect to the twelfth aspect, and technical effects brought by the thirteenth aspect and the fourteenth aspect, refer to technical effects brought by the first aspect to the sixth aspect and different designs of the first aspect to the sixth aspect. Details are not described herein again.

BRIEF DESCRIPTION OF DRAWINGS

FIG. 7A(a) to FIG. 7A(d) are a schematic diagram 1 of an instance of a process of performing an information processing method according to an embodiment of this application;

FIG. 7B(a) to FIG. 7B(d) are a schematic diagram 2 of an instance of a process of performing an information processing method according to an embodiment of this application;

FIG. 10(a) to FIG. 10(d) are a schematic diagram 3 of an instance of a process of performing an information processing method according to an embodiment of this application;

DESCRIPTION OF EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. For example, a first time period and a second time period are two different time periods.

The embodiments of this application provide an information processing method. The information processing method may be applied to a process in which a terminal collects information. Specifically, the method may be applied to a process in which the terminal reminds, based on the collected information, a user to perform a corresponding task at a specific time.

For example, the terminal in the embodiments of this application may be an electronic device such as a mobile phone, a tablet computer, a wearable device, an augmented reality (AR)/virtual reality (VR) device, a notebook computer, an ultra-mobile personal computer (UMPC), a netbook, or a personal digital assistant (PDA). This is not limited in the embodiments of this application.

Figure 1:
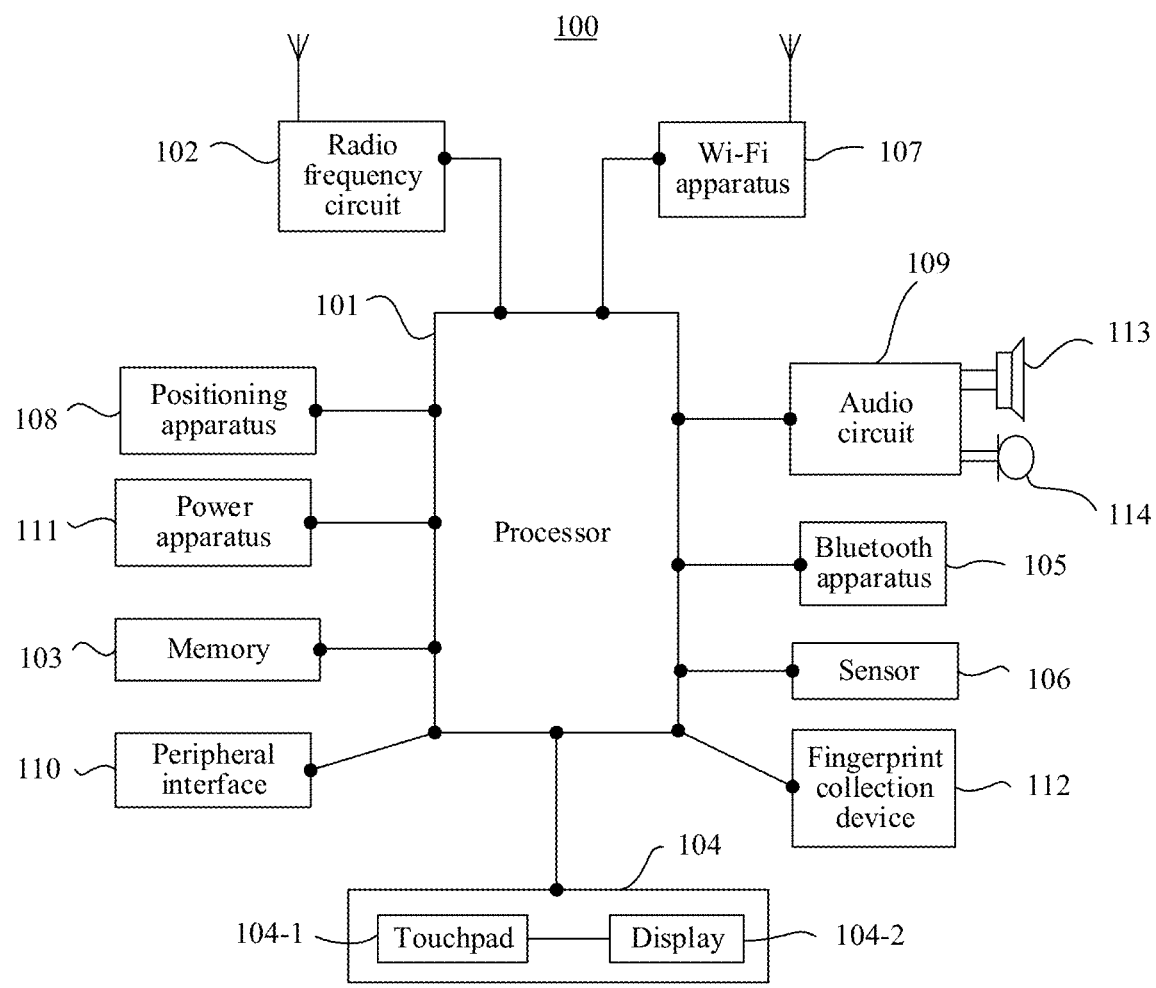
FIG. 1 is a schematic diagram of a hardware structure of a mobile phone according to an embodiment of this application.

Referring to FIG. 1, the terminal in the embodiments of this application may be a mobile phone 100. The mobile phone 100 is used as an example below to describe the embodiments in detail. It should be understood that the mobile phone 100 shown in the figure is merely an example of the terminal, and the mobile phone 100 may have more or fewer components than those shown in the figure, or may combine two or more components, or may have different component configurations.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power apparatus 111. These components may perform communication by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, or may combine some components, or may have different component arrangements.

The following describes in detail the components of the mobile phone 100 with reference to FIG. 1.

The processor 101 is a control center of the mobile phone 100. The processor 101 is connected to all parts of the mobile phone 100 by using various interfaces and lines, and performs various functions of the mobile phone 100 and data processing by running or executing an application program stored in the memory 103 and invoking data stored in the memory 103. In some embodiments, the processor 101 may include one or more processing units.

The radio frequency circuit 102 may be configured to: receive and send radio signals. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a global system for mobile communications, a general packet radio service, code division multiple access, wideband code division multiple access, long term evolution, and the like.

The memory 103 is configured to store the application program and the data. The processor 101 performs various functions of the mobile phone 100 and data processing by running the application program and the data that are stored in the memory 103. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (RAM), and may further include a nonvolatile memory such as a magnetic disk storage device, a flash memory device, or another volatile solid-state storage device. The memory 103 may store various operating systems. The memory 103 may be standalone, and is connected to the processor 101 by using the communications bus; or the memory 103 may be integrated into the processor 101.

The touchscreen 104 may specifically include a touchpad 104-1 and a display 104-2.

The touchpad 104-1 may collect a touch event (for example, an operation performed by a user of the mobile phone 100 on the touchpad 104-1 or near the touchpad 104-1 by using any proper object such as a finger or a stylus) performed by the user on or near the touchpad 104-1, and send collected touch information to another device (for example, the processor 101). The touch event performed by the user near the touchpad 104-1 may be referred to as a floating touch. The floating touch may mean that the user does not need to directly touch the touchpad to select, move, or drag a target (for example, an icon), but the user needs only to be near the device to implement a desired function. In addition, the touchpad 104-1 may be implemented in a plurality of types such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form such as a liquid crystal display or an organic light emitting diode. The touchpad 104-1 may cover the display 104-2. When detecting the touch event on or near the touchpad 104-1, the touchpad 104-1 transfers the touch event to the processor 101 to determine a type of the touch event. Then, the processor 101 can provide corresponding visual output on the display 104-2 based on the type of the touch event.

It should be noted that in FIG. 1, the touchpad 104-1 and the display 104-2 are used as two independent components to implement input and output functions of the mobile phone 100. However, in some embodiments, the touchpad 104-1 and the display 104-2 may be integrated to implement the input and output functions of the mobile phone 100. It may be understood that the touchscreen 104 is formed by stacking a plurality of layers of materials. In this embodiment of this application, only the touchpad (layer) and the display (layer) are displayed, and another layer is not recorded in this embodiment of this application. In addition, the touchpad 104-1 may be configured on a front side of the mobile phone 100 in a full panel form, and the display 104-2 may also be configured on the front side of the mobile phone 100 in a full panel form. In this way, a bezel-less structure can be implemented on the front side of the mobile phone.

In addition, the mobile phone 100 may further have a fingerprint recognition function. For example, a fingerprint collection device (namely, a fingerprint sensor) 112 may be configured on a rear side (for example, below a rear-facing camera) of the mobile phone 100, or a fingerprint collection device 112 may be configured on the front side (for example, below the touchscreen 104) of the mobile phone 100. For another example, a fingerprint collection device 112 may be configured on the touchscreen 104 to implement the fingerprint recognition function. In other words, the fingerprint collection device 112 may be integrated into the touchscreen 104 to implement the fingerprint recognition function of the mobile phone 100. In this case, the fingerprint collection device 112 is configured on the touchscreen 104, and may be a part of the touchscreen 104, or may be configured on the touchscreen 104 in another manner. A main component of the fingerprint collection device 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, or the like.

The mobile phone 100 may further include the Bluetooth apparatus 105, configured to implement data exchange between the mobile phone 100 and another short-distance device (for example, a mobile phone or a smartwatch). In this embodiment of this application, the Bluetooth apparatus may be an integrated circuit, a Bluetooth chip, or the like.

The one or more sensors 106 include a sensor configured to detect a press operation performed by the user on a side edge and a slide operation performed by the user on the side edge.

Certainly, the one or more sensors 106 include but are not limited to the foregoing sensor. For example, the one or more sensors 106 may further include a light sensor, a motion sensor, and another sensor. Specifically, the light sensor may include an ambient light sensor and a proximity sensor. The ambient light sensor may adjust luminance of the display of the touchscreen 104 based on intensity of ambient light. The proximity sensor may power off the display when the mobile phone 100 approaches an ear. As one type of the motion sensor, an accelerometer sensor may detect acceleration values in all directions (usually on three axes). The accelerometer sensor may detect a value and a direction of gravity when the accelerometer sensor is stationary, and may be used in an application for recognizing a mobile phone posture (such as switching between a landscape mode and a portrait mode, a related game, or magnetometer posture calibration), a function related to vibration recognition (such as a pedometer or a knock), or the like. For another sensor that may be further configured on the mobile phone 100, such as a gyroscope, a barometer, a hygrometer, a thermometer, or an infrared sensor, details are not described herein.

The Wi-Fi apparatus 107 is configured to provide network access complying with a Wi-Fi-related standard and protocol for the mobile phone 100. The mobile phone 100 may access a Wi-Fi hotspot by using the Wi-Fi apparatus 107, to help the user receive and send emails, browse a web page, access streaming media, and the like. The Wi-Fi apparatus 107 provides wireless broadband internet access for the user. In some other embodiments, the Wi-Fi apparatus 107 may also be used as a Wi-Fi wireless access point, to provide Wi-Fi network access for another device.

The positioning apparatus 108 is configured to provide a geographical location for the mobile phone 100. It may be understood that the positioning apparatus 108 may be specifically a receiver of a positioning system such as a global positioning system (GPS), a BeiDou navigation satellite system, or a Russian GLONASS.

After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates with a device such as the positioning apparatus 108 (namely, the GPS receiver) of the mobile phone 100 through a wireless communications network, to provide positioning assistance.

In some other embodiments, the positioning apparatus 108 may alternatively be a positioning technology based on a Wi-Fi hotspot. Because each Wi-Fi hotspot has a globally unique media access control (MAC) address, the device can scan and collect broadcast signals of nearby Wi-Fi hotspots when Wi-Fi is enabled, and therefore can obtain MAC addresses that are broadcast by the Wi-Fi hotspots. The device sends, to a location server through a wireless communications network, data (for example, the MAC addresses) that can identify the Wi-Fi hotspots. The location server retrieves a geographical location of each Wi-Fi hotspot, obtains the geographical location of the device through calculation with reference to strength of the Wi-Fi broadcast signals, and sends the geographical location to the positioning apparatus 108 of the device.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the peripheral interface 110 is connected to the mouse by using a universal serial bus (USB) interface, and is connected, by using a metal contact on a card slot of the subscriber identification module card, to the subscriber identification module (SIM) card provided by a telecommunications operator. The peripheral interface 110 may be configured to couple the external input/output peripheral device to the processor 101 and the memory 103.

In this embodiment of the present invention, the mobile phone 100 may communicate with another device in a device group by using the peripheral interface 110, for example, may receive, by using the peripheral interface 110, display data sent by the another device for display. This is not limited in this embodiment of the present invention.

The mobile phone 100 may further include the power apparatus 111 (for example, a battery and a power management chip) that supplies power to the components. The battery may be logically connected to the processor 101 by using the power management chip, so that the power apparatus 111 implements functions such as charging and discharging management and power consumption management.

Although not shown in FIG. 1, the mobile phone 100 may further include a camera (a front-facing camera and/or a rear-facing camera), a flash, a micro projection apparatus, a near field communication (NFC) apparatus, and the like. Details are not described herein.

All methods in the following embodiments may be implemented in the mobile phone 100 having the foregoing hardware structure.

An information processing method provided in this application may be performed by an information processing apparatus, and the information processing apparatus may be the terminal shown in FIG. 1. Alternatively, the information processing apparatus may be a central processing unit (English: Central Processing Unit, CPU for short) of the terminal, or a module that is in the terminal and that is configured to perform the information processing method. In the embodiments of the present invention, the information processing method provided in the embodiments of the present invention is described by using an example in which the terminal performs the information processing method.

In the embodiments of this application, the terminal may collect content on a current screen in response to an operation, such as a first operation, performed by a user on the current screen. Then, the terminal may generate a prompt message based on the content on the current screen. The prompt message is used to remind the user to perform a corresponding task at a specific time. However, times of performing tasks reminded by using a plurality of prompt messages generated by the terminal may have an intersection. Therefore, the user cannot simultaneously perform, in one period of time, the plurality of tasks reminded by using the plurality of prompt messages, and the times of performing the plurality of tasks by the user conflict. Based on the foregoing problem, the information processing method provided in the embodiments of this application is described by using an example in which times at which the terminal performs two tasks have an intersection and addresses at which the terminal performs the two tasks are different.

Figure 2:
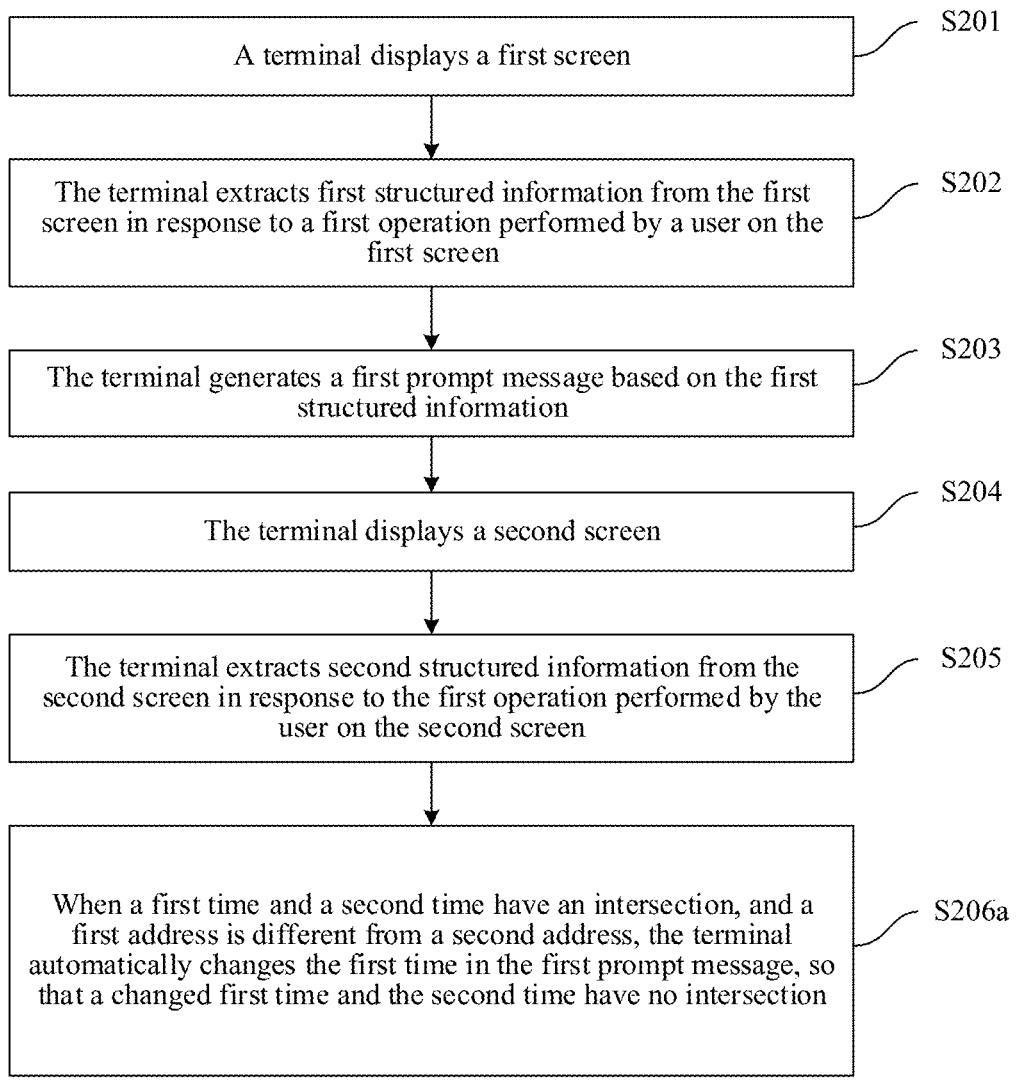
FIG. 2 is a flowchart 1 of an information processing method according to an embodiment of this application.

In a first application scenario in the embodiments of this application, an embodiment of this application provides an information processing method. As shown in FIG. 2, the information processing method includes S201 to S205 and S206a.

S201. A terminal displays a first screen.

The first screen in this embodiment of this application may be any screen displayed by the terminal. For example, the first screen may include a screen of any application in the terminal, a home screen of the terminal, or HiBoard of the terminal.

The any application may be an embedded application (namely, a system application of the terminal) of the terminal or a downloadable application. The embedded application is an application provided as a part of the terminal (for example, the mobile phone 100). For example, the system application may include "Settings", "Messaging", and the like. The downloadable application is an application that can provide an internet protocol multimedia subsystem (IMS) connection of the application. The downloadable application may be an application preinstalled in the terminal or may be a third-party application that may be downloaded by a user and installed in the terminal. For example, the downloadable application may include "WeChat", "Youku", and the like.

For example, the first screen may be a messaging screen of the terminal. For example, the first screen is a messaging screen of the mobile phone 100 shown in FIG. 3A(a) or FIG. 3B(a). The first screen may alternatively be a WeChat chat screen of the terminal. For example, the first screen is a WeChat chat screen of the mobile phone 100 shown in FIG. 4(*a*). The first screen may alternatively be a web page displayed by the terminal. For example, the first screen is a web page displayed by the mobile phone 100 shown in FIG. 5(*a*). The first screen may alternatively be a screen of any application other than "Messaging" and "WeChat". For example, the first screen may be a screen of a movie ticket booking application (for example, Meituan), for example, a ticket booking screen that is of Pirates of the Caribbean and that is displayed by the mobile phone 100 shown in FIG. 6(*a*). The first screen may alternatively be a setting screen of the terminal, a video playback screen of the terminal, a music playback screen of the terminal, or the like. Details are not described herein in this embodiment of this application.

S202. The terminal extracts first structured information from the first screen in response to a first operation performed by the user on the first screen.

The first operation may be a tap operation performed by the user on a shortcut key on the terminal. The shortcut key may be a shortcut key used to control the terminal to take a screenshot; or the shortcut key may be a preset shortcut key dedicated to controlling the terminal to collect content on a current screen. Alternatively, the first operation may be a preset gesture entered by the user on the first screen. The preset gesture may be a gesture used to control the terminal to take a screenshot; or the preset gesture may be a gesture dedicated to controlling the terminal to collect content on a current screen. The first operation in this embodiment of this application includes but is not limited to the operation performed on the shortcut key and the preset gesture.

The first structured information in this embodiment of this application may include time information and at least one of address information, person information, and event information. For example, the first structured information may include time information, address information, and event information.

Figure 3A:
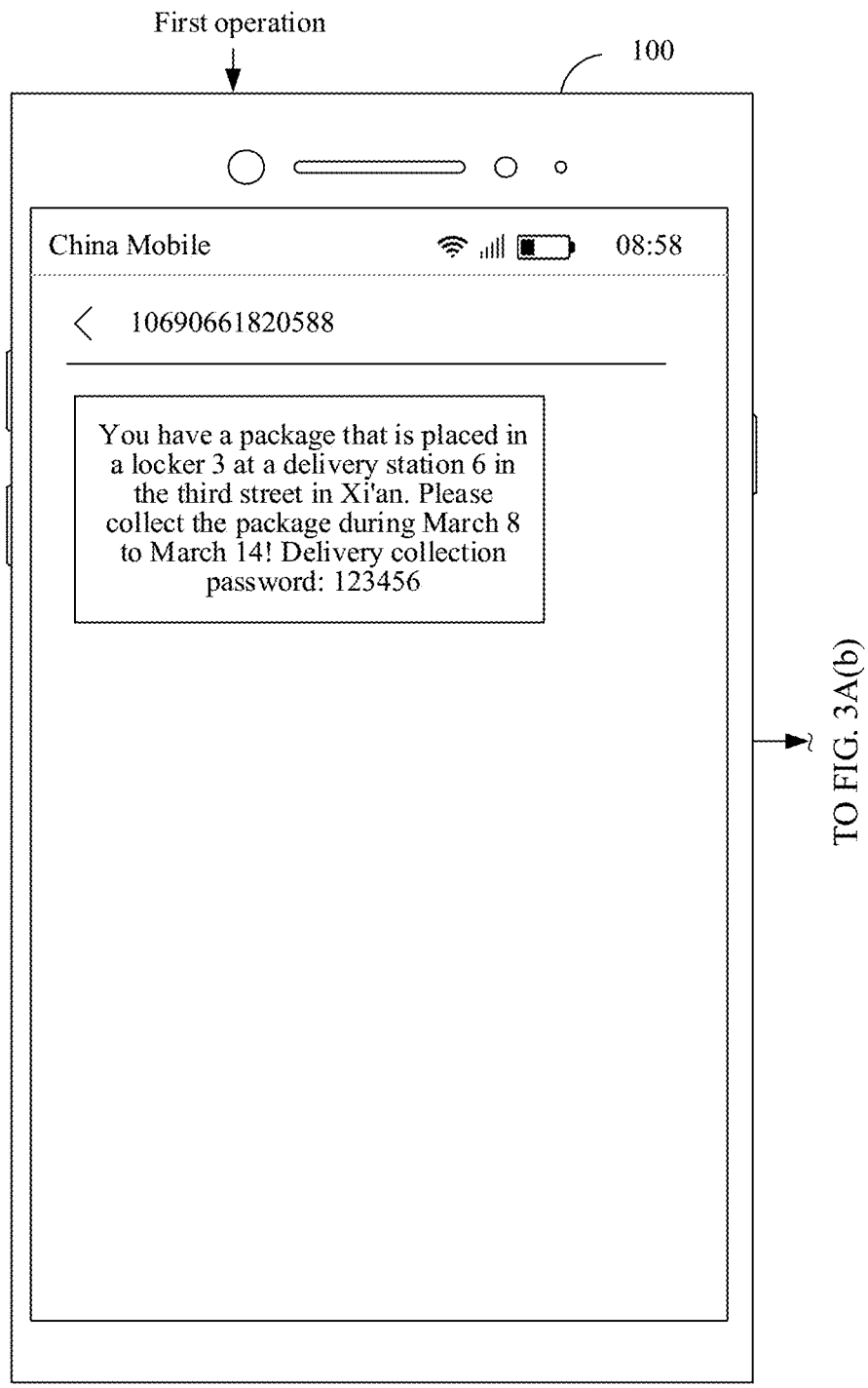
FIG. 3A(a) and FIG. 3A(b) are a schematic diagram 1 of an instance of a terminal screen according to an embodiment of this application.
Figure 3A:
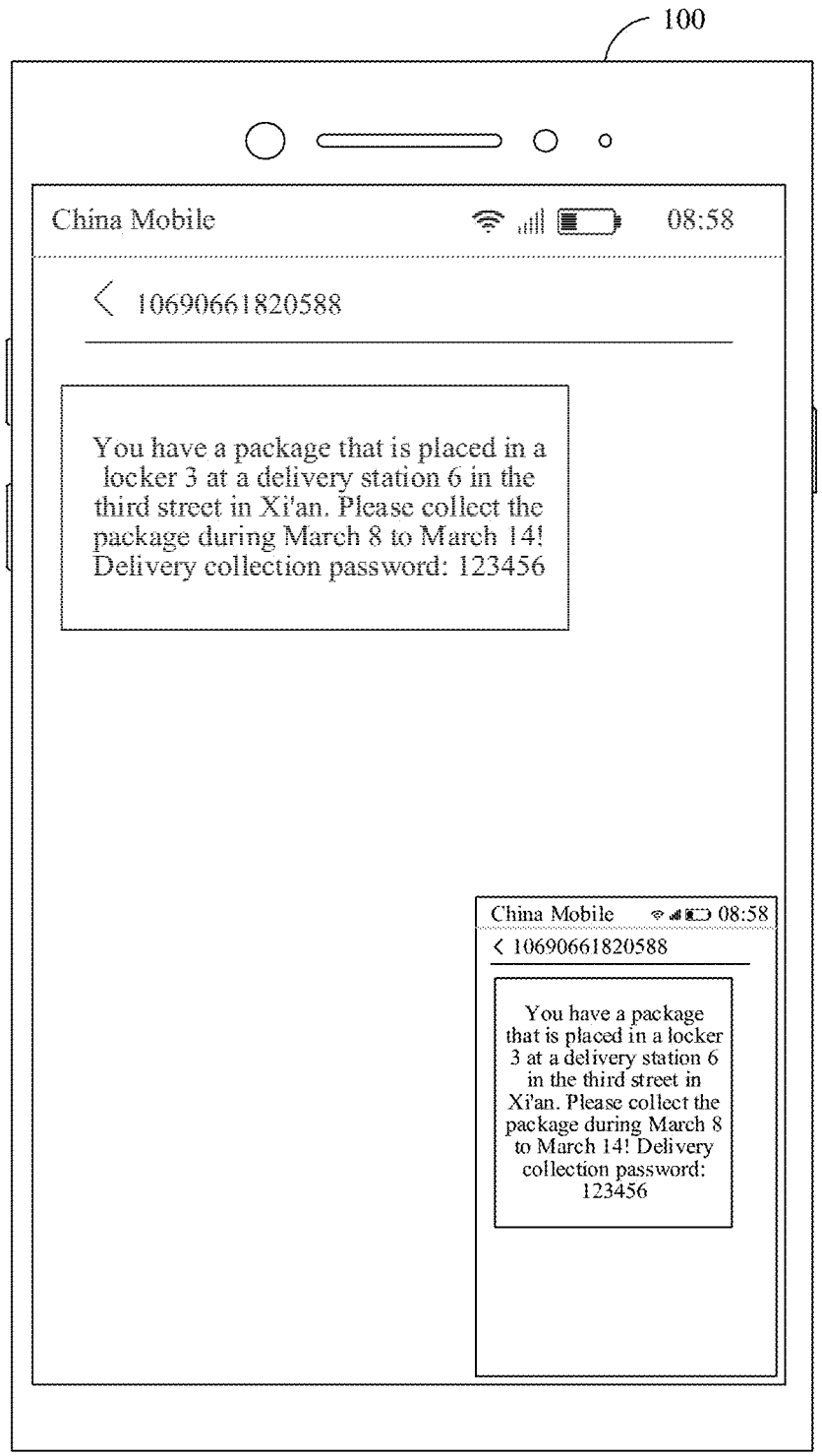

For example, the first screen is the messaging screen shown in FIG. 3A(a), and the first operation is the operation performed on the shortcut key used to control the mobile phone 100 to collect the content on the current screen. As shown in FIG. 3A(a), the mobile phone 100 receives a delivery notification from 106906618205088. The delivery notification is used to instruct the user to collect a package in a locker 3 at a delivery station 6 in the third street in Xi'an during March 8 to March 14. A delivery collection password is 123456. When the mobile phone 100 displays a first screen (a messaging screen) shown in FIG. 7A(a), the mobile phone 100 identifies content on the first screen in response to the first operation of the user, and extracts, from the first screen, structured information (namely, the first structured information) shown in FIG. 7A(b). The structured information shown in FIG. 7A(b) may include event information "collect a package", time information "March 8 to March 14", and address information "locker 3 at a delivery station 6 in the third street in Xi'an". Optionally, the first structured information may further include other information. For example, the structured information shown in FIG. 7A(b) may further include the delivery collection password "123456". Based on the structured information shown in FIG. 7A(b), as shown in FIG. 7A(c), the terminal may determine that a first task is "collect a package".

Figure 3B:
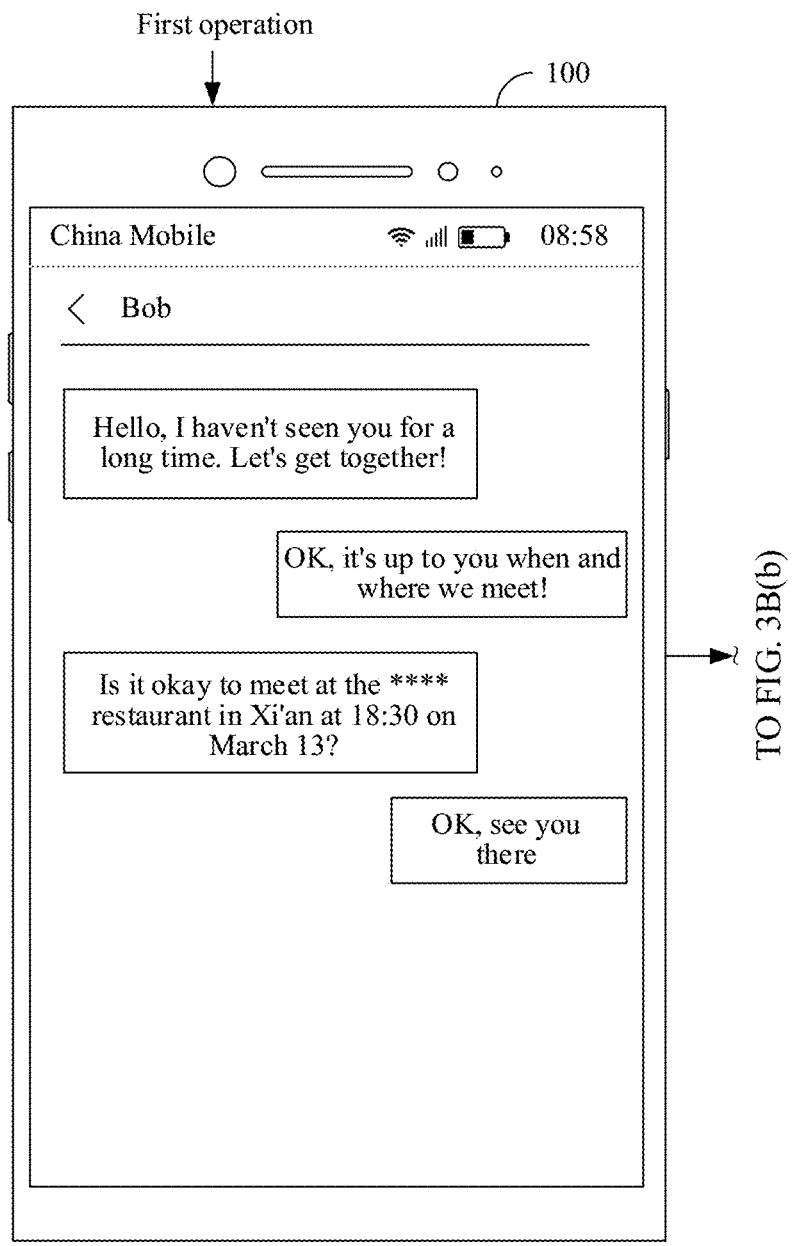
FIG. 3B(a), FIG. 3B(b), and FIG. 3B(c) are a schematic diagram 2 of an instance of a terminal screen according to an embodiment of this application.
Figure 3B:
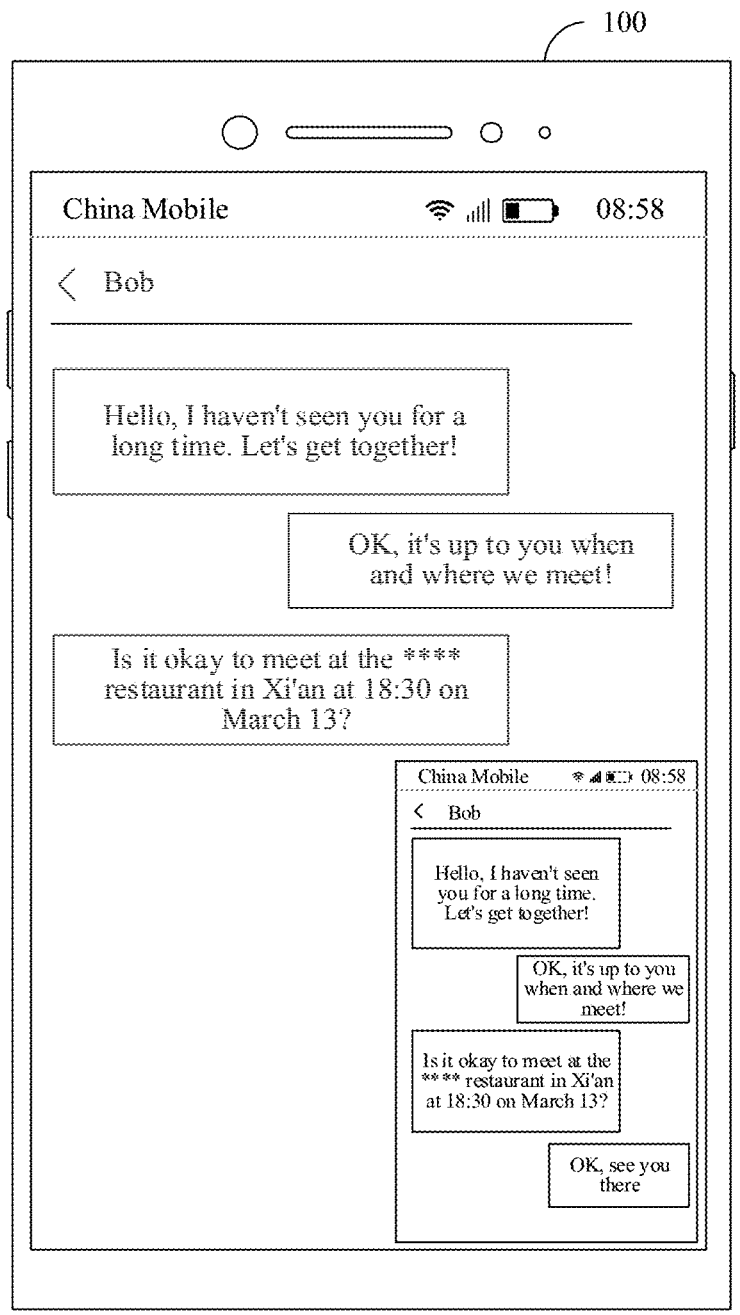
Figure 3B:
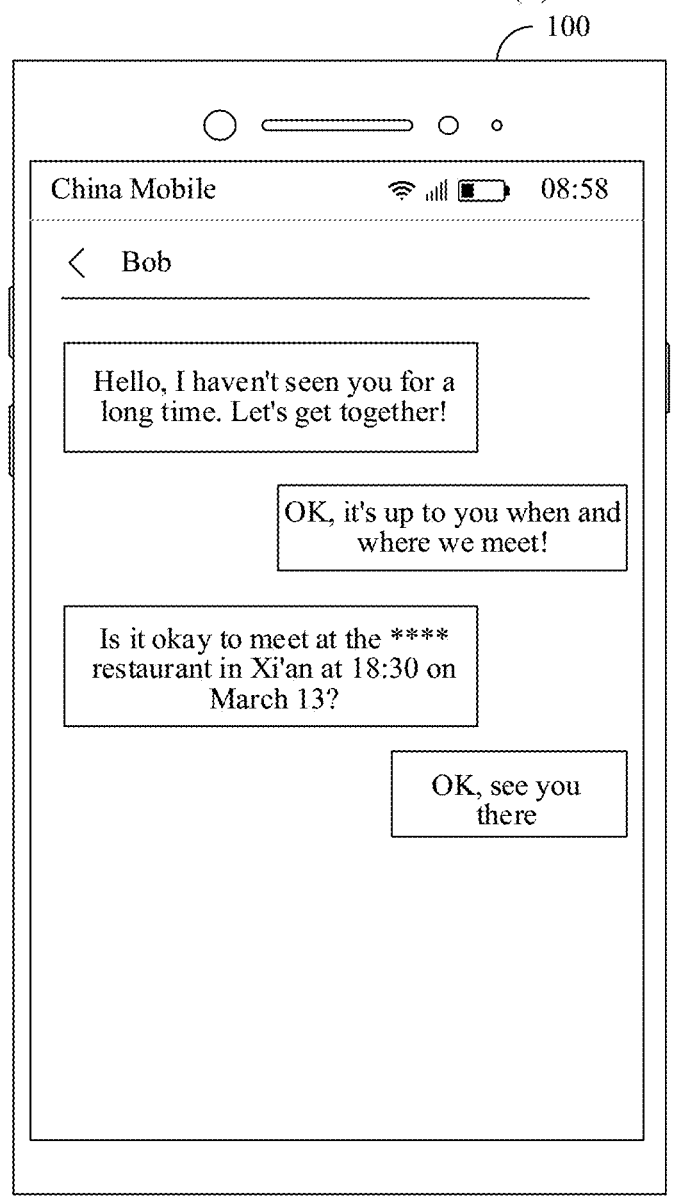

For example, the first screen is the messaging screen shown in FIG. 3B(a), and the first operation is the operation performed on the shortcut key used to control the mobile phone 100 to collect the content on the current screen. As shown in FIG. 3B(a), an owner of the mobile phone 100 and a friend Bob (Bob) agree to have an appointment at a **\*\*\*\* restaurant in Xi'an at 18:30 on March 13. When the mobile phone 100 displays a first screen (a messaging screen) shown in FIG. 7B(a), the mobile phone 100 identifies content on the first screen in response to the first operation of the user, and extracts, from the first screen, structured information (namely, the first structured information) shown in FIG. 7B(b). The structured information shown in FIG. 7B(b) may include event information "appointment", time information "18:30 on March 14", and address information "\*\*\*\* restaurant in Xi'an". Optionally, the first structured information may further include person information. For example, the structured information shown in FIG. 7B(b) may further include person information "me and Bob". Based on the structured information shown in FIG. 7B(b), as shown in FIG. 7**B(c), the terminal may determine that a first task is "appointment".

The first structured information in this embodiment of this application is used to instruct the user to perform the first task at a first address at a first time. The first time in this embodiment of this application may be a time period or a moment. To be specific, the first structured information may be used to instruct the user to perform the first task at a moment. For example, the first time may be "18:30 on March 14". The first structured information may be alternatively used to instruct the user to perform the first task in a time period. For example, the first time may be "March 8 to March 14".

For example, referring to the first structured information shown in FIG. 7A(b), the first time is "18:30 on March 14", the first address is "** restaurant in Xi'an", and the first task is "appointment". In other words, the first structured information shown in FIG. 7A(b) is used to instruct the user to collect the package in the locker 3 at the delivery station 6 in the third street in Xi'an during March 8 to March 14. Referring to the first structured information shown in FIG. 7B(b), the first time is "18:30 on March 14", the first address is " restaurant in Xi'an", and the first task is "appointment". In other words, the first structured information shown in FIG. 7B(b) is used to instruct the user to keep the appointment at the ** restaurant in Xi'an at 18:30 on March 14.

Optionally, the terminal may further store content on the first screen in a nonvolatile storage medium of the terminal in response to the first operation. The content on the first screen includes at least one of a web page link, a screenshot of the first screen, and the first structured information.

For example, as shown in FIG. 3A(b), the mobile phone 100 may obtain a screenshot of the first screen (the messaging screen) in response to the first operation, and the mobile phone 100 may store the screenshot of the messaging screen in the nonvolatile storage medium of the mobile phone 100. As shown in FIG. 3B(b), the mobile phone 100 may obtain a screenshot of the first screen (the messaging screen) in response to the first operation, and the mobile phone 100 may store the screenshot of the messaging screen in the nonvolatile storage medium of the mobile phone 100. As shown in FIG. 4(*b*), the mobile phone 100 may obtain a screenshot of the first screen (the WeChat chat screen) in response to the first operation, and the mobile phone 100 may store the WeChat chat screen in the nonvolatile storage medium of the mobile phone 100. Optionally, the terminal may take a screenshot of the first screen in response to the first operation, and display a screenshot screen shown in FIG. 3A(b), FIG. 3B(b), or FIG. 4(*b*). The terminal may re-display the first screen after displaying the screenshot screen for a period of time (for example, 3 seconds). For example, after displaying FIG. 3B(b) for a period of time, the mobile phone 100 displays a screen shown in FIG. 3B(c).

Figure 5A:
FIG. 5(a), FIG. 5(b), and FIG. 5(c) are a schematic diagram 4 of an instance of a terminal screen according to an embodiment of this application.
Figure 5B:
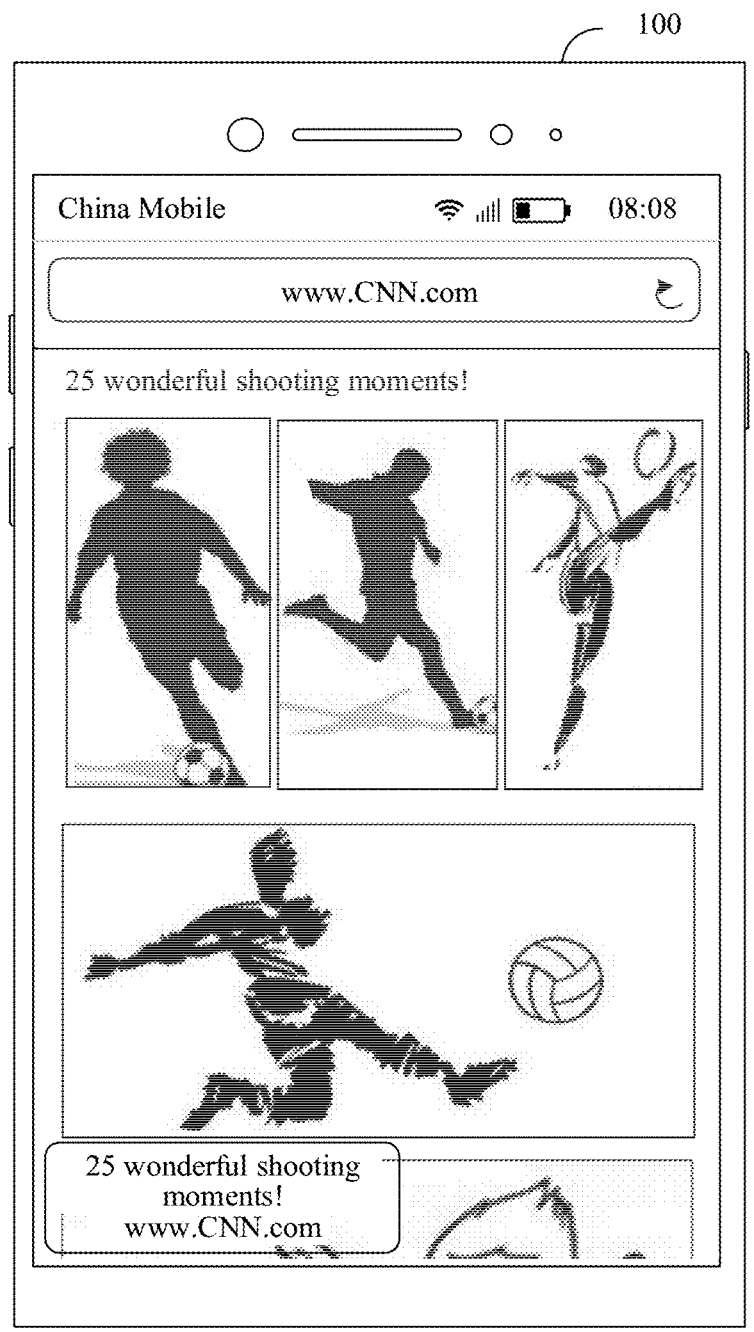
Figure 5C:
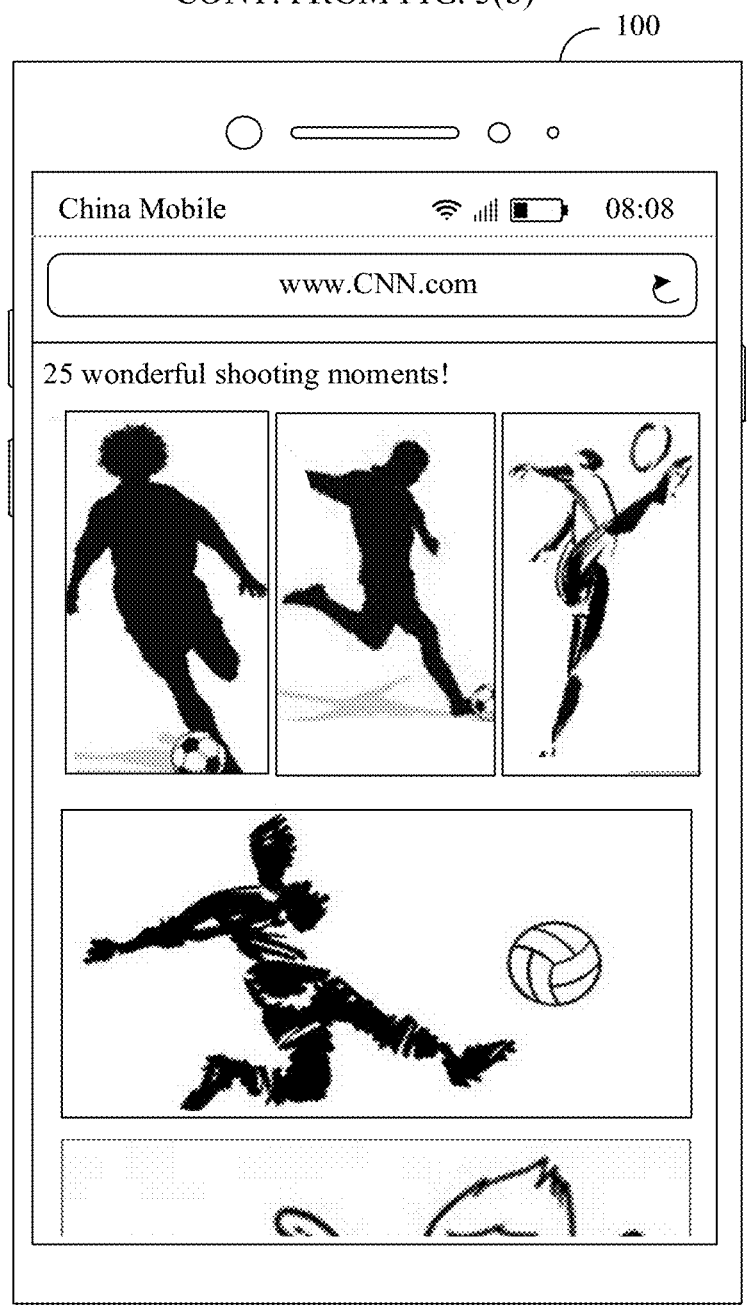

As shown in FIG. 5(*b*), the mobile phone 100 may obtain a web page link in response to the first operation, and the mobile phone 100 may store the web page link in the nonvolatile storage medium of the mobile phone 100. Optionally, the mobile phone 100 may extract the web page link from the first screen in response to the first operation, and then display an extraction screen shown in FIG. 5(*b*). After displaying, for a period of time, the extraction screen shown in FIG. 5(*b*), the mobile phone 100 displays a screen shown in FIG. 5(*c*). As shown in FIG. 6(*b*), the mobile phone 100 may extract a web page link from the first screen in response to the first operation, and the mobile phone 100 may store the web page link in the nonvolatile storage medium of the mobile phone 100.

S203. The terminal generates a first prompt message based on the first structured information.

It may be understood that after extracting the first structured information, the terminal may generate first instruction information based on the first structured information, to remind the user to perform the first task at the first address at the first time. To be specific, the first prompt message is used to remind the user to perform the first task at the first address at the first time.

After generating the first prompt message, the terminal may send the first prompt message at a predefined time, to remind the user to perform the first task at the first address at the first time. The predefined time may be one or more default times of a system, or may be allowed to be selected, modified, or set by the user.

Optionally, the predefined time may be before the first time, and a time difference between the predefined time and the first time is a fixed value. For example, when the first structured information is the structured information shown in FIG. 7B(b), and the first time is 18:30 on March 14, the predefined time may include at least one time such as 9:00 on March 14, 17:00 on March 14, 18:30 on March 13, each time at which a screen is turned on on March 14, or another preset time. To be specific, the terminal may send the first prompt message at the predefined time.

Optionally, when the first time is a period of time, and the user may perform the first task in the period of time, the predefined time may include at least one moment in the first time. To be specific, the terminal may send the first prompt message at the at least one moment. For example, when the first structured information is the structured information shown in FIG. 7A(b), and the first time is March 8 to March 14, the predefined time may include at least one of moments such as 9:00 on March 9, 18:00 on March 9, 18:00 on March 10, and 18:00 on March 14.

In this embodiment of this application, the terminal may send the first prompt message by using a first control. The first control includes any one of a memo board, a notification bar, HiBoard, a widget (Widget), and a memo.

For example, the first control is the memo board (Memo Board). The terminal may display the first prompt message on the memo board. When the terminal displays any screen, the terminal may display the memo board on the current screen in response to a second operation of the user. The second operation may be a tap operation performed by the user on a shortcut key on the terminal. The shortcut key may be a shortcut key used to start the memo board. Alternatively, the second operation may be a preset gesture entered by the user on any screen, and the preset gesture is different from the preset gesture corresponding to the first operation. The second operation in this embodiment of this application includes but is not limited to the operation performed on the shortcut key and the preset gesture. For example, as shown in FIG. 8(*a*), the mobile phone 100 displays a browser screen. As shown in FIG. 8(*b*), the mobile phone 100 may display a memo board 801 on the browser screen in response to the second operation. The memo board 801 includes at least one first information item. For example, the memo board 801 includes an information item of collecting a package, an information item (namely, an appointment reminder) of an appointment, an information item (25 wonderful shooting moments) of a web page link, and an information item (movie information of Pirates of the Caribbean) of Pirates of the Caribbean.

The terminal may display, in response to selection performed by the user on at least one first information item on the memo board, a third screen including content corresponding to the first information item selected by the user. For example, after the user taps the information item that is of collecting a package and that is shown in FIG. 8(*b*), the mobile phone 100 may display, in response to a selection operation performed by the user on the information item of collecting a package, a third screen 802 shown in FIG. 8(*c*). The third screen 802 includes the structured information shown in FIG. 7A(b). For example, the third screen 802 includes a delivery collection time "March 8 to March 14", a delivery collection address "locker 3 at a delivery station 6 in the third street in Xi'an", and a delivery collection password "123456".

Optionally, the third screen 802 may further include an icon 804 of the screenshot that is of the first screen shown in FIG. 3A(a) and that is taken by the mobile phone 100. The mobile phone 100 may display, in response to a tap operation performed by the user on the icon 804, the screenshot that is of the first screen shown in FIG. 3A(a) and that is taken by the mobile phone 100.

Optionally, the third screen 802 may further include a positioning and navigation symbol 803. The mobile phone 100 may invoke a map application (for example, Baidu Map or Amap) in the mobile phone 100 in response to a tap operation performed by the user on the positioning and navigation symbol 803 to provide the user with a navigation service from a current location to the "locker 3 at the delivery station 6 in the third street in Xi'an".

Optionally, the third screen 802 may further include a "Share" key, an "Edit" key, and a "Delete" key. The terminal may invoke an instant messaging application (such as WeChat, Messaging, or QQ) in response to a tap operation performed by the user on the "Share" key to send a corresponding prompt message to another terminal. The terminal may edit information on the third screen 802 in response to a tap operation performed by the user on the "Edit" key. For example, the terminal may modify the delivery collection time, the delivery collection address, and/or the like on the third screen 802 in response to an operation of the user. In response to a tap operation performed by the user on the "Delete" key, the terminal may delete the third screen 802 and delete the information item of collecting a package from the memo board. Optionally, the third screen 802 may further include information about or a link of a delivery company, a courier, or a locker application, and may further include other delivery information, for example, logistics information, a purchase record of a delivery object, and a link of purchase software.

For example, the first control is the notification bar. The terminal may send the first prompt message at the predefined time by using the notification bar. It is assumed that the predefined time is 9:00 on March 14. The mobile phone 100 may display, on the notification bar at 9:00 on March 14, a first prompt message 901 shown in FIG. 9(a). The first prompt message 901 is used to prompt the user to keep the appointment with Bob at the **** restaurant in Xi'an at 18:30 on March 14.

For example, the first control is HiBoard. The terminal may send the first prompt message at the predefined time by using HiBoard. It is assumed that the predefined time is 9:00 on March 14. The mobile phone 100 may display, on HiBoard at 9:00 on March 14, a first prompt message 902 shown in FIG. 9(b). The first prompt message 902 is used to prompt the user to keep the appointment with Bob at the **** restaurant in Xi'an at 18:30 on March 14.

For example, the first control is the widget (Widget). The terminal may send the first prompt message at the predefined time by using the widget. It is assumed that the predefined time is 9:00 on March 14. The mobile phone 100 may display, on the widget at 9:00 on March 14, a first prompt message 903 shown in FIG. 9(c). The first prompt message 903 is used to prompt the user to keep the appointment with Bob at the **** restaurant in Xi'an at 18:30 on March 14. Optionally, the widget is not limited to being displayed on HiBoard, and may be displayed on another home screen specified by the user.

S204. The terminal displays a second screen.

The second screen in this embodiment of this application may be any screen that may be displayed by the terminal. For example, the second screen may include a screen of any application in the terminal, a home screen of the terminal, and HiBoard of the terminal. For detailed content of the second screen, refer to the description of the first screen in the foregoing embodiment. Details are not described in this embodiment of this application.

S205. The terminal extracts second structured information from the second screen in response to the first operation performed by the user on the second screen.

The second structured information is used to instruct the user to perform a second task at a second address at a second time. For detailed content of the second structured information, refer to the description of the first structured information in the foregoing embodiment. Details are not described in this embodiment of this application.

S206a. When the first time and the second time have an intersection, and the first address is different from the second address, the terminal automatically changes the first time in the first prompt message, so that a changed first time and the second time have no intersection.

Figure 4A:
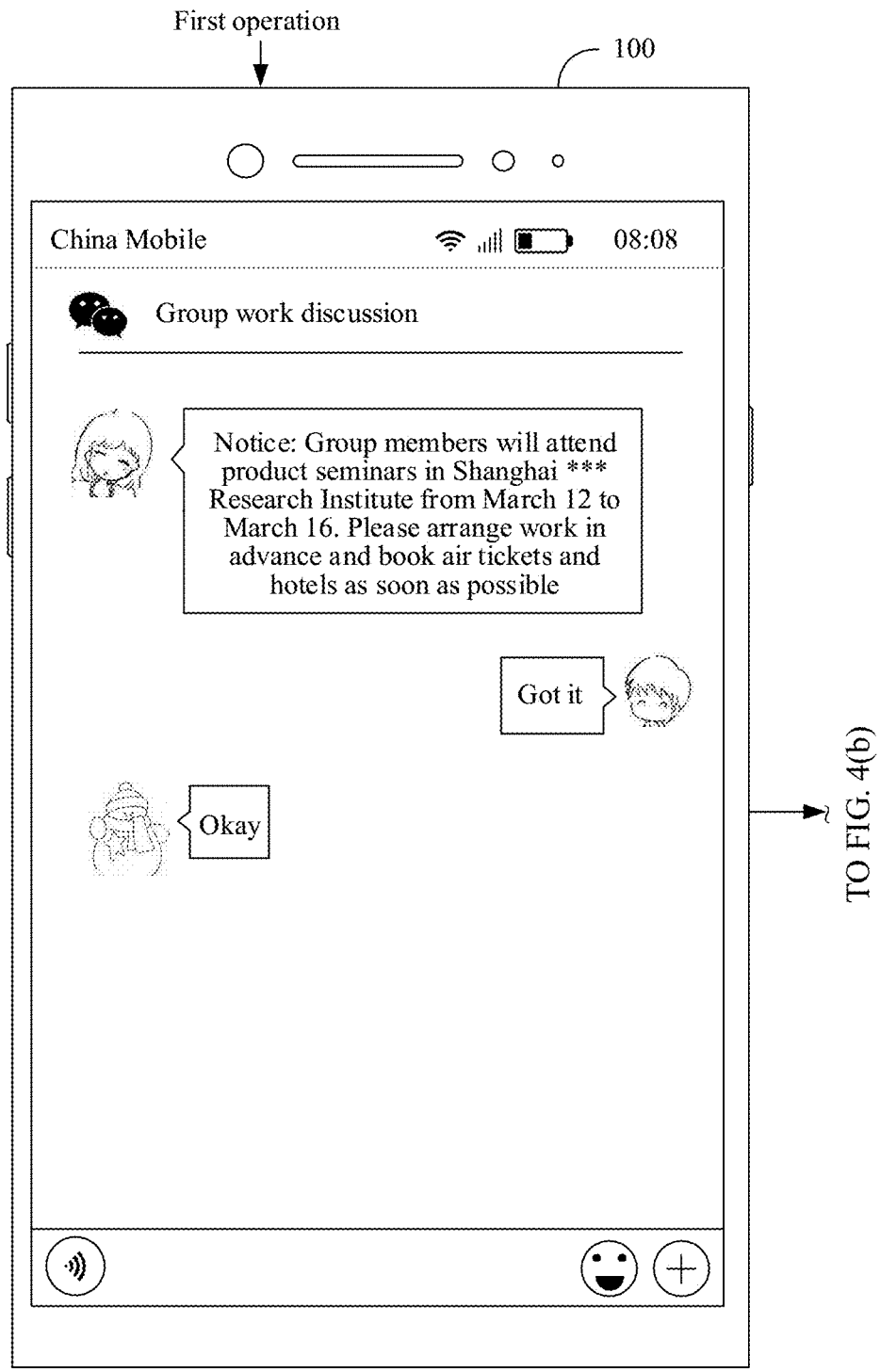
FIG. 4(a) and FIG. 4(b) are a schematic diagram 3 of an instance of a terminal screen according to an embodiment of this application.
Figure 4B:
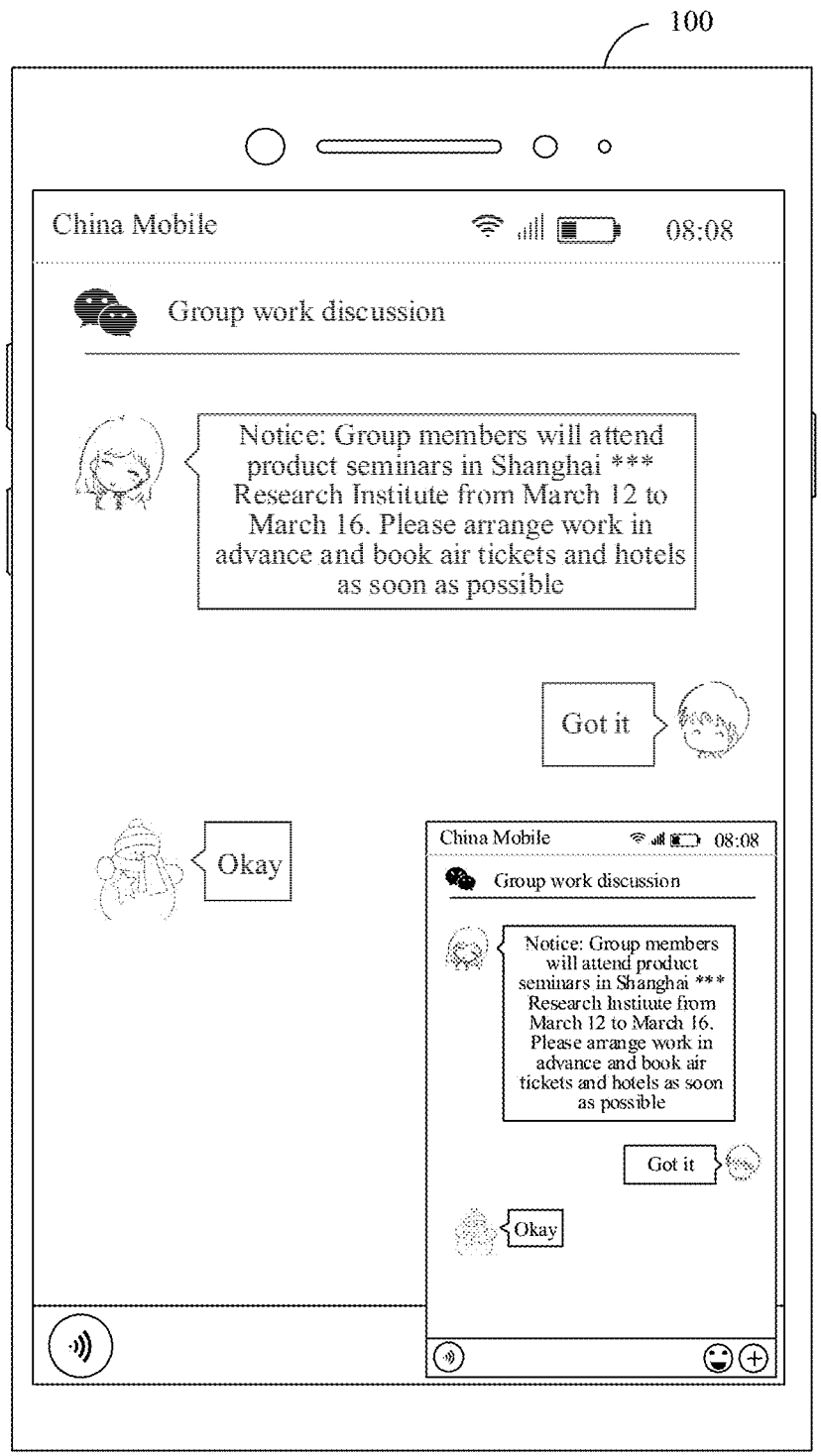

For example, the first screen is the messaging screen shown in FIG. 3A(a), and the second screen is the WeChat chat screen shown in FIG. 4(a). The first structured information is the structured information shown in FIG. 7A(b), the first time is March 8 to March 14, the first address is the locker 3 at the delivery station 6 in the third street in Xi'an, and the first task is to collect a package.

When the mobile phone 100 displays a second screen (a WeChat chat screen) shown in FIG. 10(a), the mobile phone 100 identifies content on the second screen in response to the first operation of the user, and extracts, from the second screen, structured information (namely, the second structured information) shown in FIG. 10(b). The structured information shown in FIG. 10(b) may include event information "business trip for a meeting", time information "March 12 to March 16", and address information "Shanghai * Research Institute". Optionally, the second structured information may further include other information. For example, the structured information shown in FIG. 10(b) may further include persons "member a, member b, and me". Based on the structured information shown in FIG. 10(b), as shown in FIG. 10(c), the terminal may determine that the second task is "go on a business trip for a meeting". To be specific, the second structured information is the structured information shown in FIG. 10(b), the second time is March 12 to March 16, the second address is Shanghai * Research Institute, and the second task is to go on a business trip for a meeting.

Figure 11:
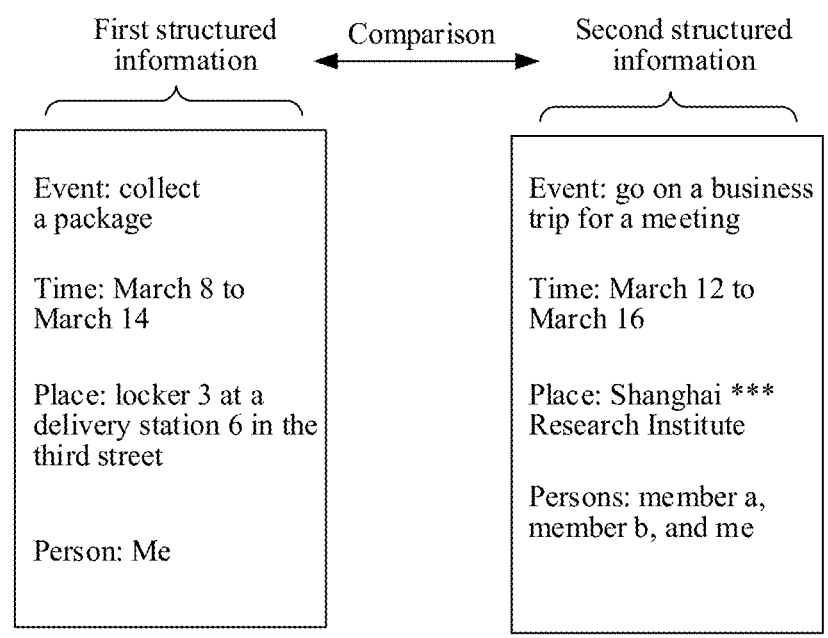
FIG. 11 is a schematic diagram of a comparison between first structured information and second structured information according to an embodiment of this application.
Figure 12:
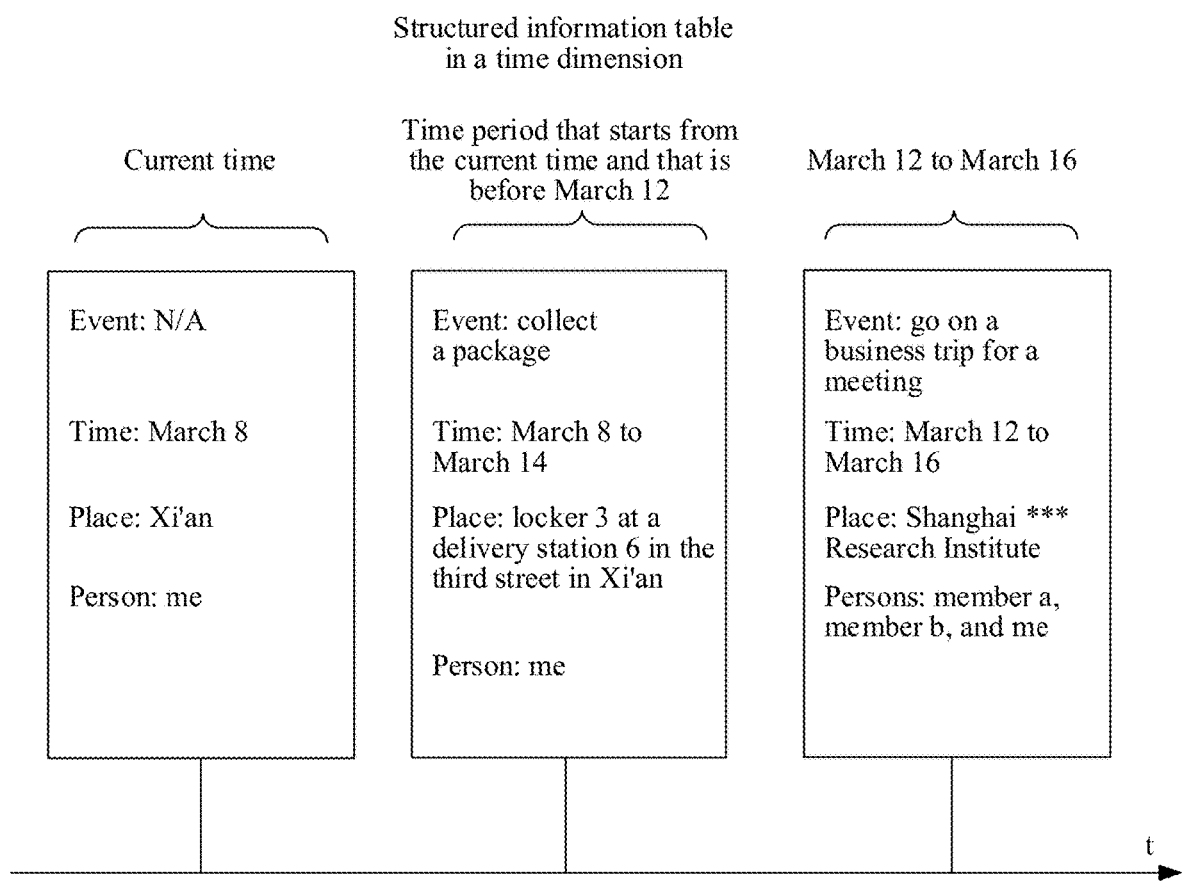
FIG. 12 is a schematic diagram of a structured information table in a time dimension according to an embodiment of this application.

The terminal may compare the first structured information, the second structured information, and current structured information to generate a structured information table in a time dimension, and then change the first time based on a time in the structured information table. In the current structured information, time information is a current time, address information is a current address of the terminal, event information may be null (for example, N/A), and a person may be "me". With reference to the foregoing instance, the mobile phone 100 may generate a structured information table in a time dimension that is shown in FIG. 12. As shown in FIG. 11, the terminal may compare the first structured information and the second structured information to learn that the first time "March 8 to March 14" and the second time "March 12 to March 16" have an intersection (March 12 to March 14), and the first address "locker 3 at a delivery station 6 in the third street in Xi'an" is different from the second address "Shanghai * Research Institute". In this case, if the user goes on a business trip in Shanghai from "March 12 to March 16" (including March 12 and March 16), the user cannot perform the first task "collect a package" at the intersection "March 12 to March 14" of the first time "March 8 to March 14" and the second time "March 12 to March 16". However, the user can still perform the first task "collect a package" during "March 8 to March 11". Therefore, in the structured information table in the time dimension that is shown in FIG. 12, the user sequentially performs the first task and the second task in a time sequence, and an arrangement that does not cause a time conflict of performing the first task and the second task is as follows: The user may collect the package in the locker 3 at the delivery station 6 in the third street in Xi'an in a time period that starts from the current time and that is before March 12, and the user goes on the business trip for the meeting in Shanghai * Research Institute in the time period from March 12 to March 16. Therefore, the mobile phone 100 may automatically change the first time "March 8 to March 14" in the first prompt message to "March 8 to March 11", so that the changed first time "March 8 to March 11" and the second time "March 12 to March 16" have no intersection.

Figure 13A:
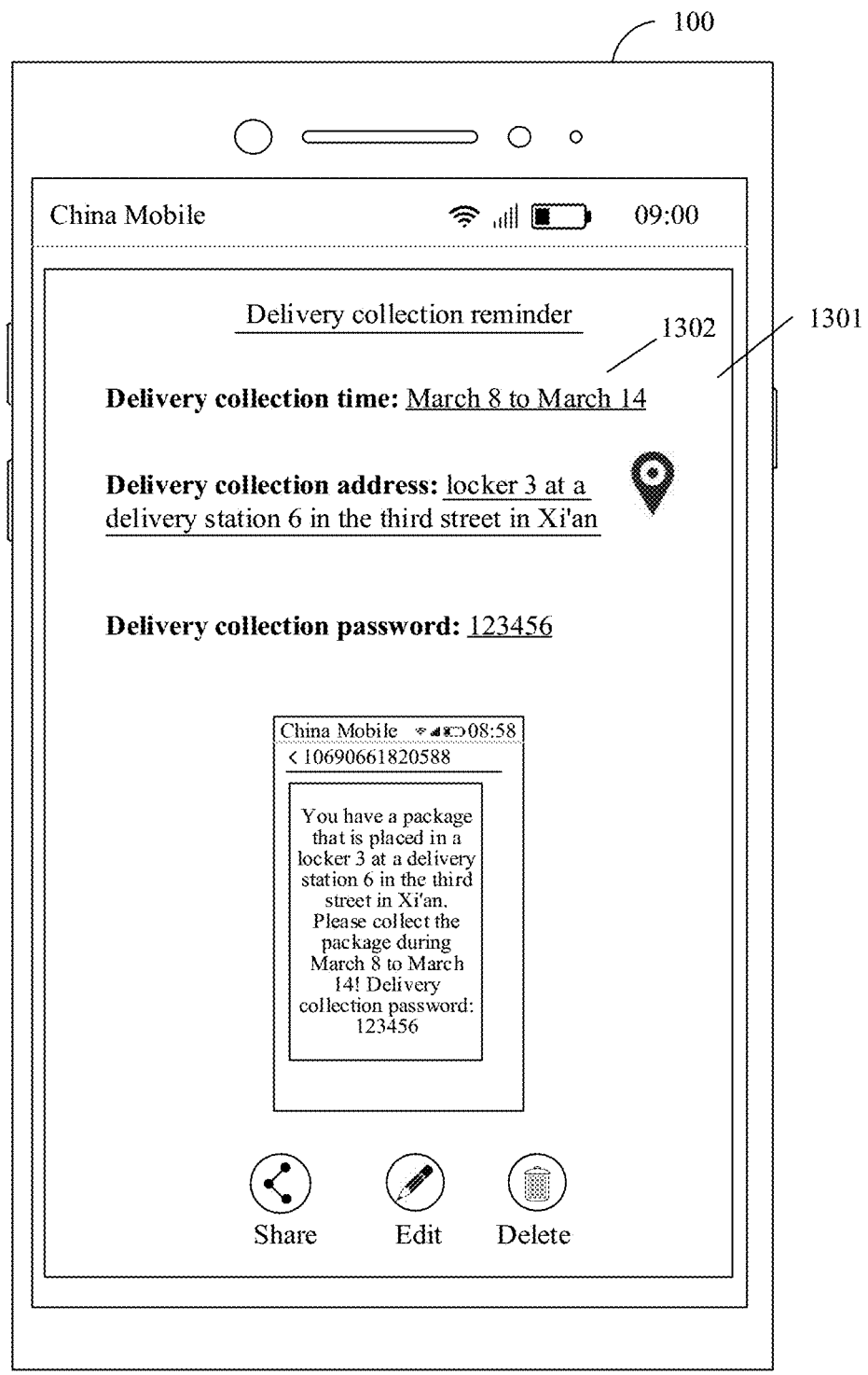
FIG. 13(a), FIG. 13(b), and FIG. 13(c) are a schematic diagram 8 of an instance of a terminal screen according to an embodiment of this application.
Figure 13B:
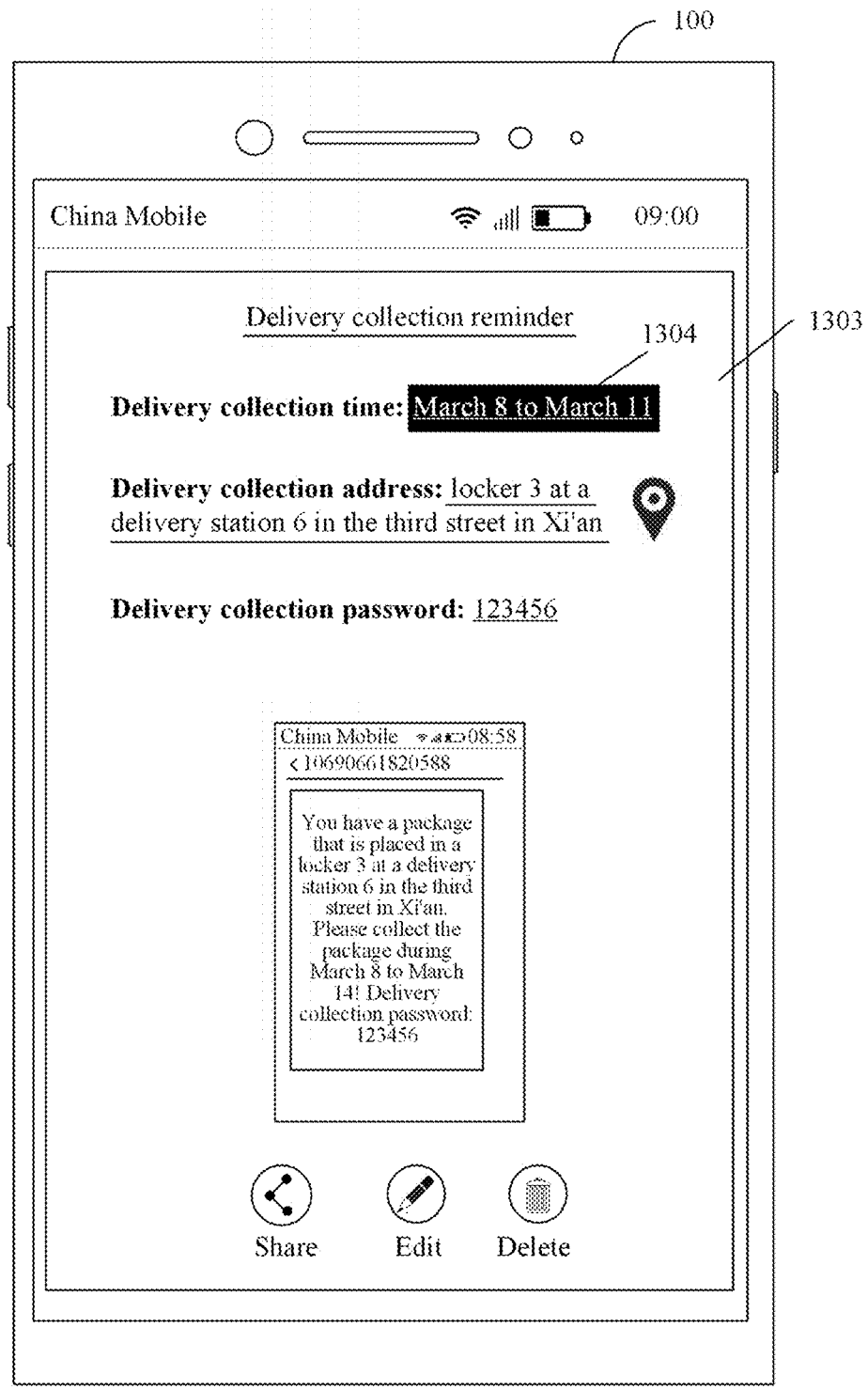

It may be understood that after the terminal automatically changes the first time in the first prompt message, the first prompt message sent by the terminal changes. For example, the first time in the first prompt message changes. For example, the first prompt message sent by the mobile phone 100 before the mobile phone 100 changes the first time may be a delivery collection reminder 1301 shown in FIG. 13(a) (namely, a delivery collection reminder shown on the third screen 802 shown in FIG. 8(c)). A first time in the delivery collection reminder 1301 shown in FIG. 13(a) is "March 8 to March 14" 1302. After the first time is changed, the first prompt message sent by the mobile phone 100 may be a delivery collection reminder 1303 shown in FIG. 13(b). A changed first time in the delivery collection reminder 1303 shown in FIG. 13(b) is "March 8 to March 11" 1304. Optionally, the changed first time "March 8 to March 11" 1304 may be displayed in FIG. 13(b) in a form of white characters on a black background, to remind the user that the time is the changed time. Optionally, a change reason (for example, the time is changed due to a conflict with the trip in which the user goes on the business trip for the meeting in Shanghai *** Research Institute in the time period from March 12 to March 16) may be further indicated in the prompt message, so that the user learns more clearly that the time in the prompt message is changed, and learns of the change reason more clearly, to provide the user with more information, improve user experience, and improve interaction intelligence and interaction efficiency.

It should be noted that in this embodiment of this application, the first time is a moment, and the second time is a moment. Alternatively, the first time is a time period, and the second time is a moment. Alternatively, the first time is a time period, and the second time is a time period. Alternatively, the first time is a moment, and the second time is a time period.

When both the first time and the second time are moments, that the first time and the second time have an intersection may specifically include the following cases (1) and (2):

(1) The first time is the same as the second time. For example, assuming that the first time is 10:00 on March 8, and the second time is 10:00 on March 8, the terminal may determine that the first time is the same as the second time, and the first time and the second time have an intersection.

(2) A time difference between the first time and the second time falls within a preset time range. The preset time range may be k minutes (k is greater than 0, for example, k=5), n hours (n is greater than 0, for example, n=1), m days (m is greater than 0, for example, m=1), or the like. For example, it is assumed that the preset time range is one hour, the first time is 10:00 on March 8, and the second time is 10:35 on March 8. A time difference between the first time "10:00 on March 8" and the second time "10:35 on March 8" is 35 minutes, and falls within the preset time range (namely, one hour), and therefore, the terminal may determine that the first time and the second time have an intersection.

When the first time is a time period, and the second time is a moment, that the first time and the second time have an intersection may specifically include the following cases (3) and (4):

(3) The second time is included in the first time. For example, it is assumed that the first time is March 8, and the second time is 10:00 on March 8. Herein, 10:00 on March 8 is included in the time period March 8. Therefore, the terminal may determine that the first time and the second time have an intersection.

(4) The second time is not included in the first time, but a time difference between the second time and a critical moment of the first time (the time period) falls within a preset time range. For example, it is assumed that the second time is 20:00 on March 8, the first time is March 9, and the preset time range is one day. Critical moments of the first time are 0:00 on March 9 and 24:00 on March 9. A time difference between the second time "20:00 on March 8" and the critical moment "0:00 on March 9" of the first time is four hours, and falls within the preset time range (namely, one day), and therefore, the terminal may determine that the first time and the second time have an intersection.

It should be noted that in the foregoing case (4), if a time difference between the second time and any critical moment of the first time falls within the preset time range, the terminal may determine that the first time and the second time have an intersection.

When the first time is a moment, and the second time is a time period, for a specific description that the first time and the second time have an intersection, refer to the foregoing cases (3) and (4). Details are not described in this embodiment of this application.

When both the first time and the second time are time periods, that the first time and the second time have an intersection may specifically include the following cases (5) and (6):

(5) The first time and the second time have an overlapped period. For example, it is assumed that the first time is March 8 to March 12, and the second time is March 12 to March 16. March 8 to March 12 and March 12 to March 16 have an overlapped period March 12. Therefore, the terminal may determine that the first time and the second time have an intersection.

(6) A time difference between any critical moment of the first time and any critical moment of the second time falls within a preset time range. For example, it is assumed that the first time is 10:00 on March 8 to 14:00 on March 10, the second time is March 11 to March 16, and the preset time range is one day. Critical moments of the first time "10:00 on March 8 to 14:00 on March 10" are "10:00 on March 8" and "14:00 on March 10", and critical moments of the second time "March 11 to March 16" are "March 11" and "March 16". A time difference between the critical moment "14:00 on March 10" of the first time "10:00 to 14:00 on March 10" and the critical moment "March 11" of the second time "March 11 to March 16" is 10 hours, and falls within the preset time range (namely, one day), and therefore, the terminal may determine that the first time and the second time have an intersection.

In this embodiment of this application, that the first address is different from the second address may include at least the following five cases: (a) A distance between the first address and the second address is greater than a preset distance threshold; (b) the first address and the second address are in different cities; (c) the first address and the second address are in different areas (namely, urban areas) of a same city; (d) the first address and the second address are in different provinces; or (e) the first address and the second address are in different countries or regions.

According to the information processing method provided in this embodiment of this application, the terminal may extract the first structured information from the first screen in response to the first operation of the user, and generates the first prompt message based on the first structured information. The first prompt message is used to remind the user to perform the first task at the first address at the first time. The terminal may further extract the second structured information from the second screen in response to the first operation of the user. The second structured information is used to instruct the user to perform the second task at the second address at the second time. When the first time and the second time have the intersection, and the first address is different from the second address, the terminal may automatically change the first time in the first prompt message, so that the changed first time and the second time have no intersection.

Therefore, the terminal may remind, by using the first prompt message, the user to perform the first task at the changed first time. In this way, if the user performs the first task at the changed first time, a case in which the user cannot perform the first task because the time of performing the first task and the time of performing the second task have the intersection and the addresses are different can be avoided, to avoid a conflict when the user performs the first task and the second task.

Figure 14A:
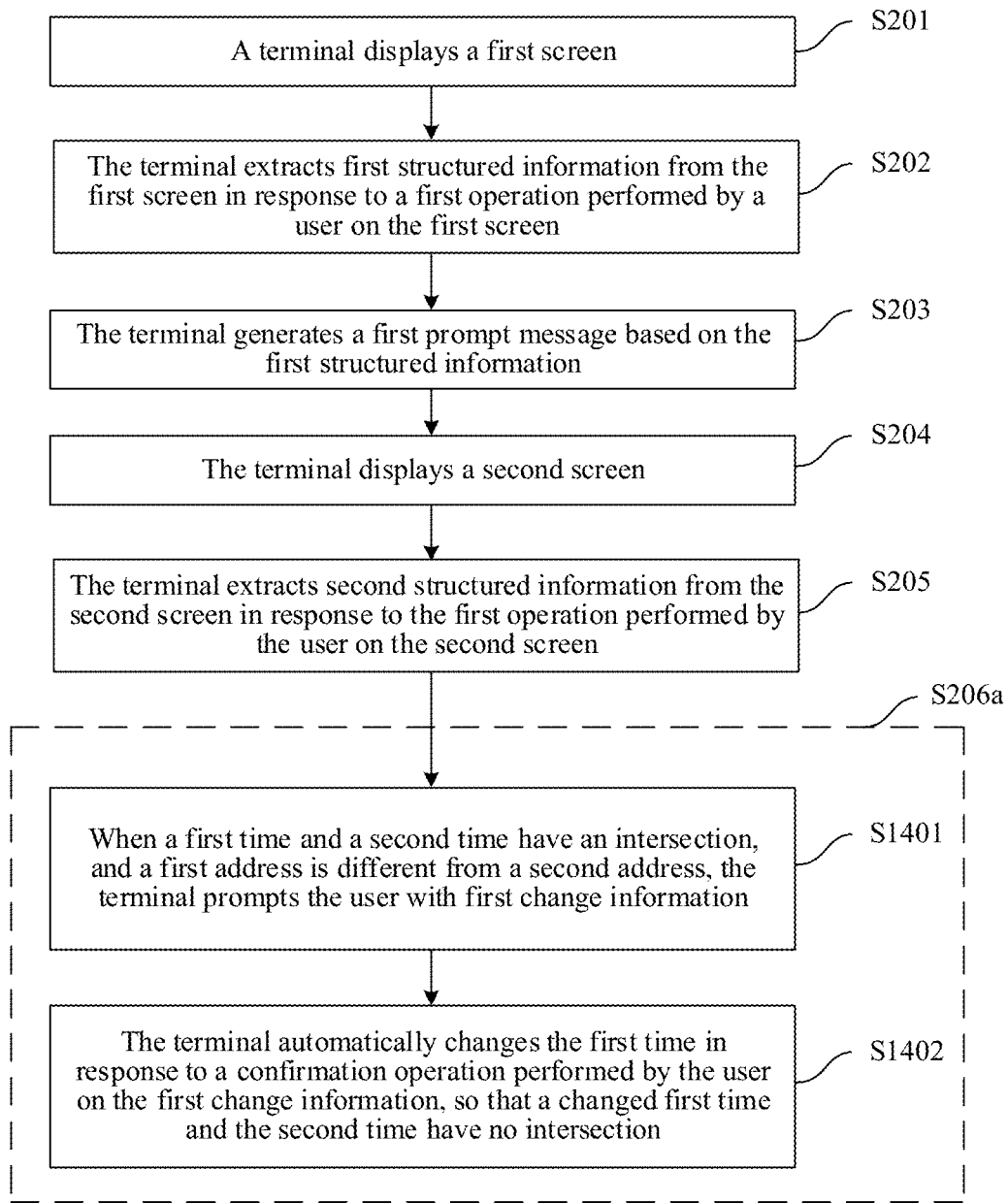
FIG. 14A is a flowchart 2 of an information processing method according to an embodiment of this application.

The terminal may change the first time after obtaining consent from the user. Specifically, as shown in FIG. 14A, S206a may include S1401 and S1402.

S1401. When the first time and the second time have an intersection, and the first address is different from the second address, the terminal prompts the user with first change information.

When the terminal obtains the second structured information, and determines that the first time and the second time have the intersection, and the first address is different from the second address, the terminal may prompt the user with the first change information regardless of a specific screen currently displayed on the terminal. The terminal may prompt the user with the first change information by using a widget (Widget), a notification bar, a pop-up box, or another manner. For example, the mobile phone 100 prompts the user with the first change information by using the widget. It is assumed that the mobile phone 100 currently displays a home screen. When the mobile phone 100 obtains the second structured information, and determines that the first time and the second time have the intersection, and the first address is different from the second address, the mobile phone 100 may display a widget 1401 shown in FIG. 14B(a). The widget 1401 includes the first change information. The first change information is used to indicate that the first time in the first prompt message is to be changed, and the changed first time and the second time have no intersection. For example, the first change information may be "The mobile phone will modify a delivery collection reminder time from March 8-March 14 to March 8-March 11. Please confirm!". The widget 1401 may further include an "Agree" key and a "Do not agree" key. The change information may further include a change reason shown in FIG. 14B(a) and FIG. 14B(b). The mobile phone 100 may automatically change the first time in response to a tap operation performed by the user on the "Agree" key, so that the changed first time and the second time have no intersection. The mobile phone 100 does not need to change the first time in response to a tap operation performed by the user on the "Do not agree" key. The "Agree" key may alternatively be an "OK" key, a "Yes" key, or another function option used to instruct the user of the mobile phone 100 to agree to modify the first time. The "Do not agree" key may alternatively be a "Cancel" key, a "No" key, or another function option used to instruct the user of the mobile phone 100 to disagree to modify the first time.

S1402. The terminal automatically changes the first time in response to a confirmation operation performed by the user on the first change information, so that the changed first time and the second time have no intersection.

The confirmation operation performed by the user on the first change information may be a selection operation performed by the user on the "Agree" key, the "OK" key, the "Yes" key, or the another function option used to instruct the user of the terminal to agree to modify the first time. Alternatively, the confirmation operation performed by the user on the first change information may be a preset gesture entered by the user for the first change information. For a specific method for automatically changing the first time by the terminal in S1402, refer to the detailed description of S206a in this embodiment of this application. Details are not described again in this embodiment of this application.

Figure 14B:
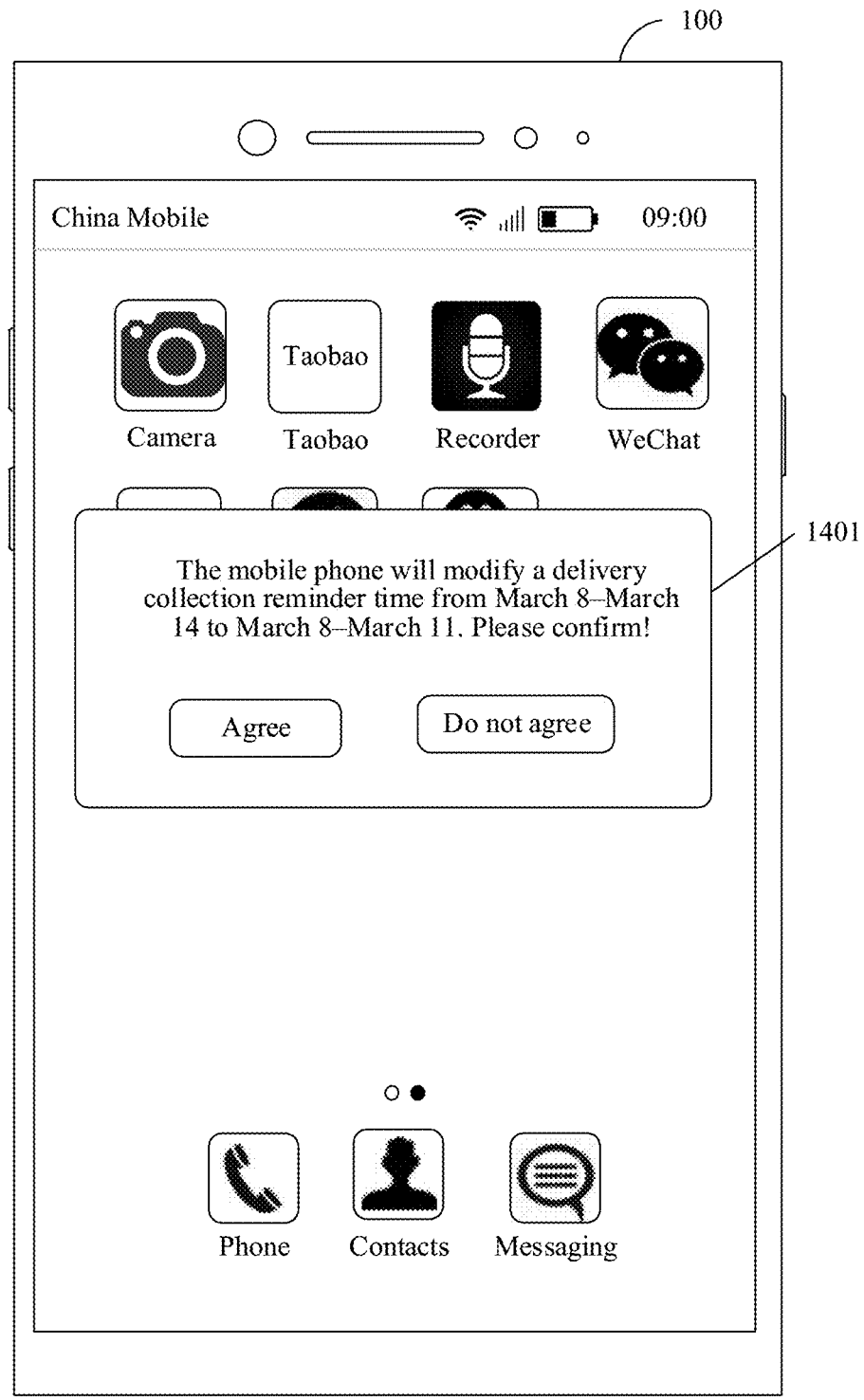
FIG. 14B(a) and FIG. 14B(b) are a schematic diagram 9 of an instance of a terminal screen according to an embodiment of this application.
Figure 14B:
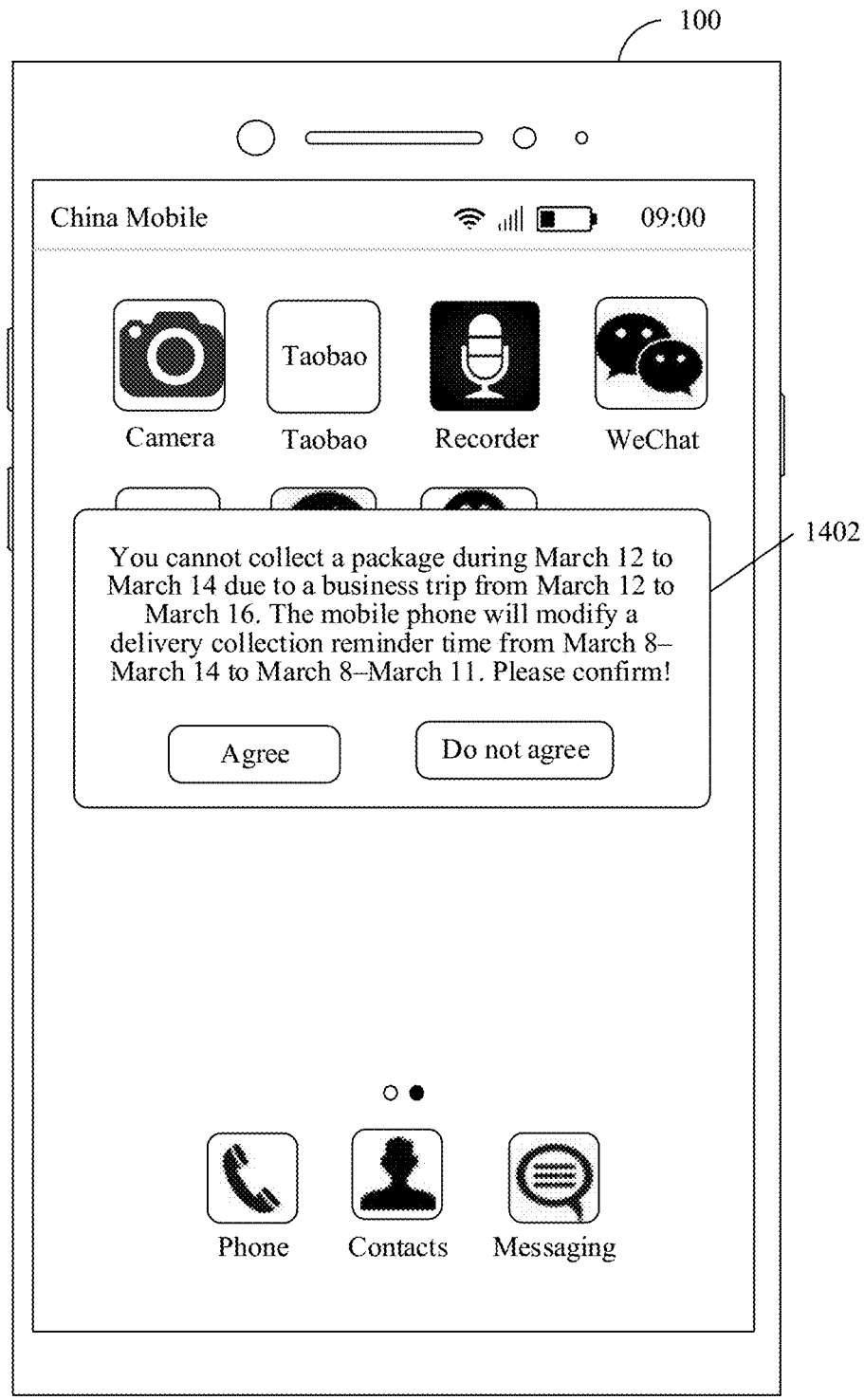

For example, the mobile phone 100 may receive a selection operation performed by the user on an "Agree" key shown in FIG. 14B(a) or FIG. 14B(b), and automatically change the first time, so that the changed first time and the second time have no intersection.

Figure 14C:
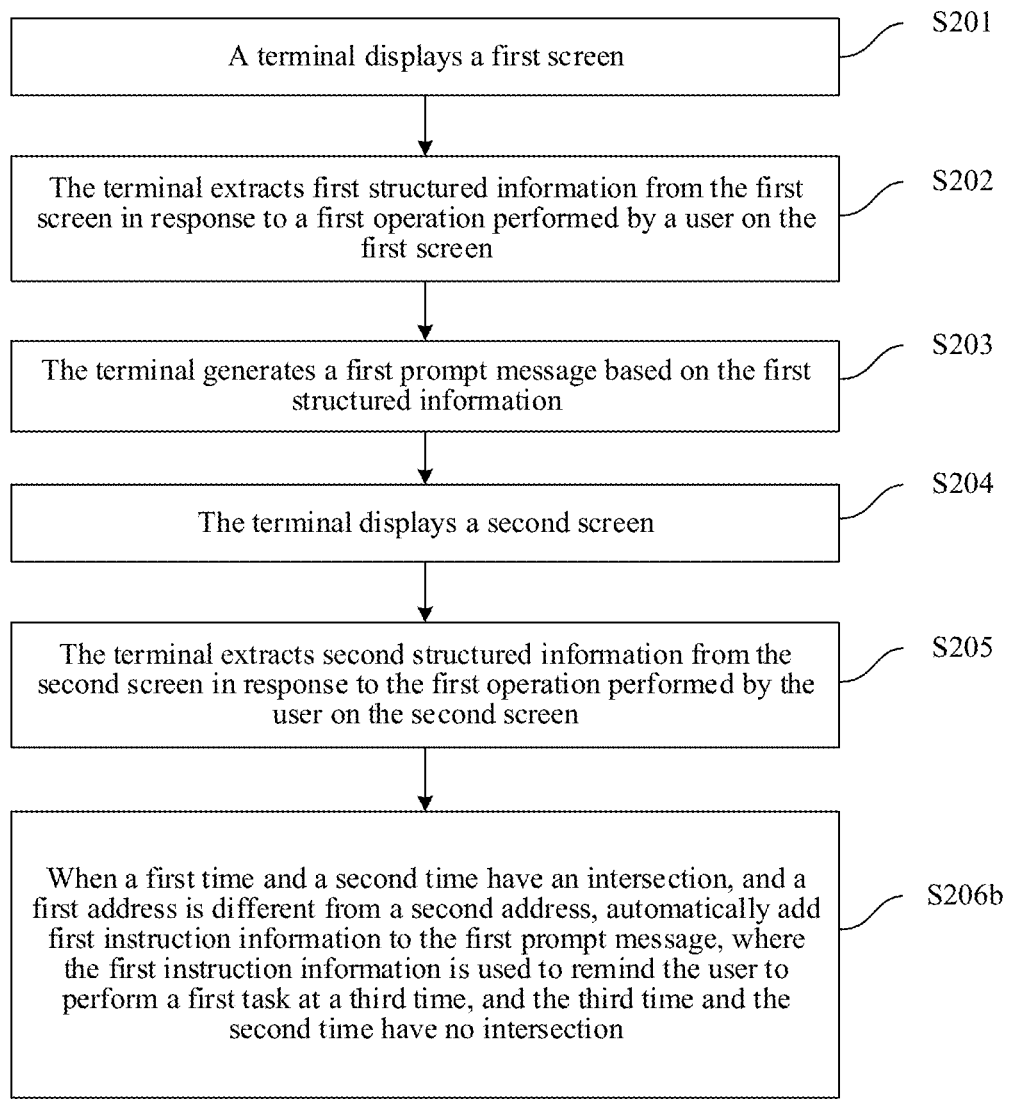
FIG. 14C is a flowchart 3 of an information processing method according to an embodiment of this application.

In a second application scenario in the embodiments of this application, an embodiment of this application provides an information processing method. As shown in FIG. 14C, the information processing method includes S201 to S205 and S206b.

S206b. When the first time and the second time have an intersection, and the first address is different from the second address, automatically add first instruction information to the first prompt message, where the first instruction information is used to remind the user to perform the first task at a third time, and the third time and the second time have no intersection.

For S201 to S205 in the second application scenario, refer to the detailed descriptions in the first application scenario. Details are not described again in this embodiment of this application.

For example, the first screen is the messaging screen shown in FIG. 3A(a), and the second screen is the WeChat chat screen shown in FIG. 4(a). The first structured information is the structured information shown in FIG. 7A(b), the first time is March 8 to March 14, the first address is the locker 3 at the delivery station 6 in the third street in Xi'an, and the first task is to collect a package. The second structured information is the structured information shown in FIG. 10(b), the second time is March 12 to March 16, the second address is Shanghai *** Research Institute, and the second task is to go on a business trip for a meeting.

The first time "March 8 to March 14" and the second time "March 12 to March 16" have an intersection, and the first address "locker 3 at the delivery station 6 in the third street in Xi'an" is different from the second address "Shanghai *** Research Institute". In this case, if the user goes on a business trip in Shanghai from "March 12 to March 16", the user cannot perform the first task "collect a package" at the intersection "March 12 to March 14" of the first time "March 8 to March 14" and the second time "March 12 to March 16". However, the user can still perform the first task "collect a package" during "March 8 to March 11". Based on this, in the second application scenario in this application, the terminal may add the first instruction information to the first prompt message. The first instruction information is used to remind the user to perform the first task at the third time (for example, during March 8 to March 11), and the third time and the second time have no intersection.

Figure 13C:
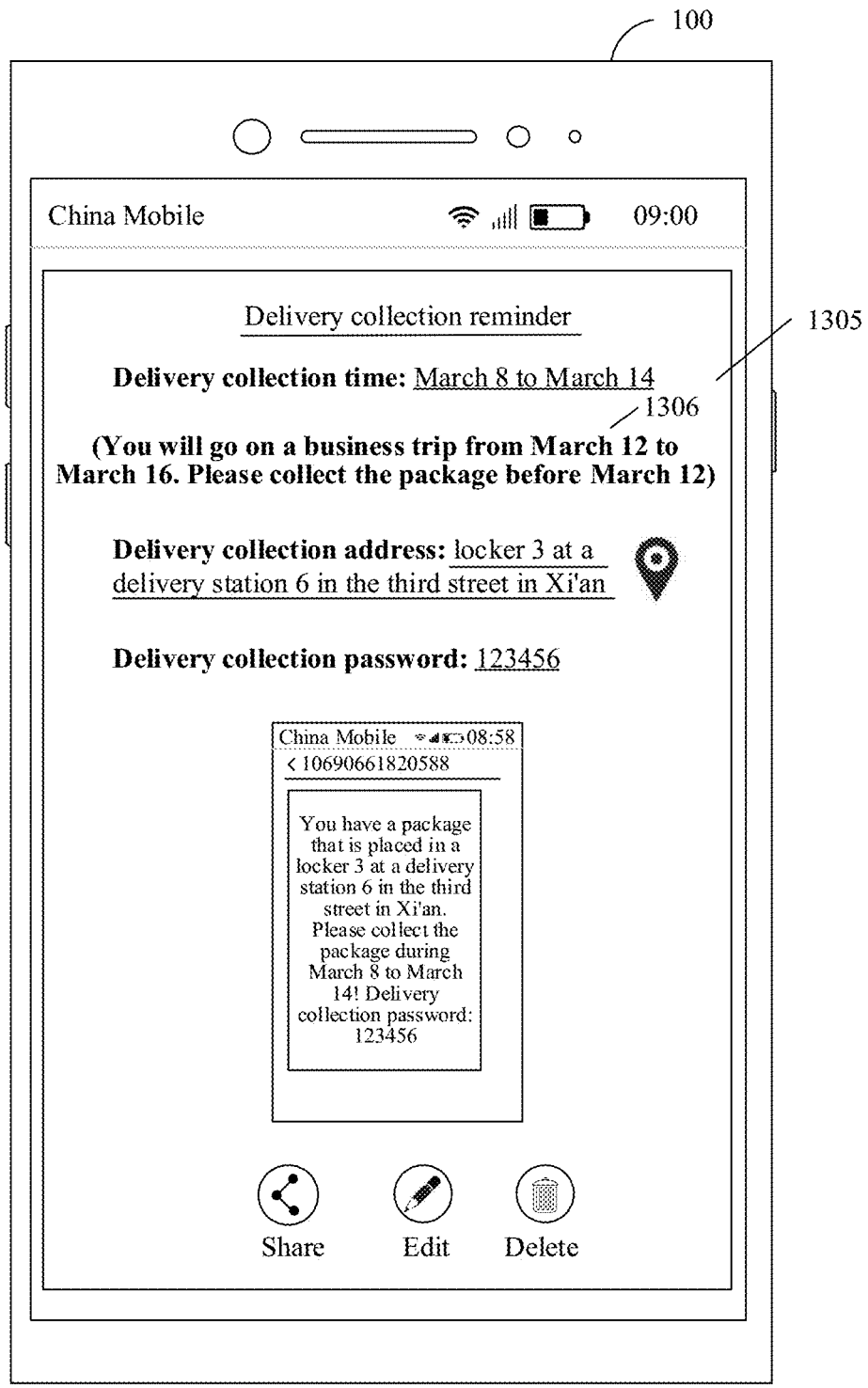

For example, the first prompt message sent by the mobile phone 100 may be a delivery collection reminder 1305 shown in FIG. 13(c). The delivery collection reminder 1305 shown in FIG. 13(c) includes first instruction information "You will go on a business trip from March 12 to March 16. Please collect the package before March 12" 1306. It may be understood that the first instruction information is added to the first prompt message, so that the user can be prompted to perform the first task at a time that has no intersection with the second time, and can be notified of a reason for changing the time of performing the first task, to improve user experience.

For example, the first screen is the messaging screen shown in FIG. 3B(a), and the second screen is the WeChat chat screen shown in FIG. 4(a). The first structured information is the structured information shown in FIG. 7B(b), the first time is "18:30 on March 14", the first address is "** restaurant in Xi'an", and the first task is "appointment". The second structured information is the structured information shown in FIG. 10(b), the second time is March 12 to March 16, the second address is Shanghai * Research Institute, and the second task is to go on a business trip for a meeting.

The first time "18:30 on March 14" and the second time "March 12 to March 16" have an intersection, and the first address "** restaurant in Xi'an" is different from the second address "Shanghai * Research Institute". In this case, if the user goes on a business trip in Shanghai from "March 12 to March 16", the user cannot perform the first task "appointment" at the intersection "18:30 on March 14" of the first time "18:30 on March 14" and the second time "March 12 to March 16". Therefore, the terminal needs to remind the user that the task cannot be completed or remind the user to reschedule the appointment.

Figure 9A:
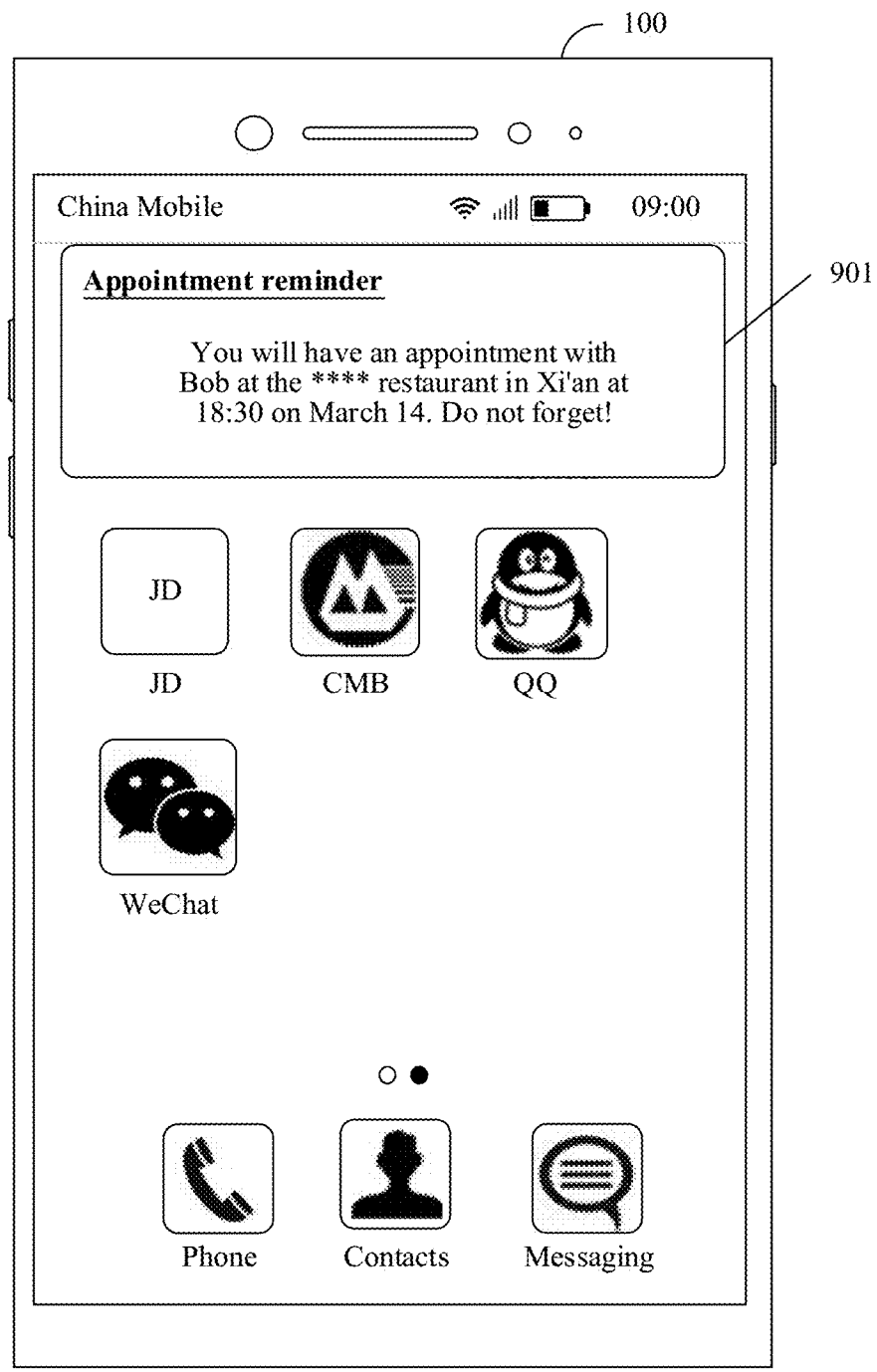
FIG. 9(a), FIG. 9(b), and FIG. 9(c) are a schematic diagram 7 of an instance of a terminal screen according to an embodiment of this application.
Figure 15A:
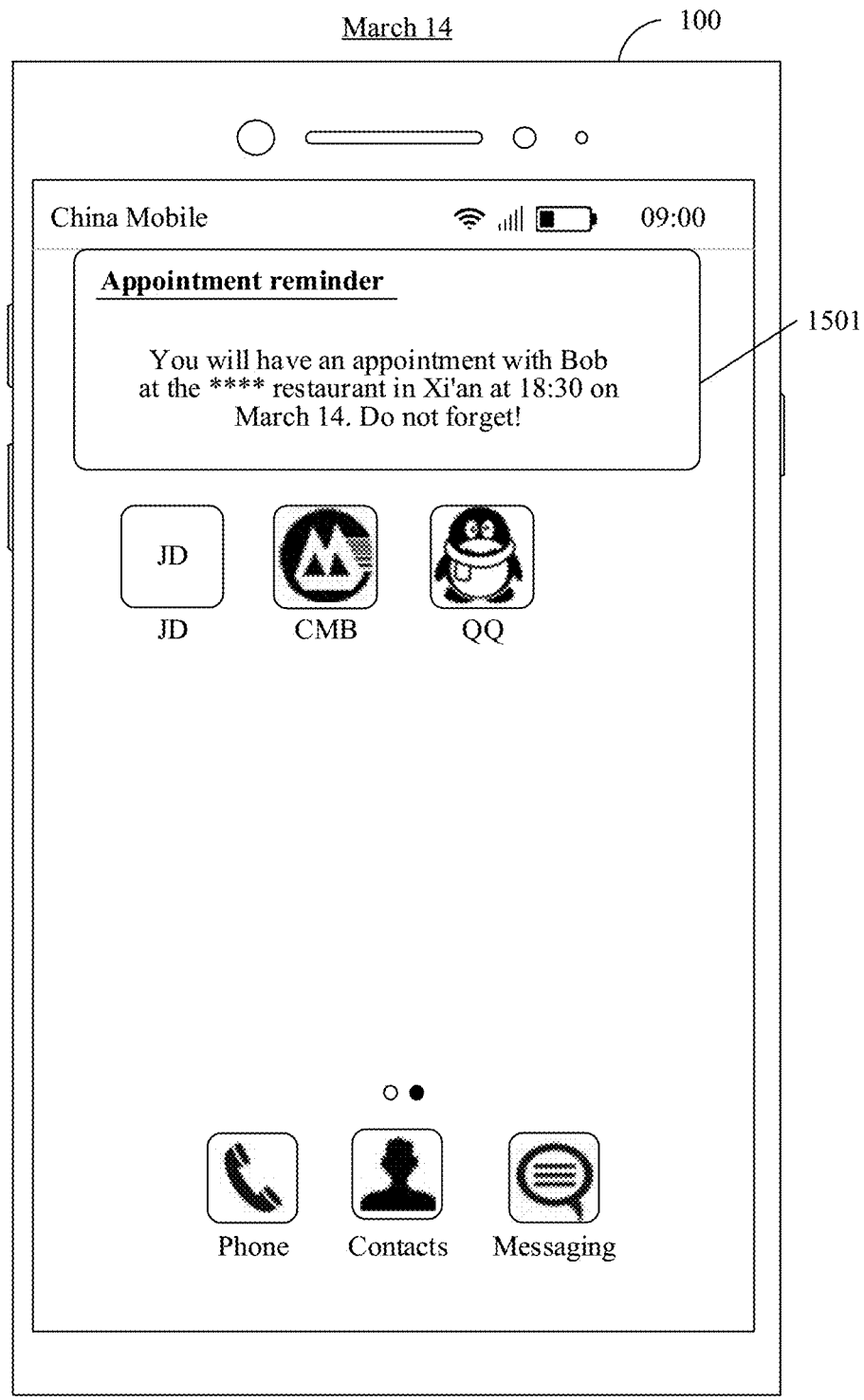
FIG. 15(a), FIG. 15(b), and FIG. 15(c) are a schematic diagram 10 of an instance of a terminal screen according to an embodiment of this application.
Figure 15B:
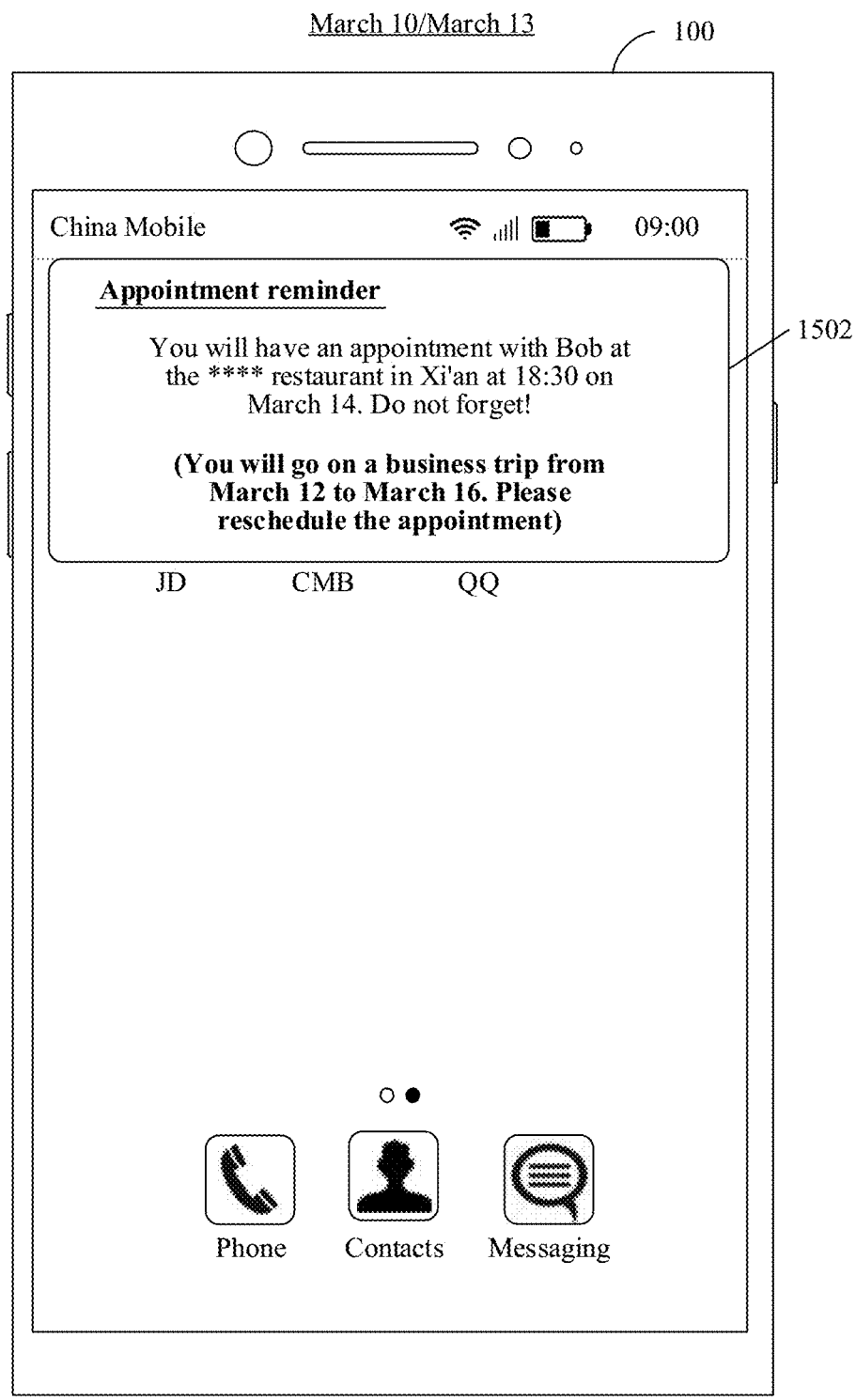

For example, it is assumed that before performing S206b, the mobile phone 100 sends, on March 14, an appointment reminder 1501 (namely, the first prompt message) shown in FIG. 15(a), namely, the appointment reminder 901 shown in FIG. 9(a). After performing S206b, the mobile phone 100 may send, before the first time "18:30 on March 14" (for example, on March 13), an appointment reminder 1502 (namely, the first prompt message) shown in FIG. 15(b). Alternatively, after performing S206b, the mobile phone may send, before "18:30 on March 14" and the second time "March 12 to March 16" (for example, on March 10), an appointment reminder 1502 (namely, the first prompt message) shown in FIG. 15(b). The appointment reminder 1502 includes first instruction information "You will go on a business trip from March 12 to March 16. Please reschedule the appointment".

Figure 9B:
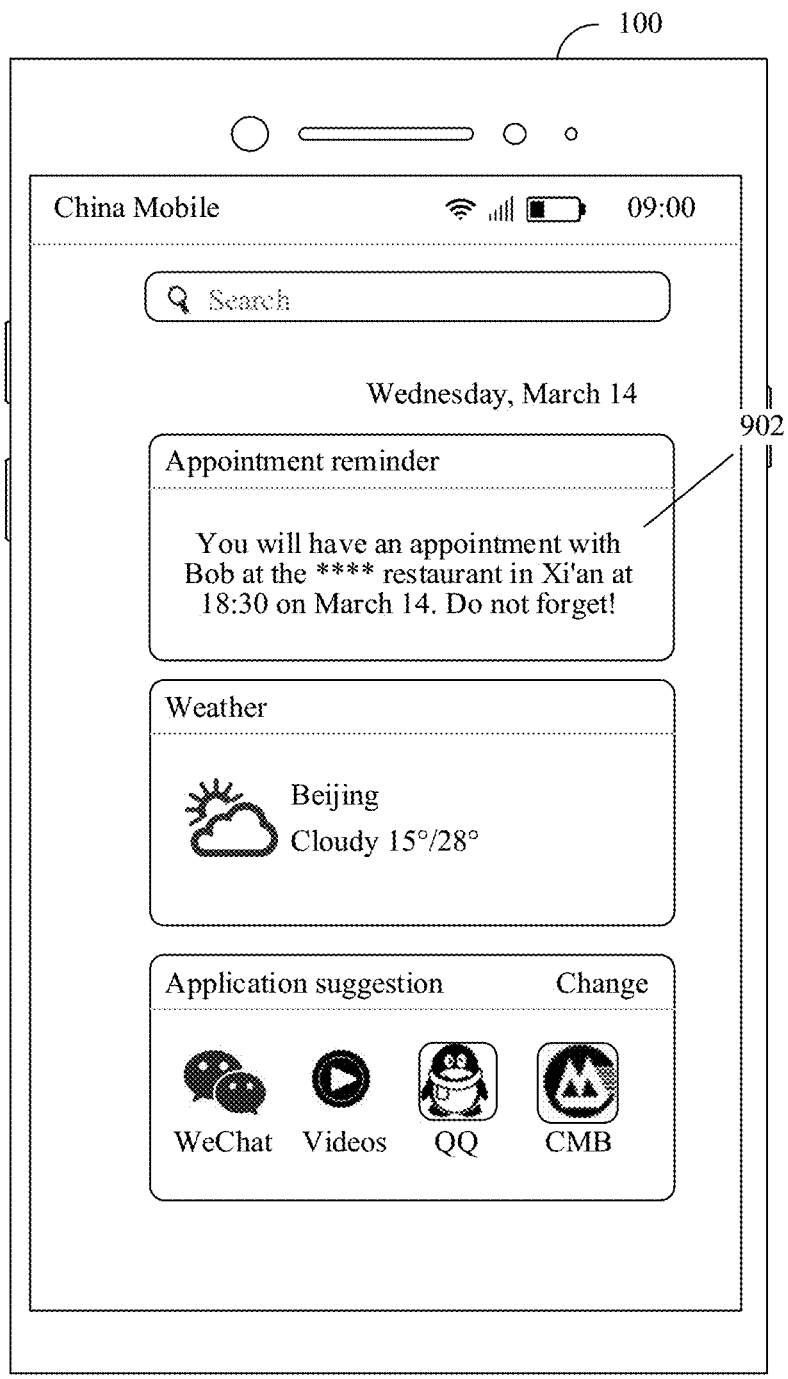
Figure 9C:
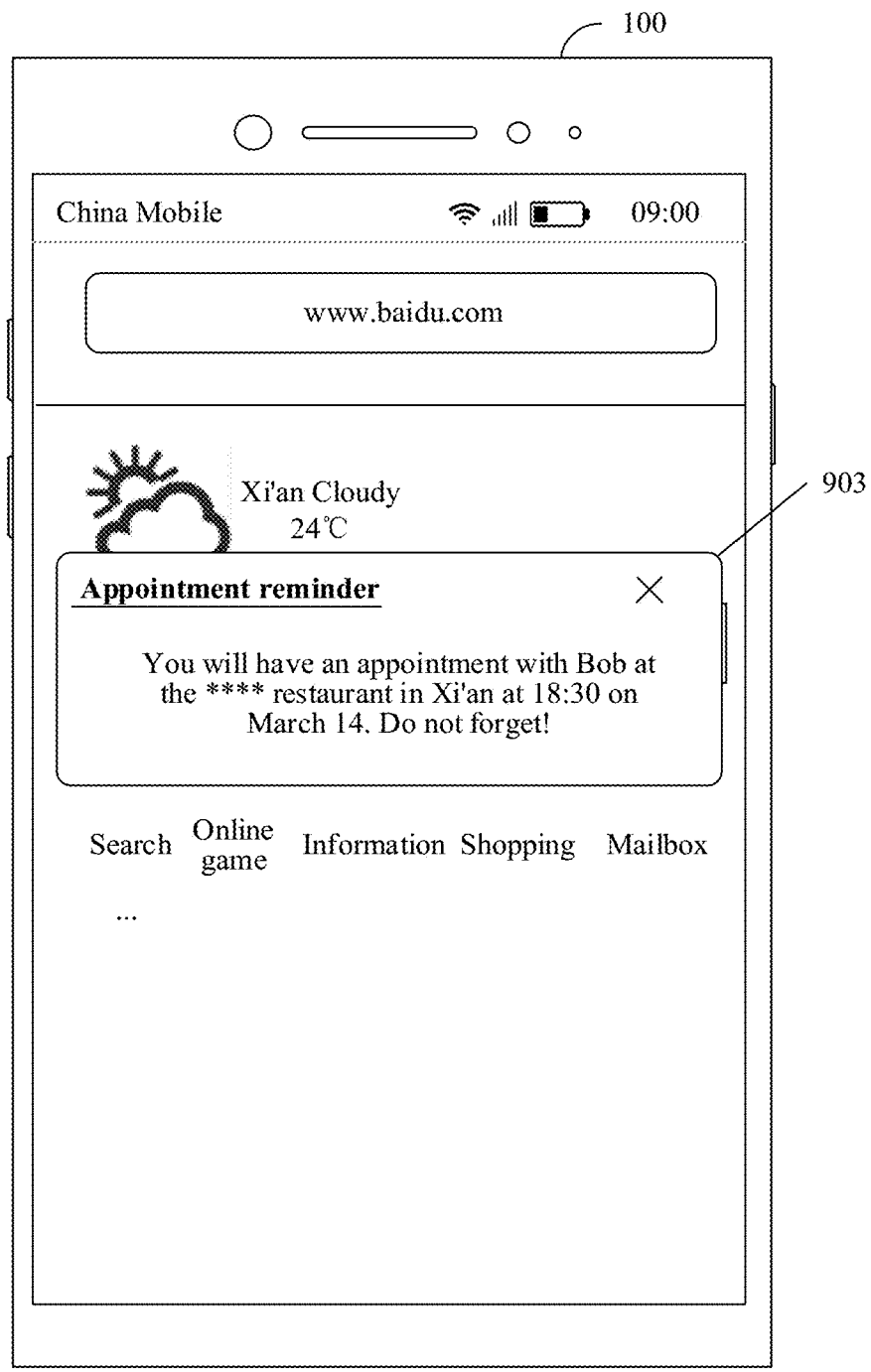
Figure 16A:
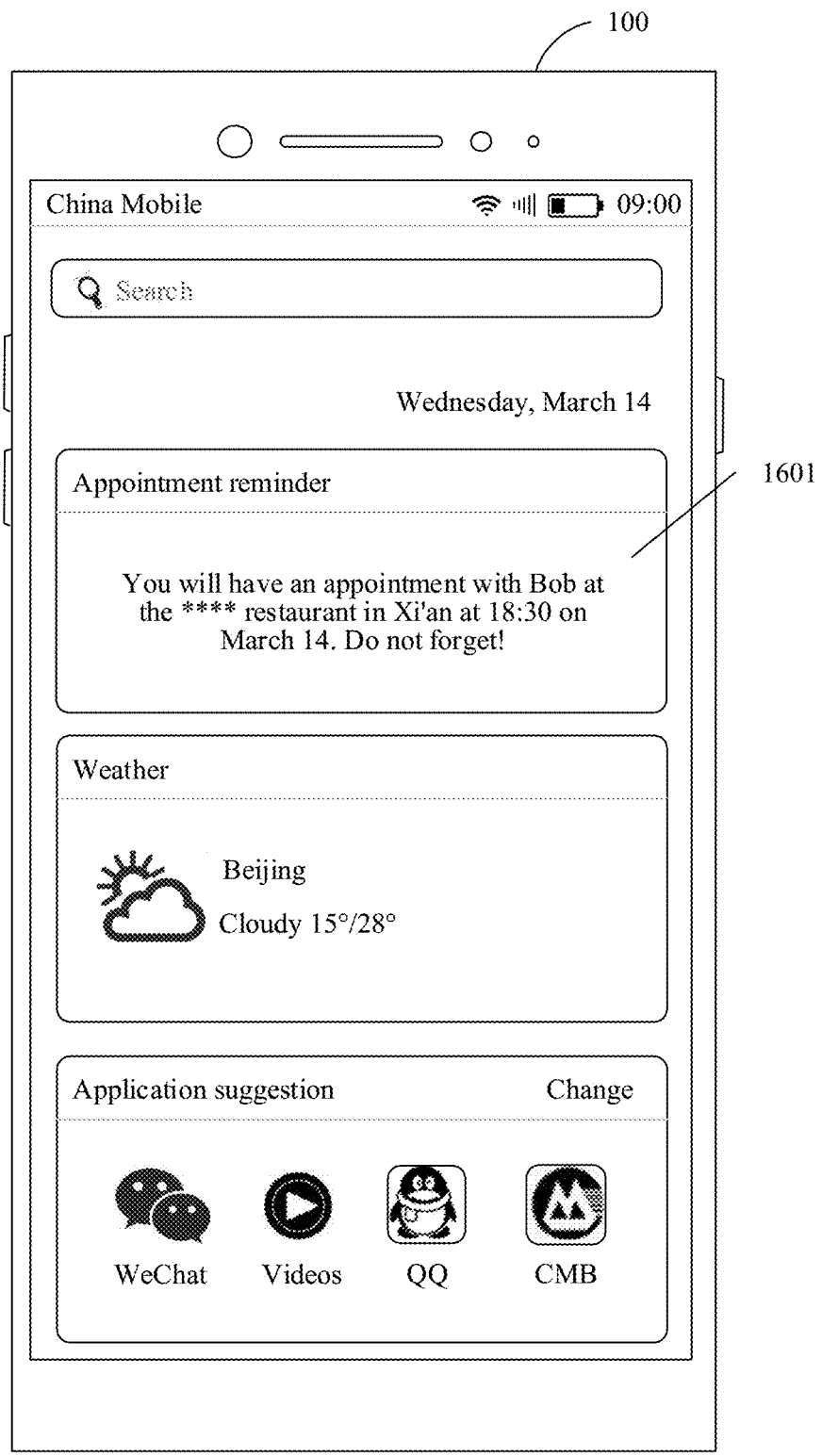
FIG. 16(a), FIG. 16(b), and FIG. 16(c) are a schematic diagram 11 of an instance of a terminal screen according to an embodiment of this application.
Figure 16B:
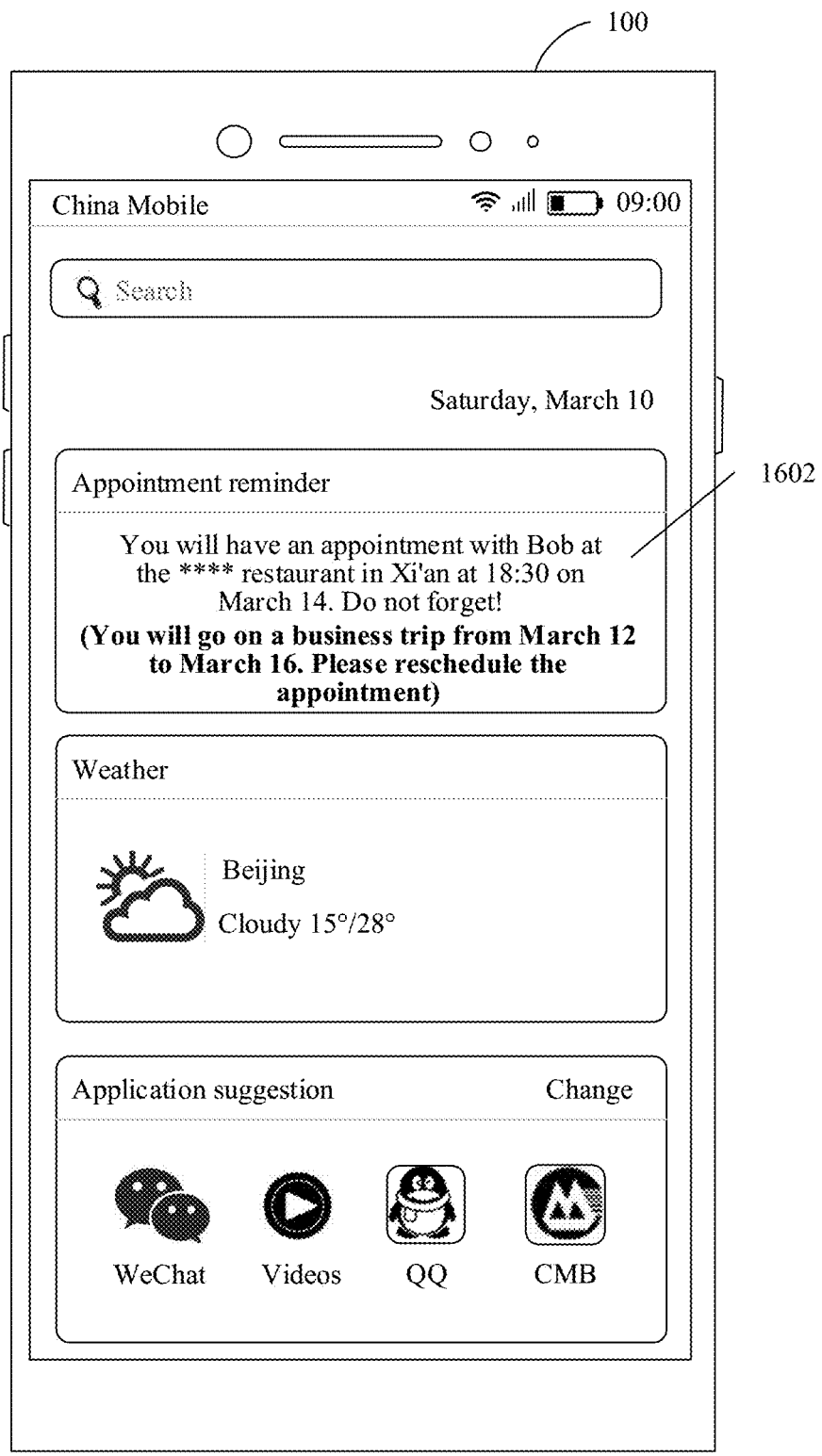

For example, it is assumed that before performing S206b, the mobile phone 100 sends, on March 14, an appointment reminder 1601 (namely, the first prompt message) shown in FIG. 16(a), namely, the appointment reminder 902 shown in FIG. 9(b). After performing S206b, the mobile phone 100 may send, before the first time "18:30 on March 14" (for example, on March 13) or before "18:30 on March 14" and the second time "March 12 to March 16" (for example, on March 10), an appointment reminder 1602 (namely, the first prompt message) shown in FIG. 16(b). The appointment reminder 1602 includes first instruction information "You will go on a business trip from March 12 to March 16. Please reschedule the appointment".

It may be understood that the first instruction information is added to the first prompt message, so that the user can be prompted to perform the first task at a time that has no intersection with the second time, and can be notified of a reason for changing the time of performing the first task, to improve user experience.

Optionally, a modification entry for modifying prompt information may be further added to the first prompt message, for example, a modification key, a location at which the user is prompted to modify a menu, or a method in which the user is prompted to perform specific modification. A modification result may be further provided, to prompt the user to determine whether to accept the modification result, for example, prompt the user to determine whether to accept a modification for an appointment time to 18:30 on March 11, and an accept option and a reject option are provided, so that the user can directly perform the modification. Another modification manner may be alternatively provided for the user for use.

According to the information processing method provided in this embodiment of this application, the terminal may extract the first structured information from the first screen in response to the first operation of the user, and generates the first prompt message based on the first structured information. The first prompt message is used to remind the user to perform the first task at the first address at the first time. The terminal may further extract the second structured information from the second screen in response to the first operation of the user. The second structured information is used to instruct the user to perform the second task at the second address at the second time. When the first time and the second time have the intersection, and the first address is different from the second address, the terminal may automatically add the first instruction information to the first prompt message, to remind the user to perform the first task at the third time that has no intersection with the second time. Therefore, the terminal may remind, by using the first prompt message at a preset time, the user to perform the first task, and prompt the user to change, due to a conflict with a time of another task, the time of performing the first task. In this way, the user can clearly learn of a specific situation of a task of the user and a situation of a conflict of the task and another task, so as to adjust an arrangement of the user in a timely manner to avoid the conflict. For example, if the user performs the first task at the changed first time, a case in which the user cannot perform the first task because the time of performing the first task and the time of performing the second task have the intersection and the addresses are different can be avoided, to avoid a conflict when the user performs the first task and the second task. Therefore, intelligence of the device can be improved, and better time management can be provided for the user.

In addition, the first instruction information may further include the reason for changing the time of performing the first task, so that the user understands that the time of performing the first task for the device needs to be changed, to improve user experience.

Figure 17:
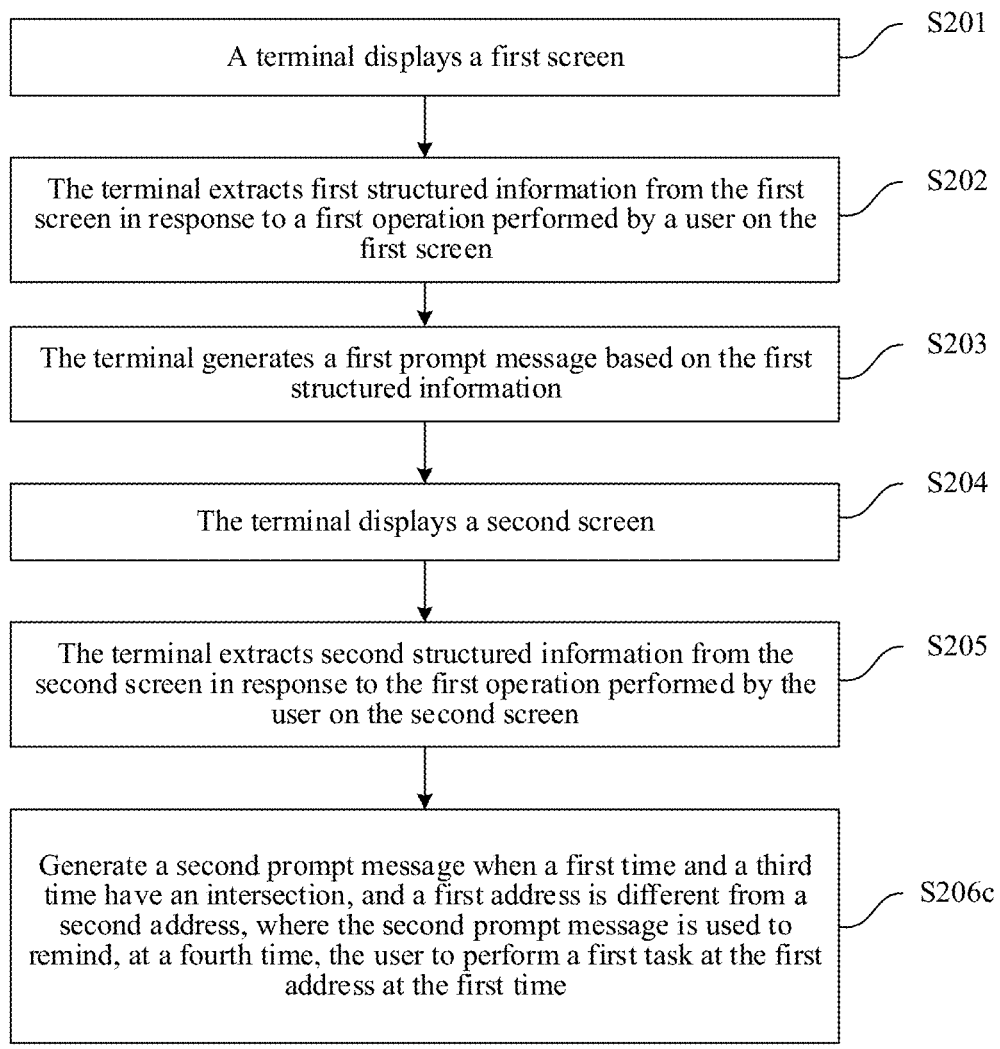
FIG. 17 is a flowchart 4 of an information processing method according to an embodiment of this application.

In a third application scenario in the embodiments of this application, an embodiment of this application provides an information processing method. As shown in FIG. 17, the information processing method includes S201 to S205 and S206c.

S206c. Generate a second prompt message when the first time and a third time have an intersection, and the first address is different from the second address, where the second prompt message is used to remind, at a fourth time, the user to perform the first task at the first address at the first time.

It should be emphasized that in the third application scenario, a difference from the first application scenario and the second application scenario lies in that the first structured information is used to instruct the user to perform the first task at the first address at the first time, the first prompt message is used to remind, at a second time, the user to perform the first task at the first address at the first time, and the second structured information is used to instruct the user to perform the second task at the second address at the third time.

Figure 18:
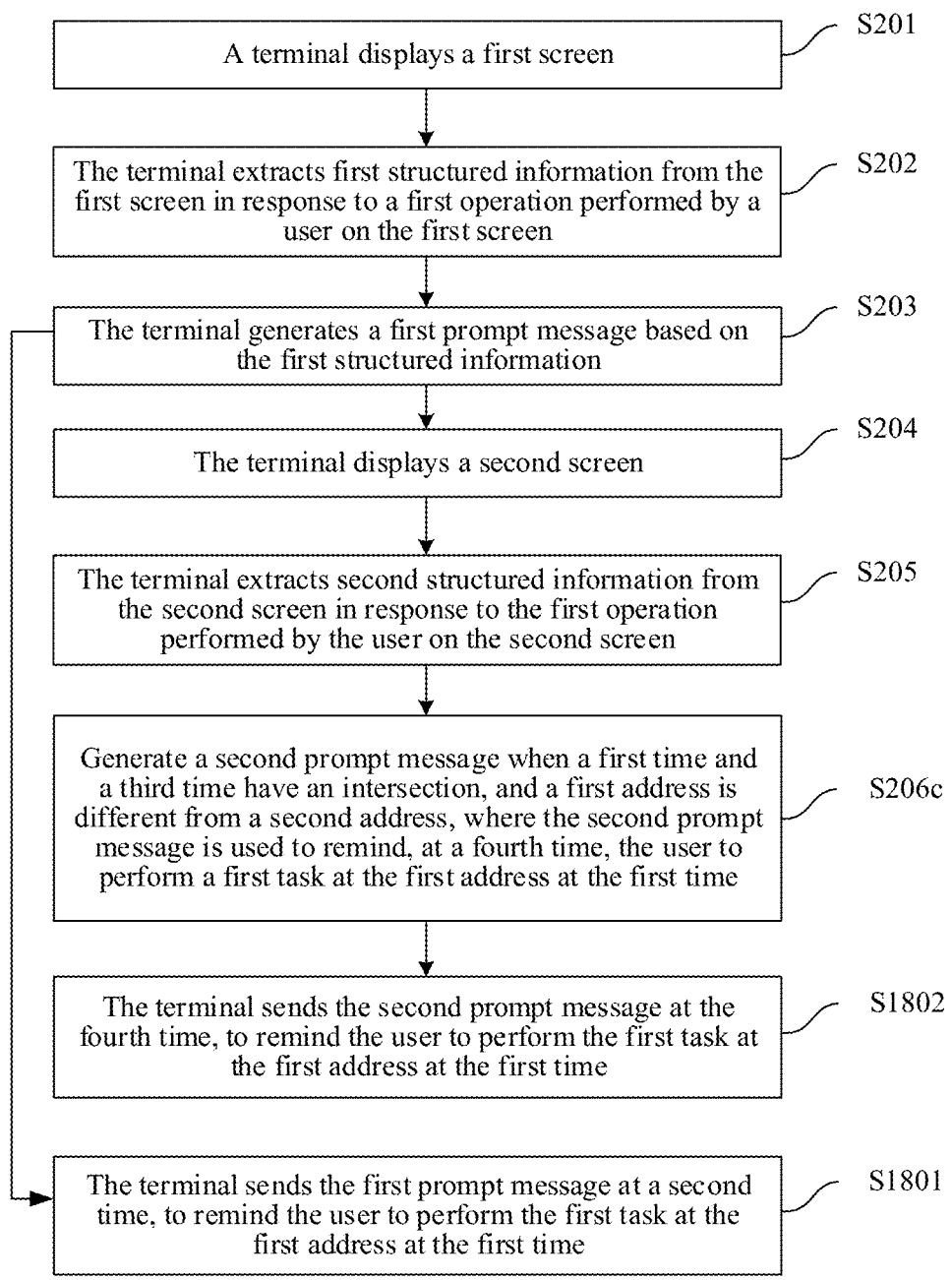
FIG. 18 is a flowchart 5 of an information processing method according to an embodiment of this application.

In the third application scenario, after S203 (in other words, the first prompt message is generated), as shown in FIG. 18, the method in this embodiment of this application may further include S1801. After S206c, the method in this embodiment of this application may further include S1802.

S1801. The terminal sends the first prompt message at the second time, to remind the user to perform the first task at the first address at the first time.

S1802. The terminal sends the second prompt message at the fourth time, to remind the user to perform the first task at the first address at the first time.

For example, the first screen is the messaging screen shown in FIG. 3B(a), and the second screen is the WeChat chat screen shown in FIG. 4(a). The first structured information is the structured information shown in FIG. 7B(b), the first time is "18:30 on March 14", the first address is "** restaurant in Xi'an", and the first task is "appointment". The second structured information is the structured information shown in FIG. 10(b), the second time is March 12 to March 16, the second address is Shanghai * Research Institute, and the second task is to go on a business trip for a meeting.

The first time "18:30 on March 14" and the second time "March 12 to March 16" have an intersection, and the first address "** restaurant in Xi'an" is different from the second address "Shanghai * Research Institute". In this case, if the user goes on a business trip in Shanghai from "March 12 to March 16", the user cannot perform the first task "appointment" at the intersection "18:30 on March 14" of the first time "18:30 on March 14" and the second time "March 12 to March 16". Therefore, the terminal may send the second prompt message at the fourth time based on a fact that the terminal sends the first prompt message at the second time, to remind the user to perform the first task at the first address at the first time.

Figure 15C:
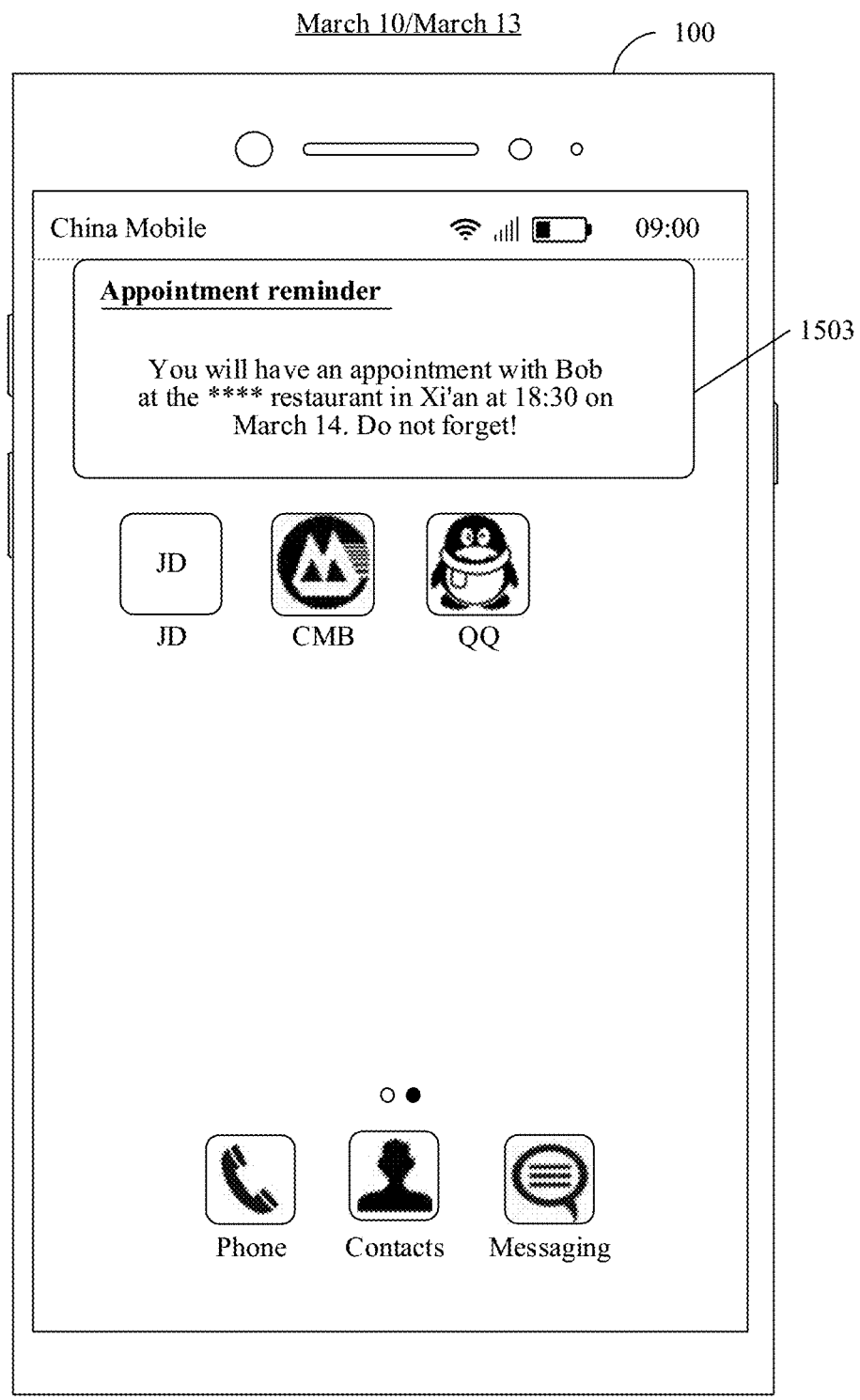

For example, it is assumed that before performing S206c, the mobile phone 100 may perform S1801 to send, on March 14, an appointment reminder 1501 (namely, the first prompt message) shown in FIG. 15(a), namely, the appointment reminder 901 shown in FIG. 9(a). After performing S206c, the mobile phone 100 may not only perform S1801 to send, on March 14, the appointment reminder 1501 (namely, the first prompt message) shown in FIG. 15(a), but also perform S1802 to send, on March 10 or March 13, an appointment reminder 1503 (namely, the second prompt message) shown in FIG. 15(c).

Figure 16C:
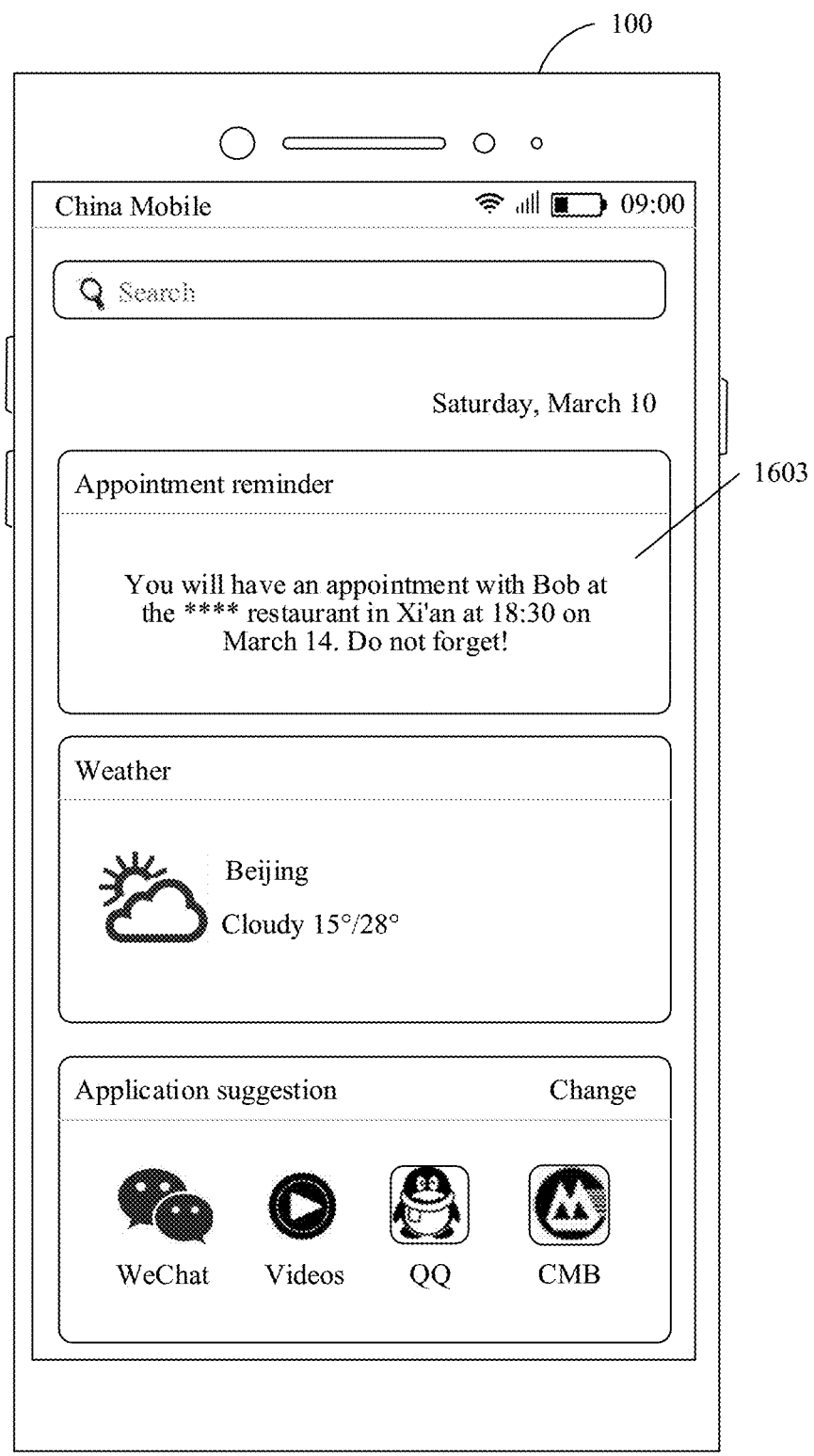

For example, it is assumed that before performing S206c, the mobile phone 100 may perform S1801 to send, on March 14, an appointment reminder 1601 (namely, the first prompt message) shown in FIG. 16(a), namely, the appointment reminder 902 shown in FIG. 9(b). After performing S206c, the mobile phone 100 may not only perform S1801 to send, on March 14, the appointment reminder 1601 (namely, the first prompt message) shown in FIG. 16(a), but also perform S1802 to send, before "18:30 on March 14" and the second time "March 12 to March 16" (for example, on March 10), an appointment reminder 1603 (namely, the second prompt message) shown in FIG. 16(c).

In the third application scenario in the embodiments of this application, the terminal may send the first prompt message at the second time, to remind the user to perform the first task at the first address at the first time. Because the first time of performing the first task and the second time of performing the second task have the intersection, the terminal may further send the second prompt message at the fourth time, to remind the user to perform the first task at the first address at the first time. Although the second prompt message is also used to remind the user to perform the first task at the first address at the first time, the second prompt message is sent at the fourth time, and different reminding effects can be achieved by prompting, at different times, the user to perform a same event. In this embodiment of this application, the second prompt message is sent at the fourth time, so that a possibility that the user performs the first task at a time that has no intersection with the third time can be increased.

Figure 19:
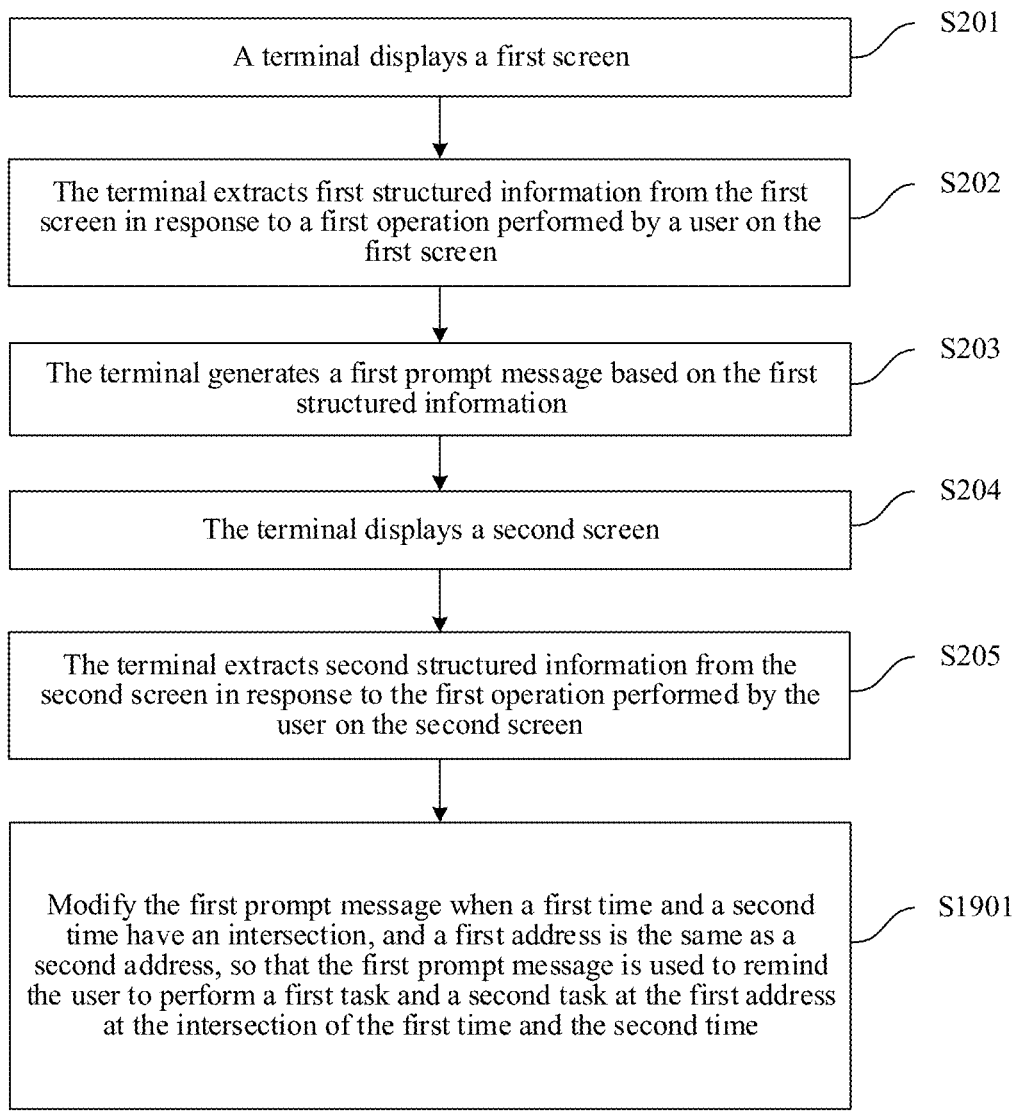
FIG. 19 is a flowchart 6 of an information processing method according to an embodiment of this application.

In a fourth application scenario in the embodiments of this application, the first address at which the user performs the first task may be the same as the second address at which the user performs the second task. In this case, as shown in FIG. 19, a method in an embodiment of this application may include S201 to S205 and S1901.

S1901. Modify the first prompt message when the first time and the second time have an intersection and the first address is the same as the second address, so that the first prompt message is used to remind the user to perform the first task and the second task at the first address at the intersection of the first time and the second time.

For example, it is assumed that the first time is March 8 to March 10, the first address is a first delivery station in the third street in Xi'an, and the first task is to pick up a package. To be specific, the first prompt message is used to remind the user to pick up the package at the first delivery station in the third street in Xi'an during March 8 to March 10. The second time is March 9 to March 11, the second address is the first delivery station in the third street in Xi'an, and the second task is to send a package. To be specific, a second prompt message is used to remind the user to send the package at the first delivery station in the third street in Xi'an during March 9 to March 11.

The first time "March 8 to March 10" and "March 9 to March 11" have an intersection "March 9 and March 10", and the first address is the same as the second address. Therefore, the terminal may modify the first prompt message, so that a modified first prompt message is used to remind the user to pick up the package and send the package at the first delivery station in the third street in Xi'an at the intersection "March 9 and March 10" of the first time and the second time.

It should be noted that in any application scenario in the embodiments of this application, for specific content of the first time, the second time, the first address, the second address, "that the first time and the second time have an intersection", and "that the first address is the same as the second address", refer to the detailed descriptions in the first application scenario. Details are not described again in this embodiment of this application.

It may be understood that because the first time and the second time have the intersection, and the first address is the same as the second address, the terminal may modify the first prompt message, so that the first prompt message is used to remind the user to perform the first task and the second task at the first address at the intersection of the first time and the second time. In other words, the terminal may integrate prompt messages of the first task and the second task, and prompt, in one prompt message, the user to perform both the first task and the second task at the same time. Therefore, efficiency of performing the first task and the second task by the user can be improved. A success rate of performing the tasks is improved, and labor and time costs of the user are reduced.

Figure 20:
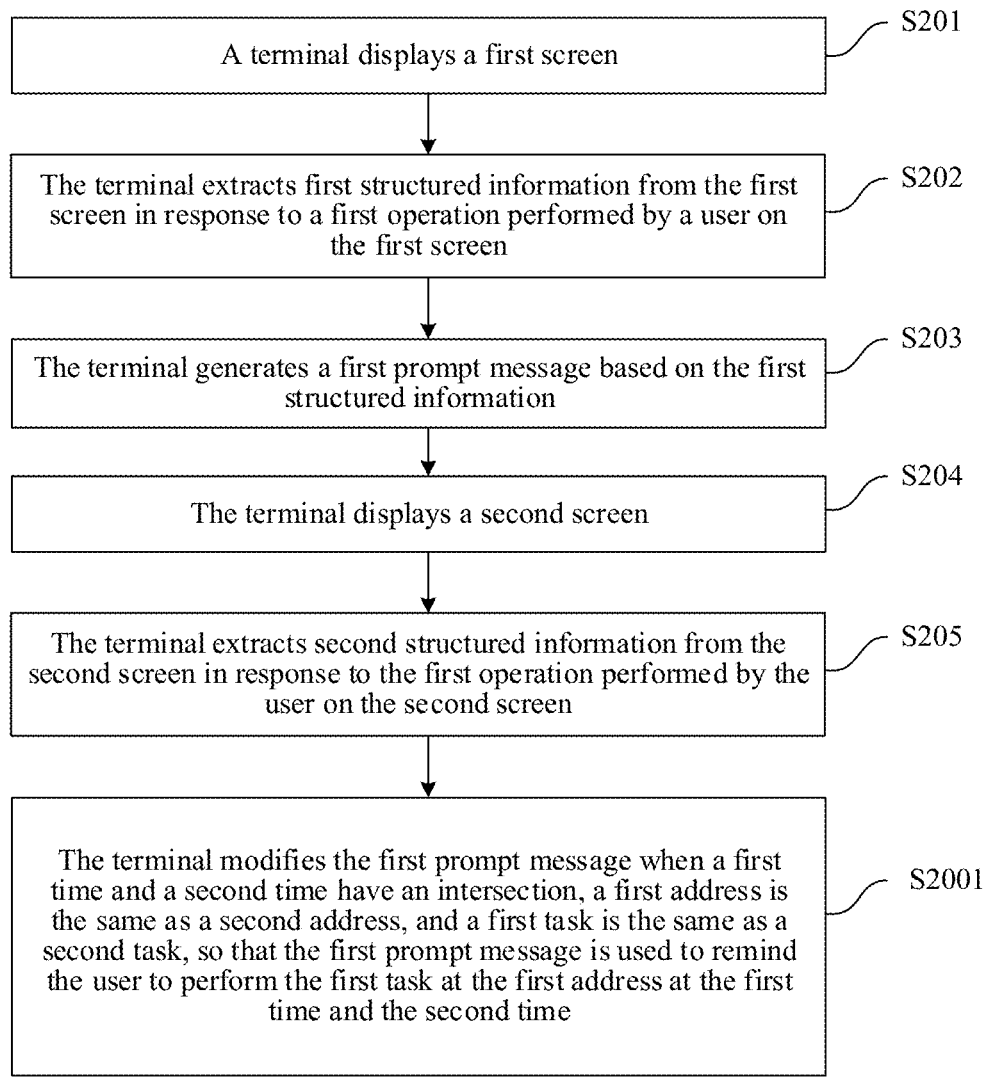
FIG. 20 is a flowchart 7 of an information processing method according to an embodiment of this application.

In a fifth application scenario in the embodiments of this application, the first address at which the user performs the first task may be the same as the second address at which the user performs the second task, and the first task may be the same as the second task. In this case, as shown in FIG. 20, a method in an embodiment of this application may include S201 to S205 and S2001.

S2001. The terminal modifies the first prompt message when the first time and the second time have an intersection, the first address is the same as the second address, and the first task is the same as the second task, so that the first prompt message is used to remind the user to perform the first task at the first address at the first time and the second time.

For example, it is assumed that the first time is 9:00 on March 8, the first address is a conference room a, and the first task is to attend a conference. To be specific, the first prompt message is used to remind the user to attend the conference in the conference room a at 9:00 on March 8. The second time is 16:00 on March 8, and the second address is the conference room a. To be specific, a second prompt message is used to remind the user to attend a conference in the conference room a at 16:00 on March 8.

The first time "9:00 on March 8" and "16:00 on March 8" have an intersection (a time difference between the first time and the second time falls within a preset time range), and the first address is the same as the second address. Therefore, the terminal may modify the first prompt message, so that a modified first prompt message is used to remind the user to attend the conferences in the conference room a at "9:00 on March 8" and "16:00 on March 8".

It may be understood that because the first time and the second time have the intersection, the first address is the same as the second address, and the first task is the same as the second task, the terminal may modify the first prompt message, so that the first prompt message can be used to remind the user to perform the first task at the first address at the first time and the second time. In other words, the terminal may integrate prompt messages of the first task and the second task, and prompt, in one prompt message, the user to perform the first task and the second task at different times. In this way, a quantity of prompt messages displayed on a screen of the terminal can be reduced, display space can be saved, display efficiency can be improved, display resources can be reduced, and interaction efficiency can be improved.

Figure 21:
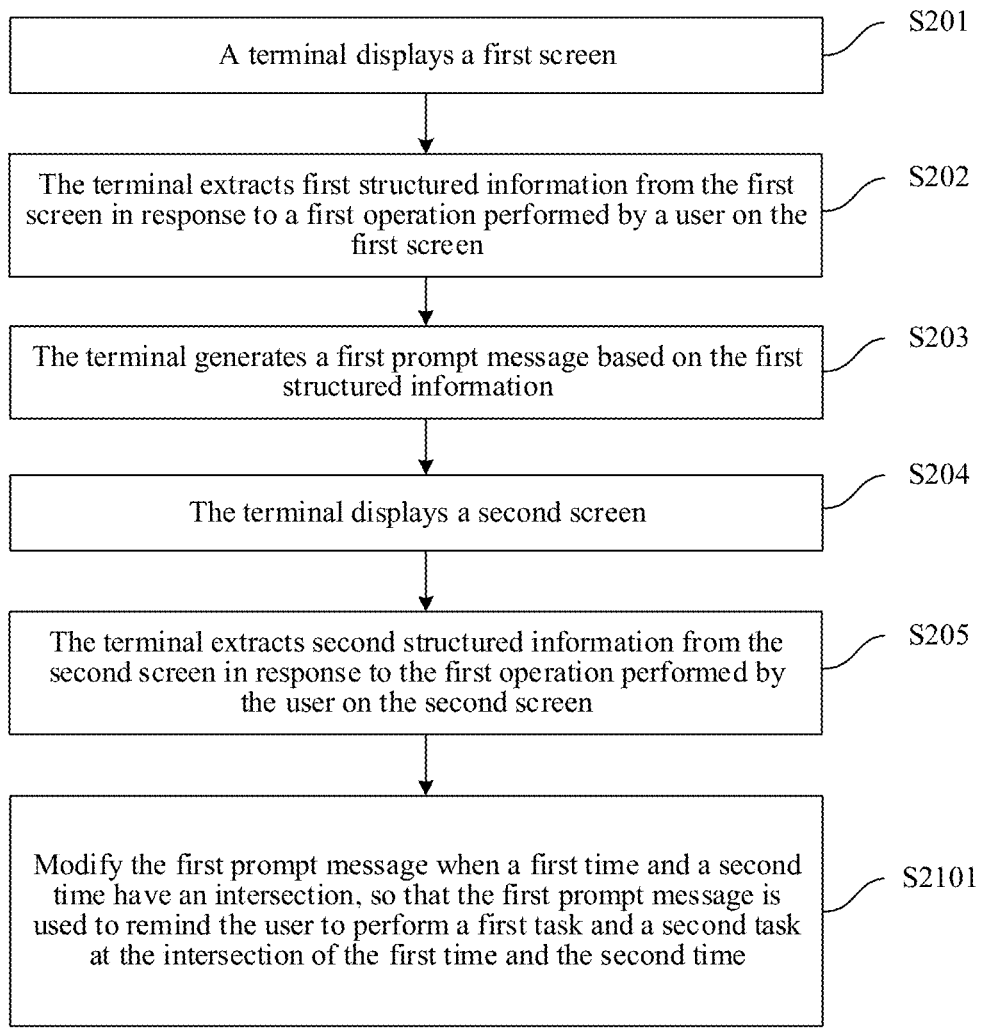
FIG. 21 is a flowchart 8 of an information processing method according to an embodiment of this application.

In a sixth application scenario in the embodiments of this application, the first structured information and the second structured information may not include address information. In this case, as shown in FIG. 21, a method in an embodiment of this application may include S201 to S205 and S2101.

S2101. Modify the first prompt message when the first time and the second time have an intersection, so that the first prompt message is used to remind the user to perform the first task and the second task at the intersection of the first time and the second time.

In the sixth application scenario, the first structured information is used to instruct the user to perform the first task at the first time. The first prompt message is used to remind the user to perform the first task at the first time. The second structured information is used to instruct the user to perform the second task at the second time.

It may be understood that because the first time and the second time have the intersection, the terminal may modify the first prompt message, so that the first prompt message is used to remind the user to perform the first task and the second task at the intersection of the first time and the second time. In other words, the terminal may integrate prompt messages of the first task and the second task, and prompt, in one prompt message, the user to perform both the first task and the second task at the same time. Therefore, efficiency of performing the first task and the second task by the user can be improved.

In the embodiments of this application, the terminal may store content on the first screen in a nonvolatile storage medium of the terminal in response to the first operation. The content on the first screen includes at least one of a web page link, a screenshot of the first screen, and the first structured information. The terminal may invoke a memo board in response to a second operation of the user to display at least one first information item on the memo board, where the at least one first information item corresponds to the content stored in the nonvolatile storage medium. Specifically, the method in the embodiments of this application may further include S2201 and S2202.

S2201. The terminal displays the memo board on a current screen in response to the second operation of the user.

The memo board is used to display the at least one first information item corresponding to the content stored in the nonvolatile storage medium. For detailed descriptions of the second operation, refer to the descriptions of the second operation in the foregoing embodiment. Details are not described again in this embodiment of this application.

Figure 6A:
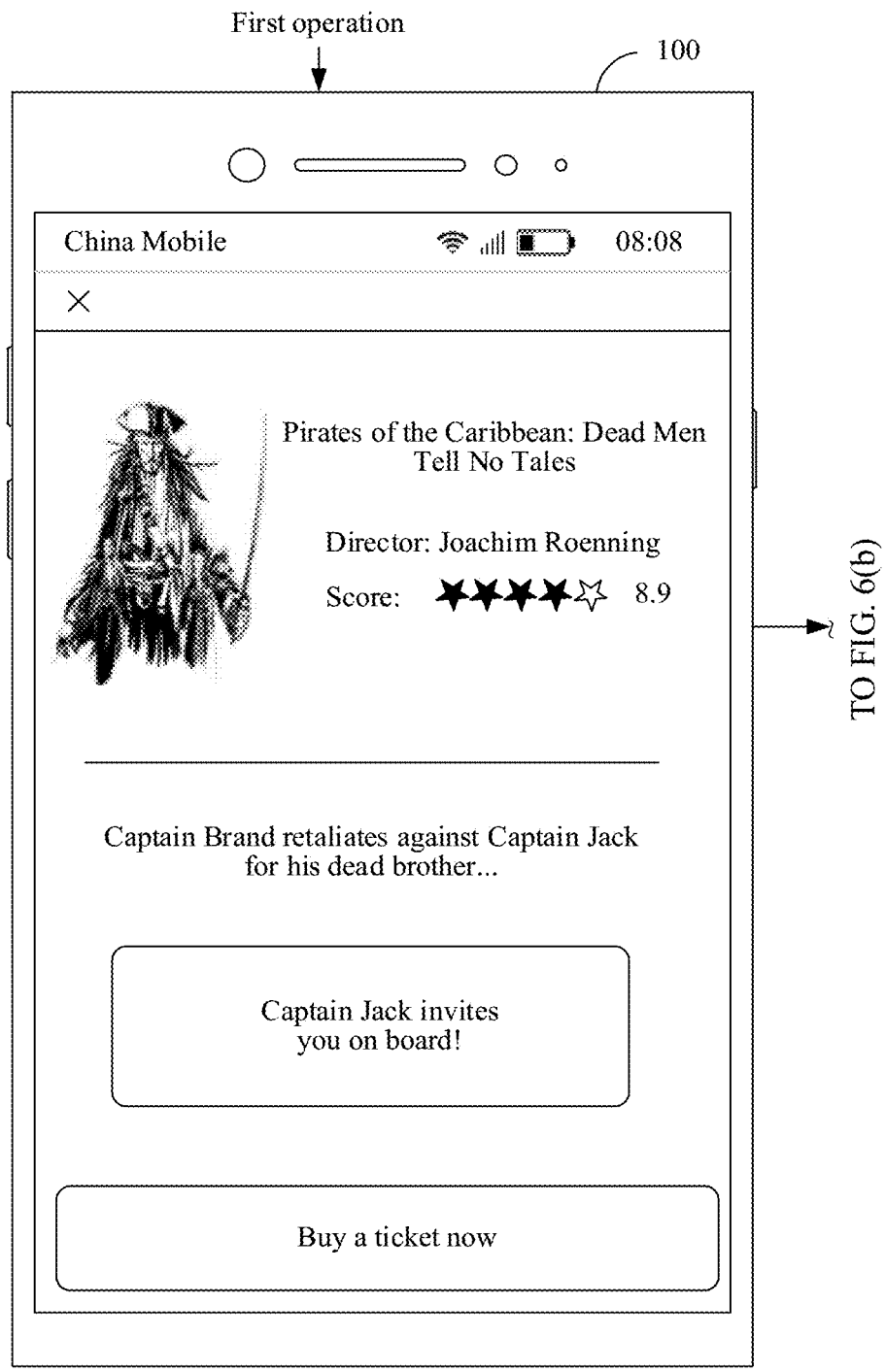
FIG. 6(a) and FIG. 6(b) are a schematic diagram 5 of an instance of a terminal screen according to an embodiment of this application.
Figure 6B:
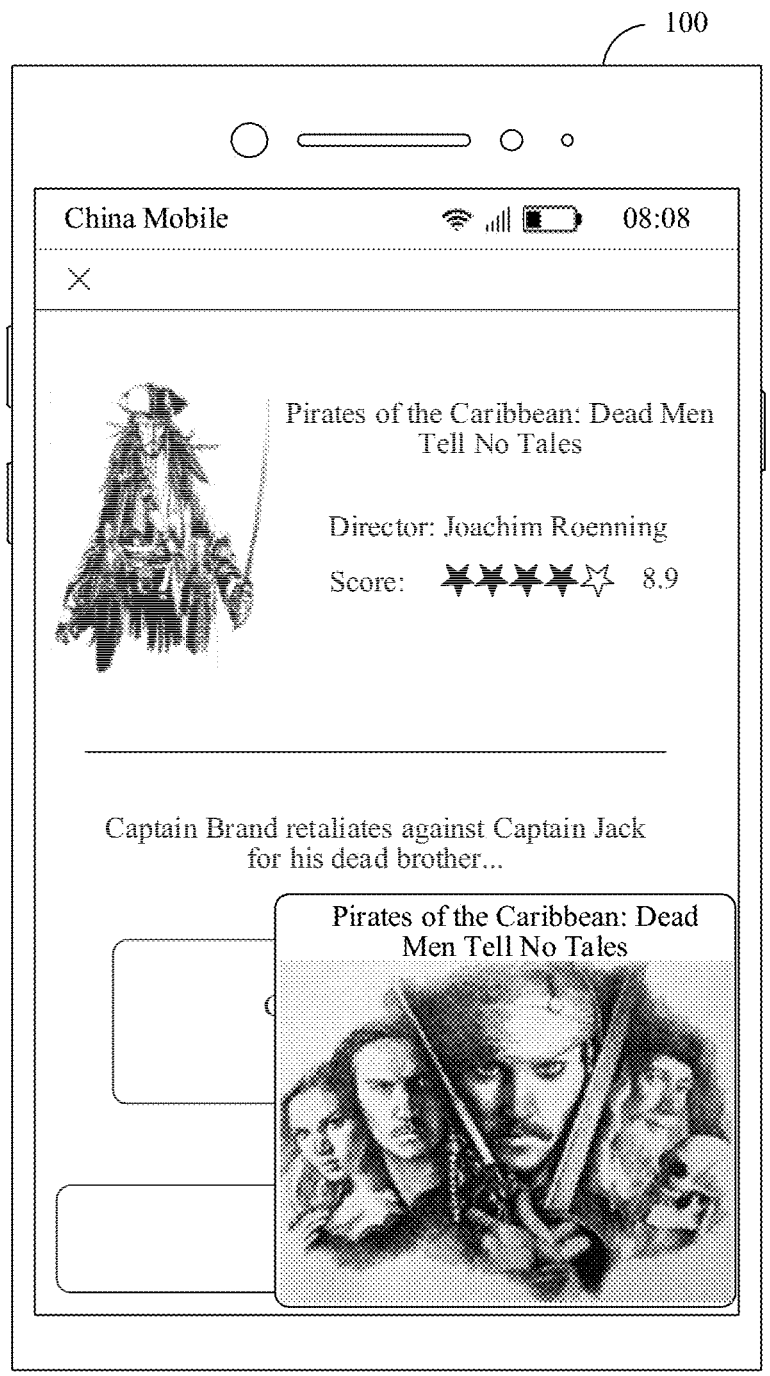
Figure 8A:
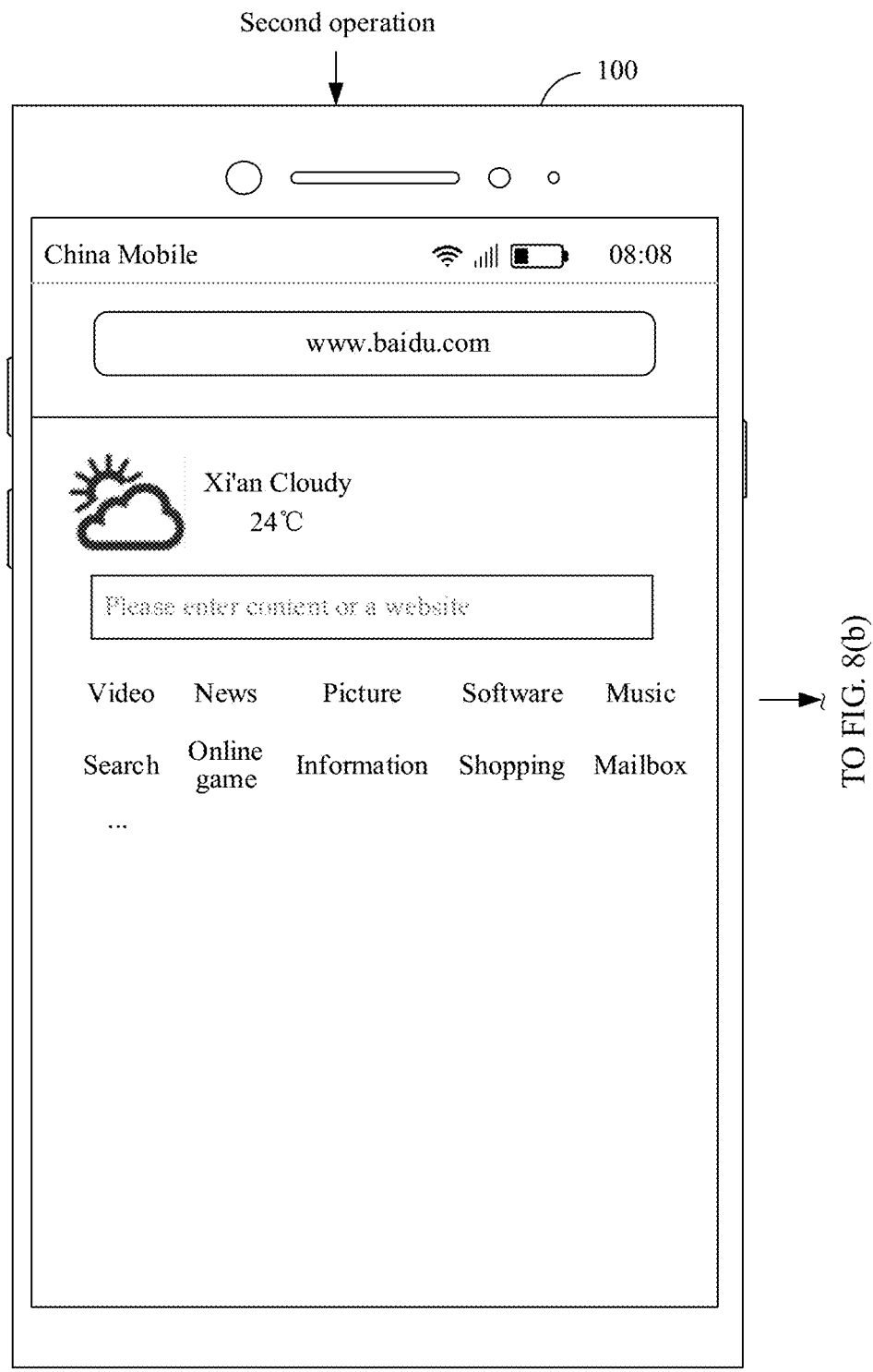
FIG. 8(a), FIG. 8(b), and FIG. 8(c) are a schematic diagram 6 of an instance of a terminal screen according to an embodiment of this application.
Figure 8B:
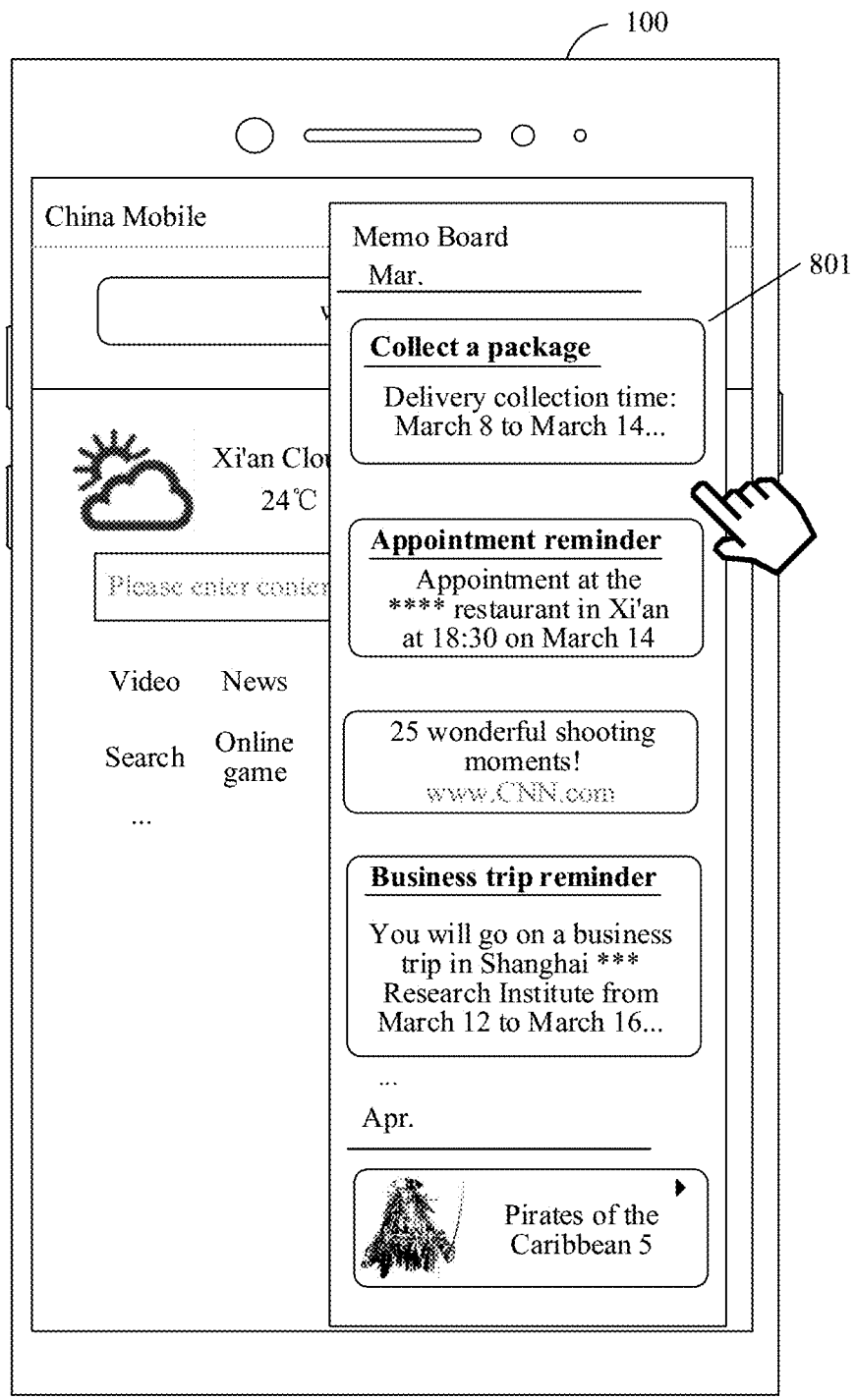
Figure 8C:
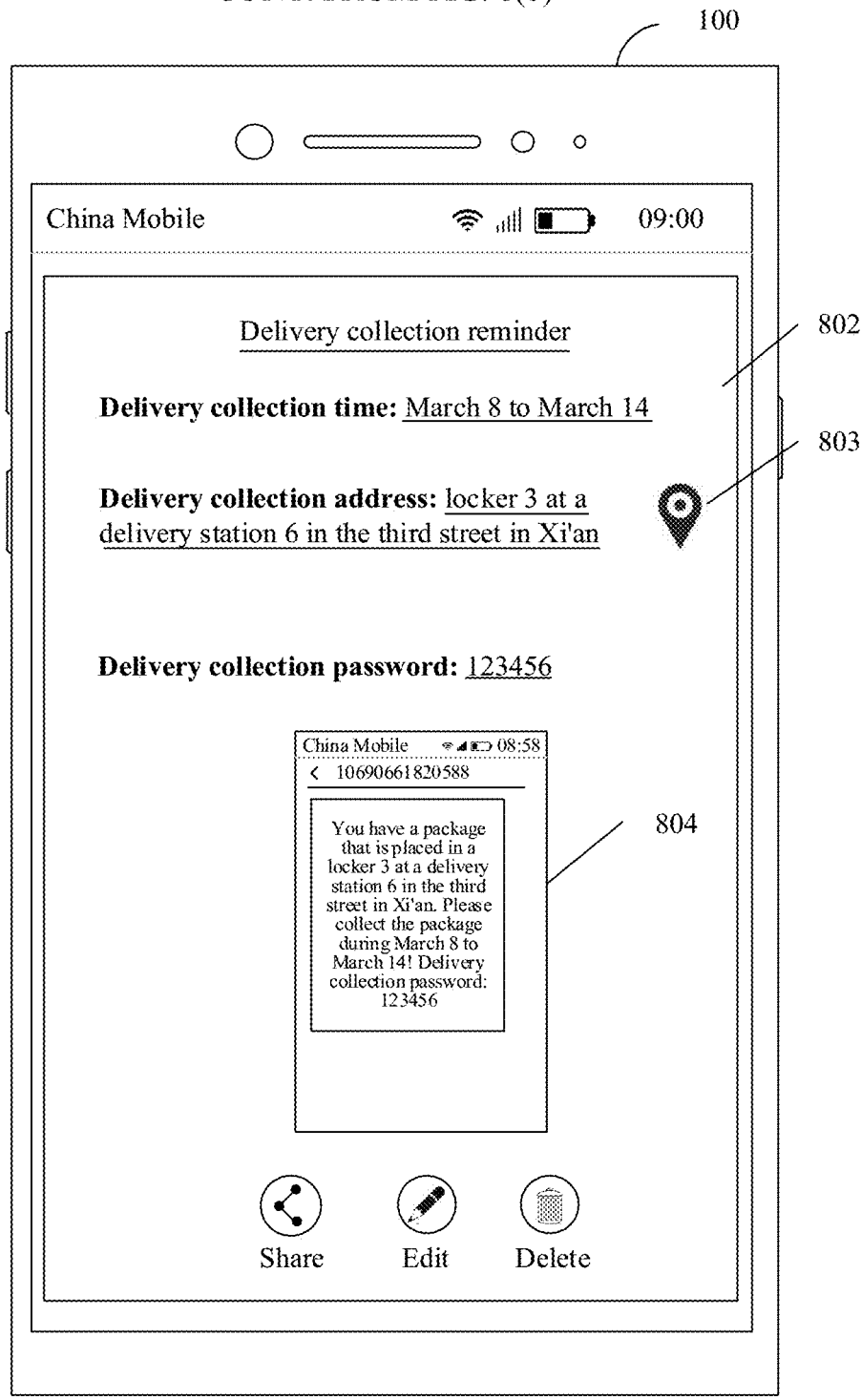

For example, with reference to FIG. 3A(a) and FIG. 3A(b), FIG. 3B(a) to FIG. 3B(c), FIG. 4(*a*) and FIG. 4(*b*), FIG. 5(*a*) to FIG. 5(*c*), and FIG. 6(*a*) and FIG. 6(*b*), the mobile phone 100 may store, in the nonvolatile storage medium in response to the first operation, the content (for example, the screenshot of the messaging screen on which there is the delivery notification) on the first screen shown in FIG. 3A(a), the content (for example, the screenshot of the messaging screen on which the appointment is agreed on) on the first screen shown in FIG. 3B(a), the content (for example, the screenshot of the WeChat chat screen on which the business trip is notified) on the first screen shown in FIG. 4(*a*), the content (for example, the web page link to the 25 wonderful shooting moments) on the first screen shown in FIG. 5(a), and the content (the movie information of Pirates of the Caribbean) on the first screen shown in FIG. 6(a). As shown in FIG. 8(a), the mobile phone 100 displays a browser screen. As shown in FIG. 8(b), the mobile phone 100 may display a memo board 801 on the browser screen in response to the second operation. The memo board 801 includes at least one first information item. For example, the memo board 801 includes an information item of collecting a package, an information item (namely, an appointment reminder) of an appointment, an information item (25 wonderful shooting moments) of a web page link, an information item (namely, a business trip reminder) of a business trip, and an information item (movie information of Pirates of the Caribbean) of Pirates of the Caribbean.

S2202. The terminal displays a third screen in response to a selection operation performed by the user on any one of the at least one first information item, where the third screen includes content corresponding to the first information item selected by the user.

For example, the user selects the information item (namely, a first information item) that is of collecting a package and that is on the memo board shown in FIG. 8(b). The mobile phone 100 may display, in response to a selection operation performed by the user on the information item of collecting a package, a third screen 802 shown in FIG. 8(c). For detailed descriptions of the third screen 802 shown in FIG. 8(c), refer to the descriptions in the foregoing embodiment. Details are not described again in this embodiment of this application.

Figure 22A:
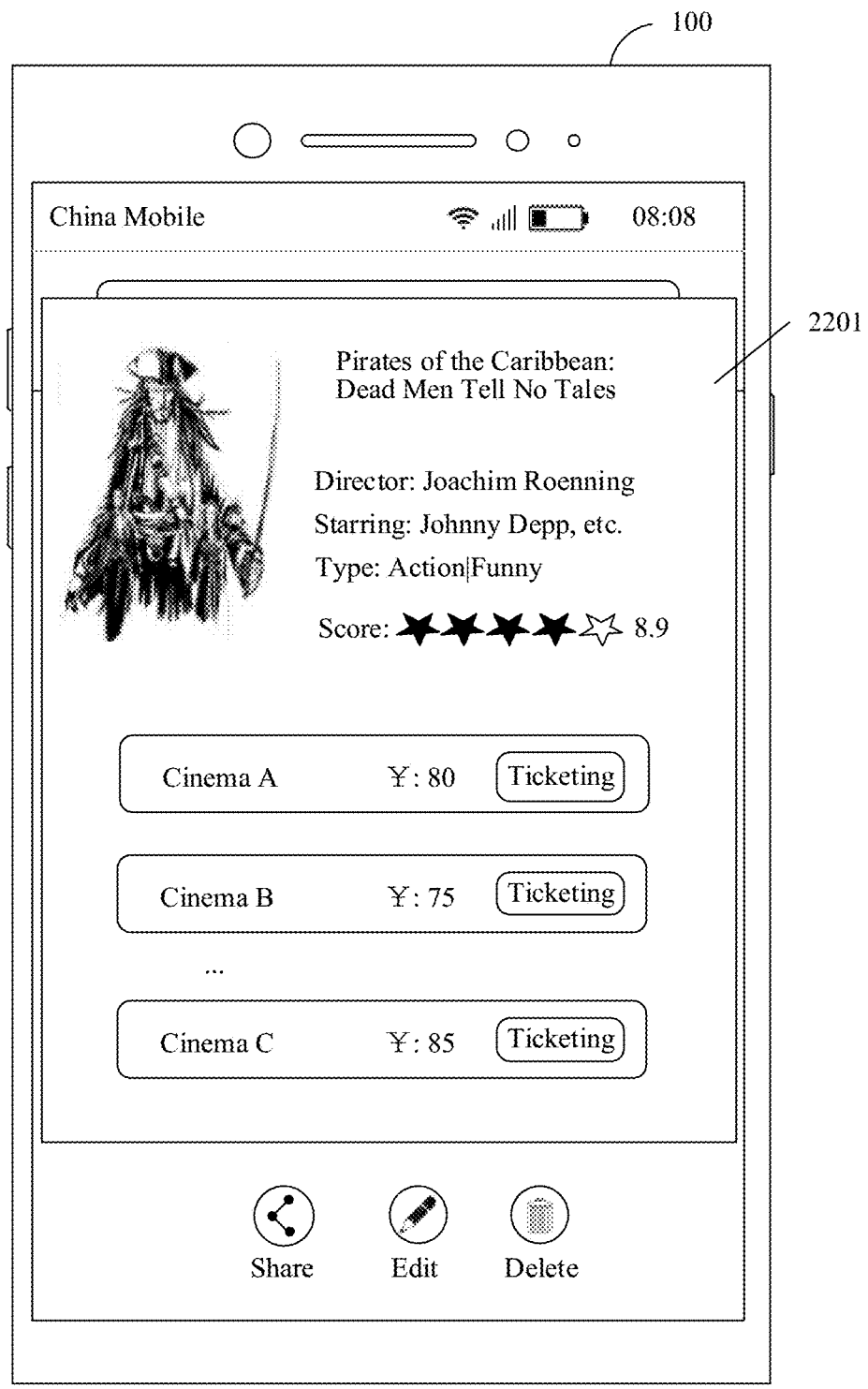
FIG. 22(a) and FIG. 22(b) are a schematic diagram 12 of an instance of a terminal screen according to an embodiment of this application.
Figure 22B:
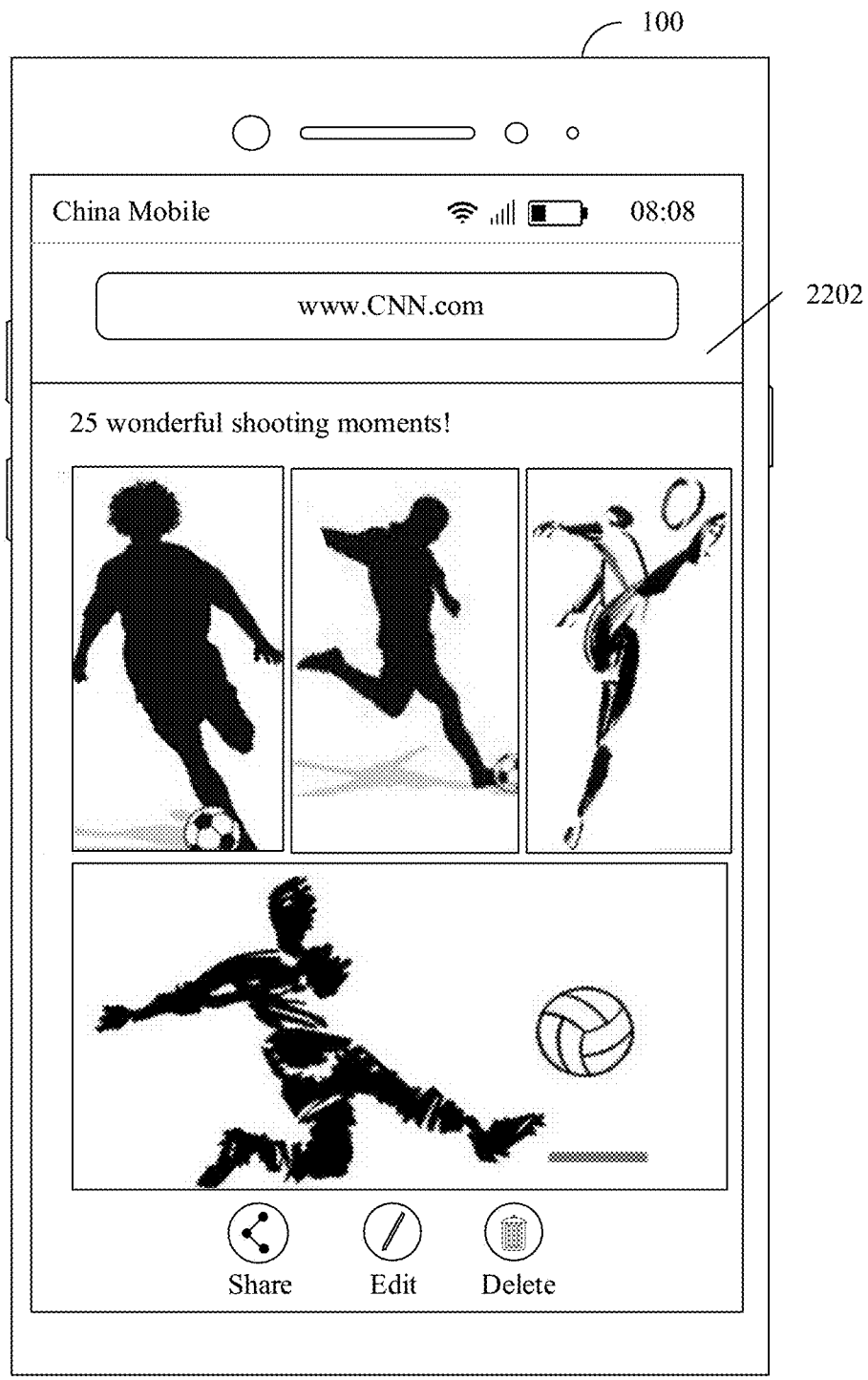

For example, the user selects the information item (namely, a first information item) that is of Pirates of the Caribbean and that is on the memo board shown in FIG. 8(b). The mobile phone 100 may display, in response to a selection operation performed by the user on the information item of Pirates of the Caribbean, a third screen 2201 shown in FIG. 22(a). For example, the user selects the information item (the 25 wonderful shooting moments) that is of the web page link and that is on the memo board shown in FIG. 8(b). The mobile phone 100 may display, in response to a selection operation performed by the user on the information item (the 25 wonderful shooting moments) of the web page link, a third screen 2202 shown in FIG. 22(b).

The third screen may further include a "Share" key, an "Edit" key, and a "Delete" key. For example, the third screen 2201 shown in FIG. 22(a) and the third screen 2202 shown in FIG. 22(b) may further include a "Share" key, an "Edit" key, and a "Delete" key. For specific functions of the "Share" key, the "Edit" key, and the "Delete" key, refer to the related descriptions in the foregoing embodiment. Details are not described again in this embodiment of this application.

After determining a task (for example, the first task), the terminal may further recommend a service related to the first task to the user. For example, as shown in FIG. 7A(d), services related to the first task "collect a package" may include a delivery collection reminder and a path guide. As shown in FIG. 7B(d), services related to the first task "appointment" may include an appointment reminder and a restaurant booking service. As shown in FIG. 10(d), services related to the first task "go on a business trip from Xi'an to Shanghai" may include a calendar reminder, an air ticket booking service, a hotel booking service, and the like.

The services related to the first task may include an associated service of the first task and a potential service of the first task. The potential service of the first task is associated with a potential task of the first task.

Figure 23A:
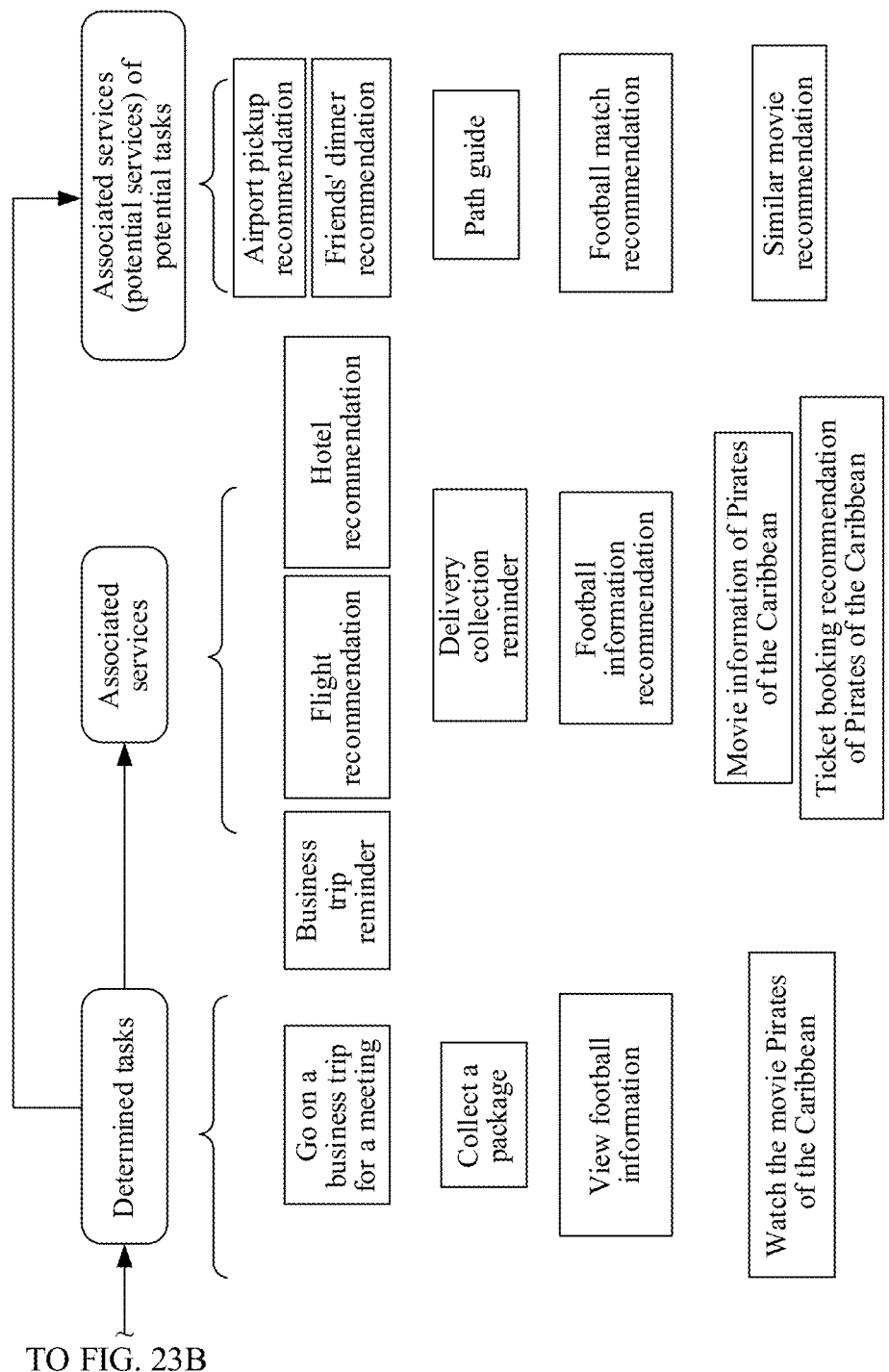
FIG. 23A and FIG. 23B are a schematic diagram 4 of an instance of a process of performing an information processing method according to an embodiment of this application.
Figure 23B:
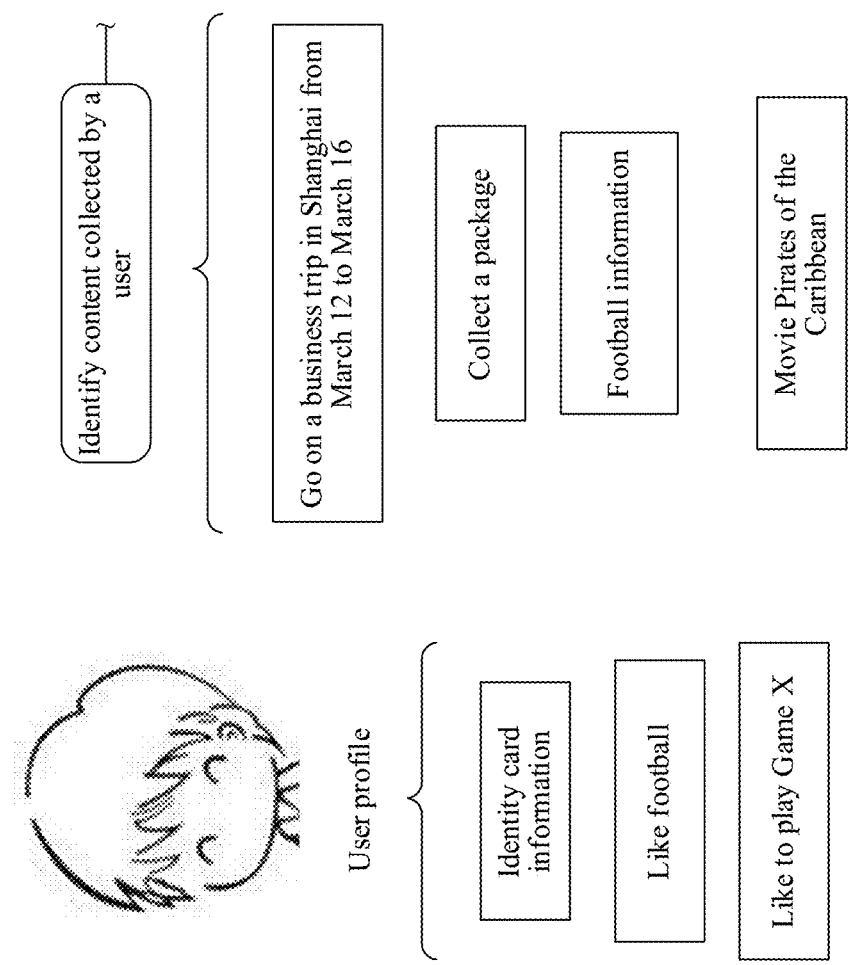

For example, as shown in FIG. 23A and FIG. 23B, when the terminal identifies that content collected by the user is "go on a business trip in Shanghai from March 12 to March 16", the terminal may determine that the first task is to go on the business trip for a meeting. Services that may need to be used by the user to perform the first task may include a "business trip reminder", "flight recommendation", "hotel recommendation", and the like. The associated services of the first task may include a "business trip reminder", "flight recommendation", "hotel recommendation", and the like. Potential tasks of performing the first task "go on a business trip in Shanghai from March 12 to March 16" by the user may include "dining with a friend in Shanghai", "airport pickup", and the like. The potential services of the first task include "friends' dinner recommendation", "airport pickup recommendation", and the like.

As shown in FIG. 23A and FIG. 23B, when the terminal identifies that content collected by the user is "collect a package", the terminal may determine that the first task is to collect the package. A service that may need to be used by the user to perform the first task may include a "delivery collection reminder". The associated service of the first task may include a "delivery collection reminder". Potential tasks of performing the first task "collect a package" by the user may include a path guide, a weather forecast, traffic information, and the like.

Specifically, the memo board may further include at least one second information item, or the memo board further includes at least one second information item. The at least one second information item is used to recommend at least one associated service and at least one potential service to the user, the at least one associated service is associated with the first task, and the at least one potential service is associated with a potential task of the first task. The terminal may display a fourth screen in response to a selection operation performed by the user on any one of the at least one second information item, where the fourth screen is a service recommendation screen corresponding to the second information item selected by the user.

Figure 24:
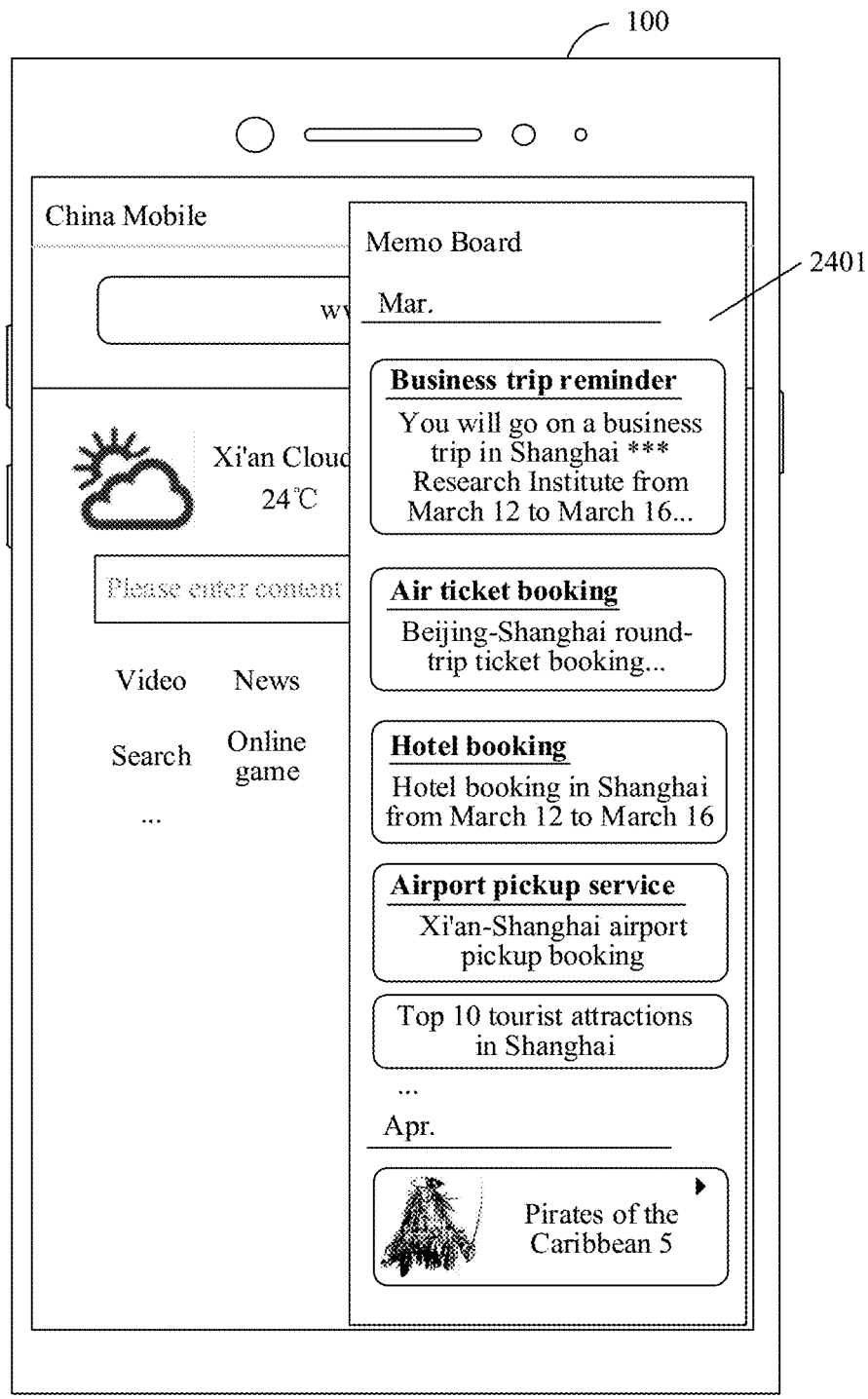
FIG. 24 is a schematic diagram 13 of an instance of a terminal screen according to an embodiment of this application.

For example, as shown in FIG. 24, a memo board 2401 includes both a first information item "business trip reminder" of the first task "go on a business trip in Shanghai from March 12 to March 16" and second information items, for example, an information item "air ticket booking", an information item "airport pickup service", an information item "hotel booking", and an information item "top 10 tourist attractions in Shanghai".

Optionally, a plurality of information items on the memo board may be sorted in a time sequence. For example, as shown in FIG. 24, the information items on the memo board 2401 are sorted in a month sequence. Information items in March (March, Mar. for short) include an information item "business trip reminder", an information item "air ticket booking", an information item "airport pickup service", an information item "hotel booking", an information item "top 10 tourist attractions in Shanghai", and the like. An information item in April (April, Apr. for short) includes an information item "Pirates of the Caribbean 5".

Figure 25A:
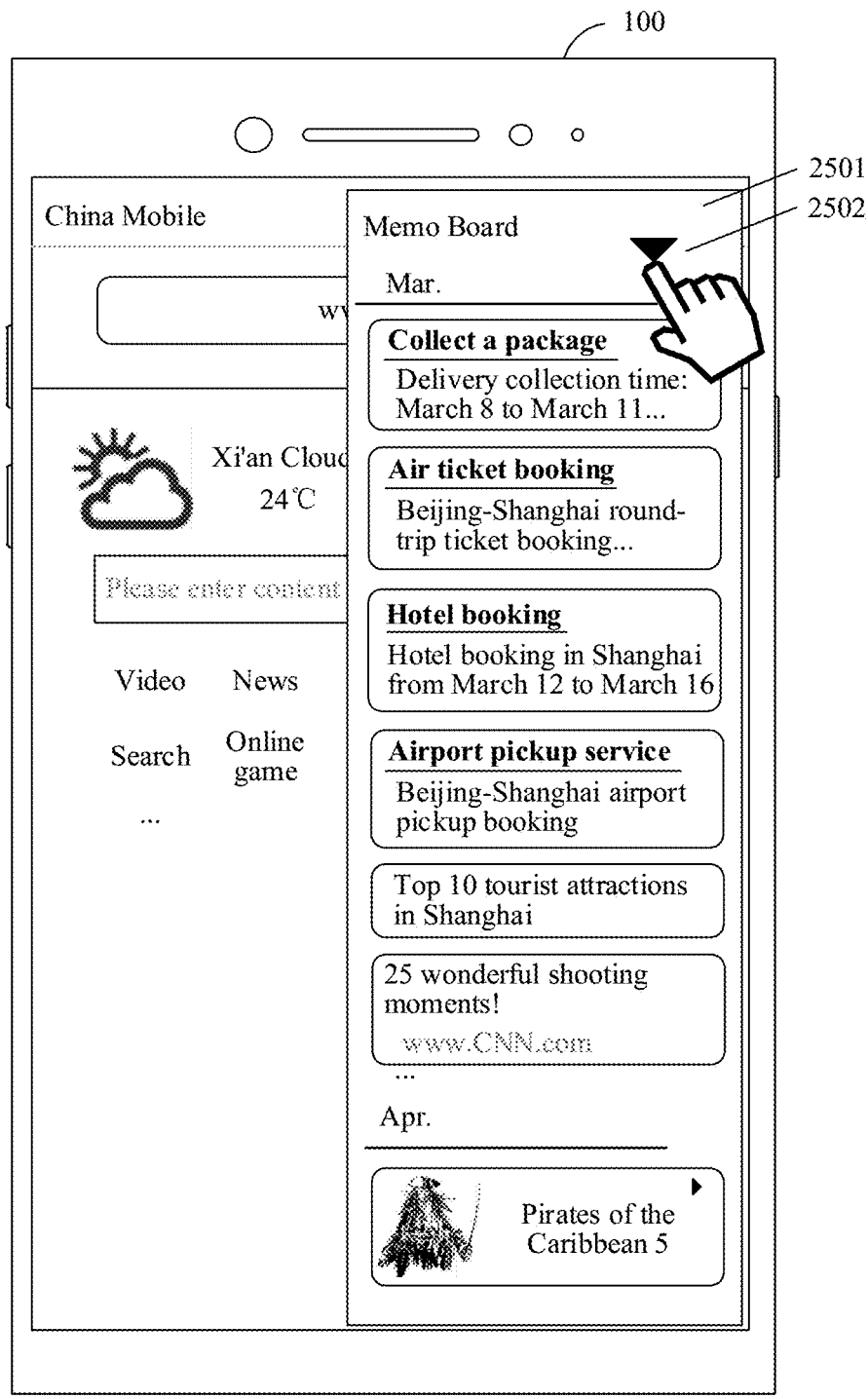
FIG. 25(a), FIG. 25(b), and FIG. 25(c) are a schematic diagram 14 of an instance of a terminal screen according to an embodiment of this application.

Optionally, a manner of sorting the plurality of information items on the memo board may be selected by the user. For example, as shown in FIG. 25(a), a memo board 2501 includes a sorting key 2502. The mobile phone 100 may display, in response to a tap operation performed by the user on the sorting key 2502, a sorting rule window 2503 shown in FIG. 25(b). The sorting rule window 2503 includes an information item sorting manner, for example, time-based sorting or type-based sorting.

Figure 25B:
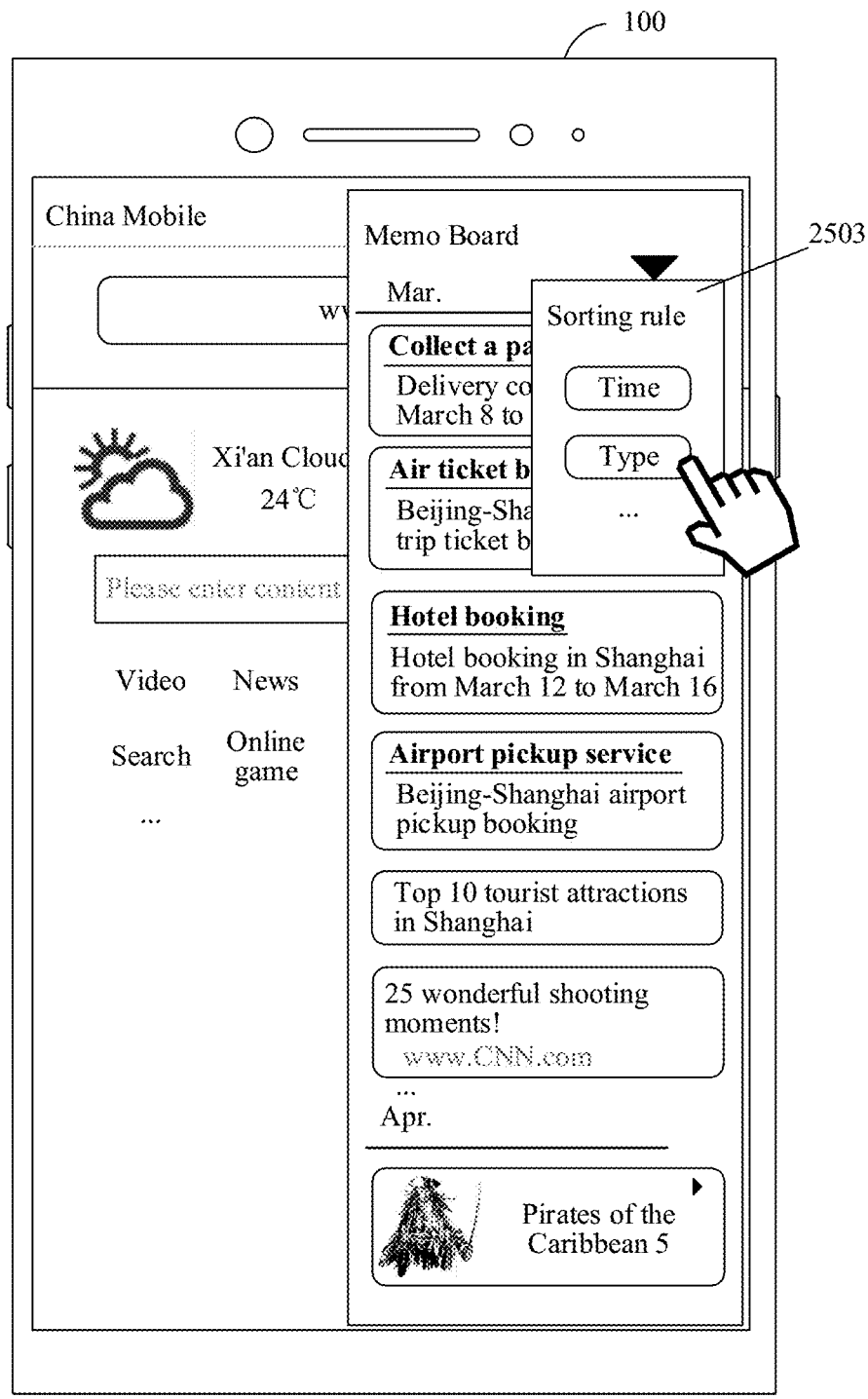
Figure 25C:
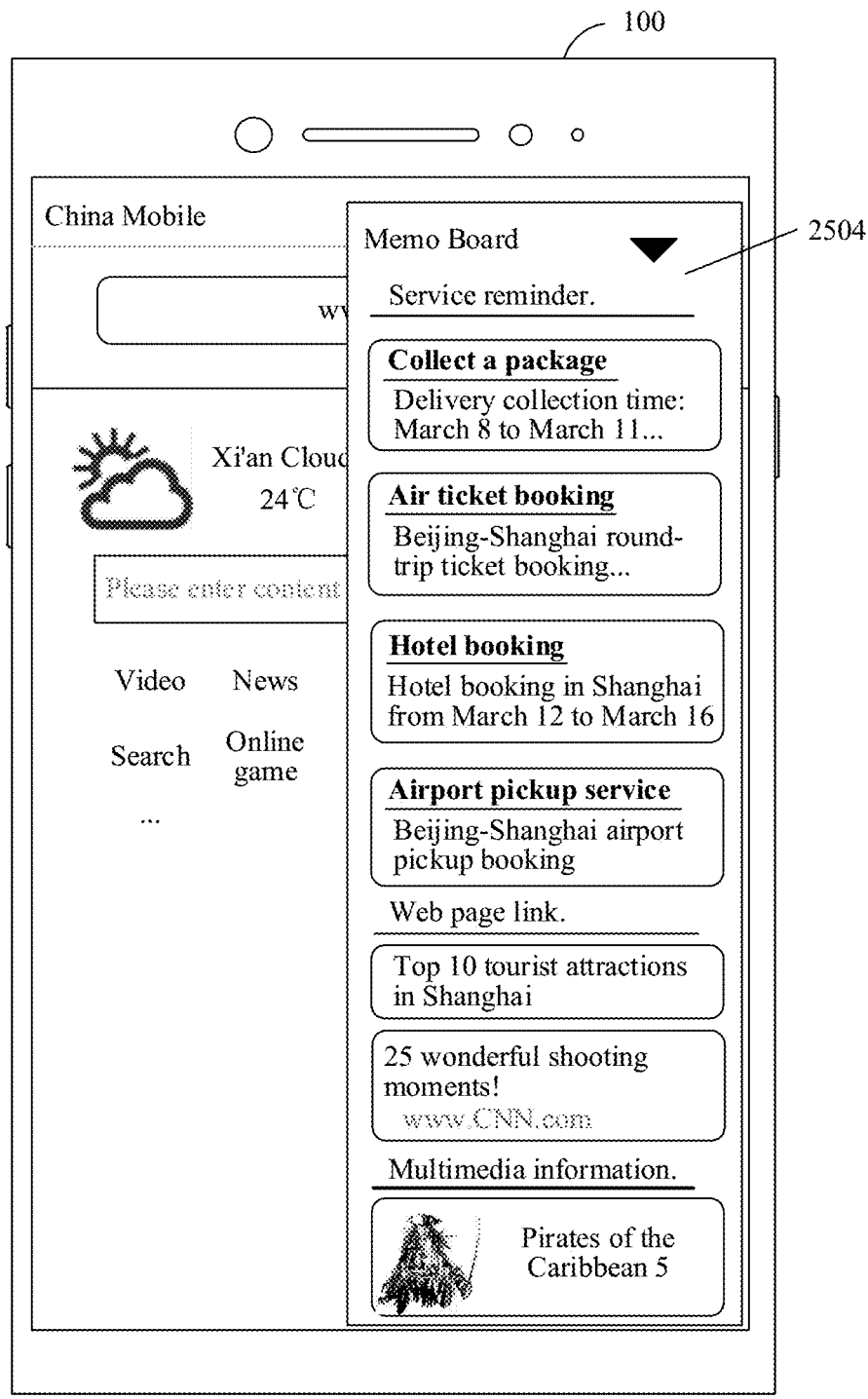

In response to a selection operation performed by the user on a "Type" option shown in FIG. 25(b), the mobile phone 100 may sort the plurality of information items based on a type, and display a memo board 2504 shown in FIG. 25(c). As shown in FIG. 25(a), the information items on the memo board 2501 are sorted in a month sequence. Information items in March (Mar.) include an information item "collect a package", an information item "air ticket booking", an information item "hotel booking", an information item "airport pickup service", an information item "top 10 tourist attractions in Shanghai", an information item "25 wonderful shooting moments", and the like. An information item in April (April, Apr. for short) includes an information item "Pirates of the Caribbean 5". The information item "collect a package", the information item "air ticket booking", the information item "hotel booking", and the information item "airport pickup service" belong to a service reminding type. The information item "top 10 tourist attractions in Shanghai" and the information item "25 wonderful shooting moments" belong to a web page link type. The information item "Pirates of the Caribbean 5" belongs to a multimedia information type.

Figure 26A:
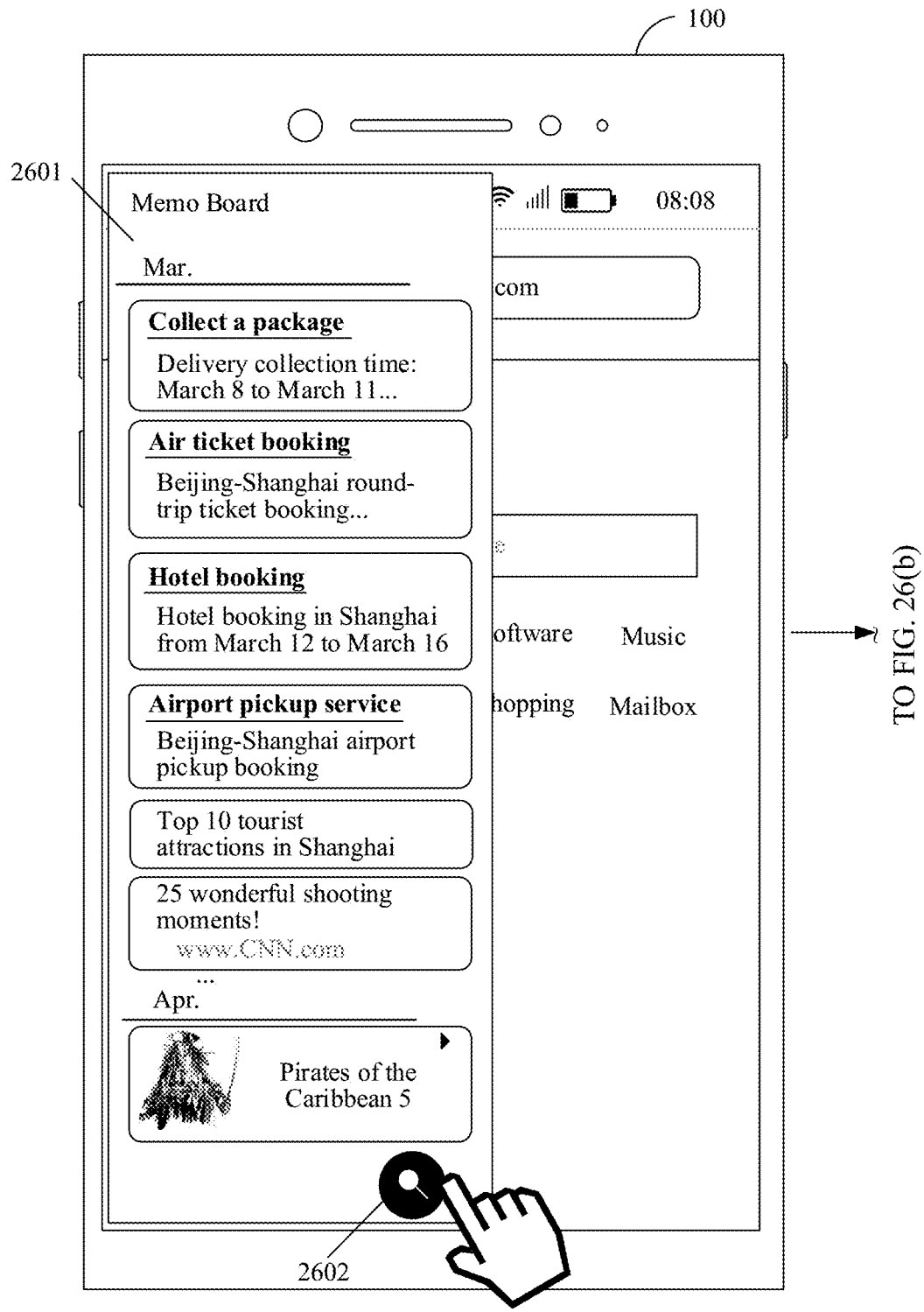
FIG. 26(a), FIG. 26(b), and FIG. 26(c) are a schematic diagram 15 of an instance of a terminal screen according to an embodiment of this application.
Figure 26B:
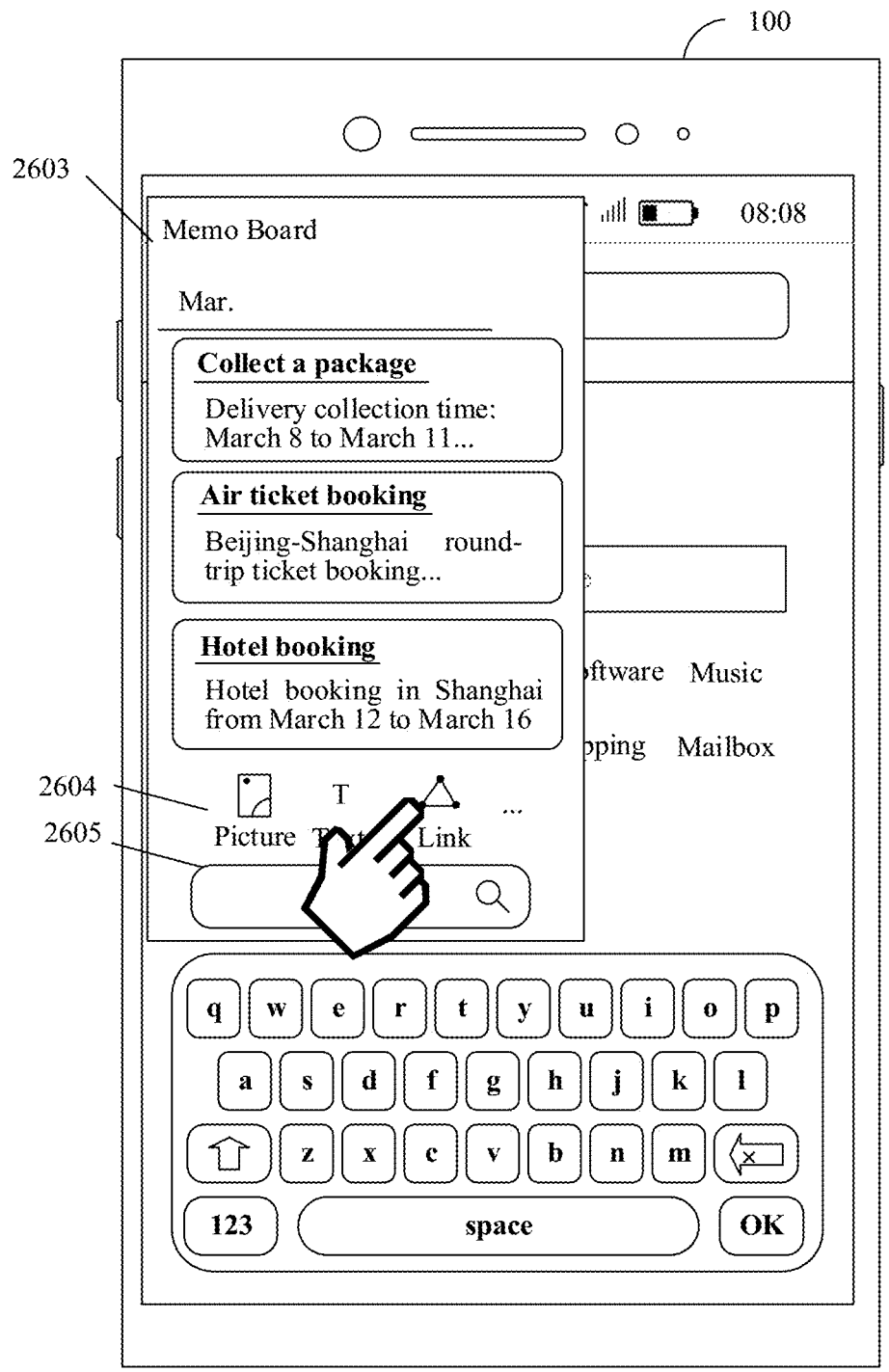
Figure 26C:
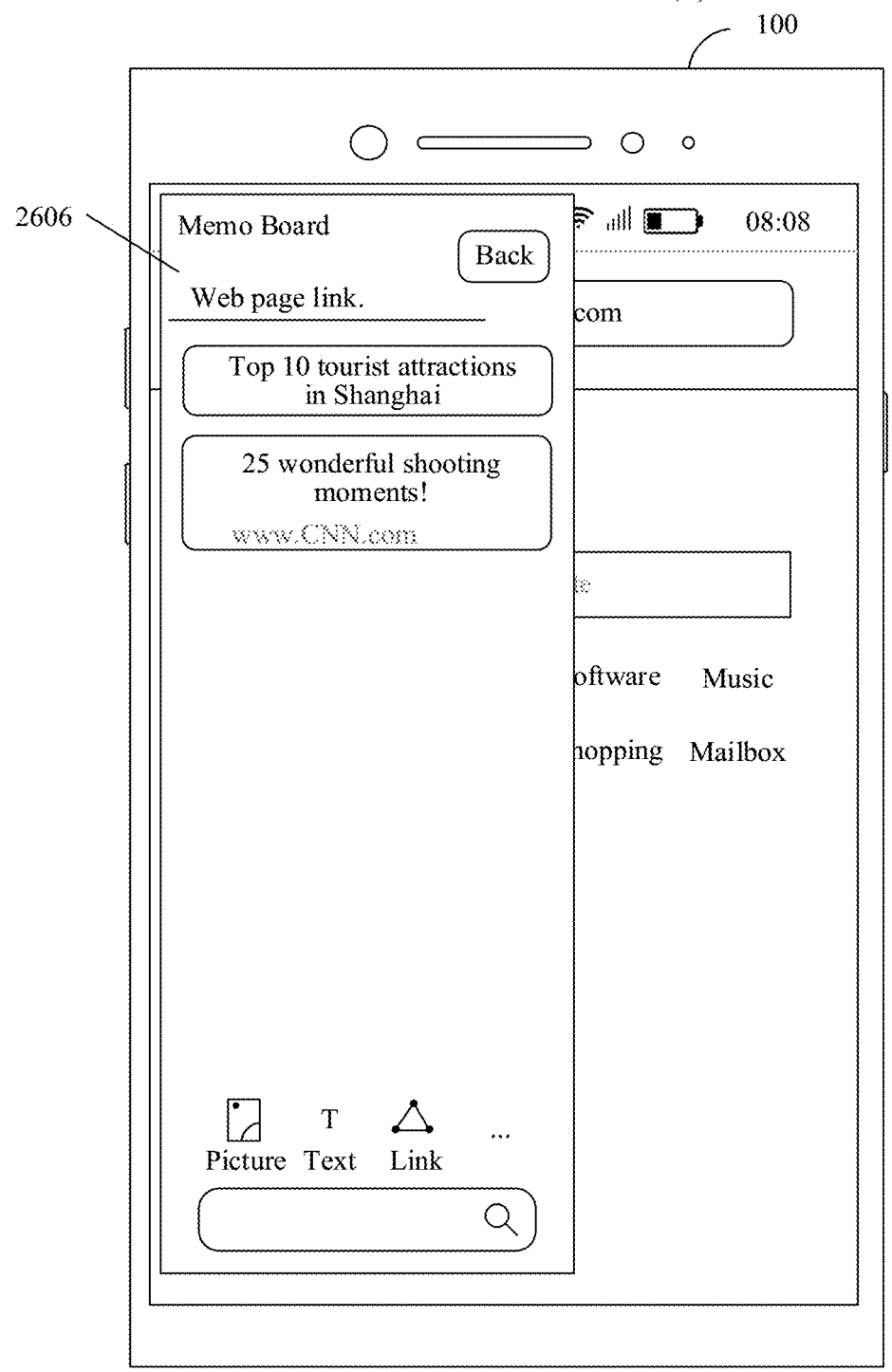

The memo board may further include a search key (or option) for searching for an information item, to implement a quick search of the user for the information item on the memo board. For example, as shown in FIG. 26(a), a memo board 2601 includes a search key 2602. The mobile phone 100 may display, in response to a tap operation performed by the user on the search key 2602, a memo board 2603 shown in FIG. 26(b). The memo board 2603 includes a search box 2605. The search box 2605 is used to receive a keyword entered by the user. After the user enters a keyword in the search box 2605 and taps a search key in the search box 2605, the mobile phone 100 may search the memo board for an information item that matches the keyword. Optionally, the memo board 2603 may further include a quick search item 2604. The quick search item 2604 includes a plurality of types of search keys, for example, a "Picture" search key, a "Text" search key, and a "Link" search key. The "Picture" search key is used to search the memo board for an information item in a picture type. The "Text" search key is used to search the memo board for an information item in a text type. The "Link" search key is used to search the memo board for an information item in a web page link type. For example, as shown in FIG. 26(b), when the user taps the "Link" search key, the mobile phone 100 may display a memo board 2606 shown in FIG. 26(c). The memo board 2606 displays information items in a web page link type on the memo board 2601, for example, an information item "top 10 tourist attractions in Shanghai" and an information item "25 wonderful shooting moments".

Figure 27A:
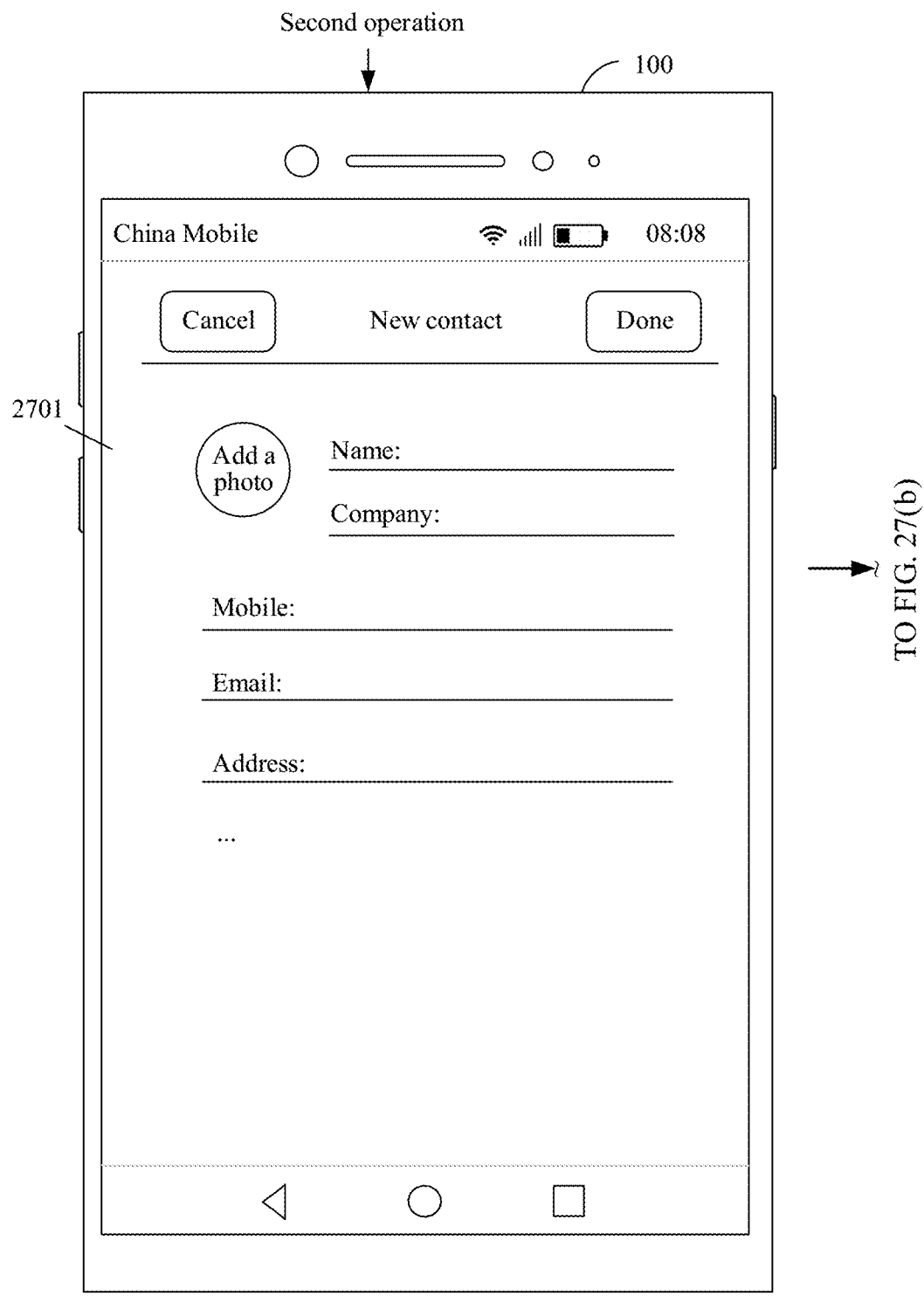
FIG. 27(a), FIG. 27(b), and FIG. 27(c) are a schematic diagram 16 of an instance of a terminal screen according to an embodiment of this application.
Figure 27B:
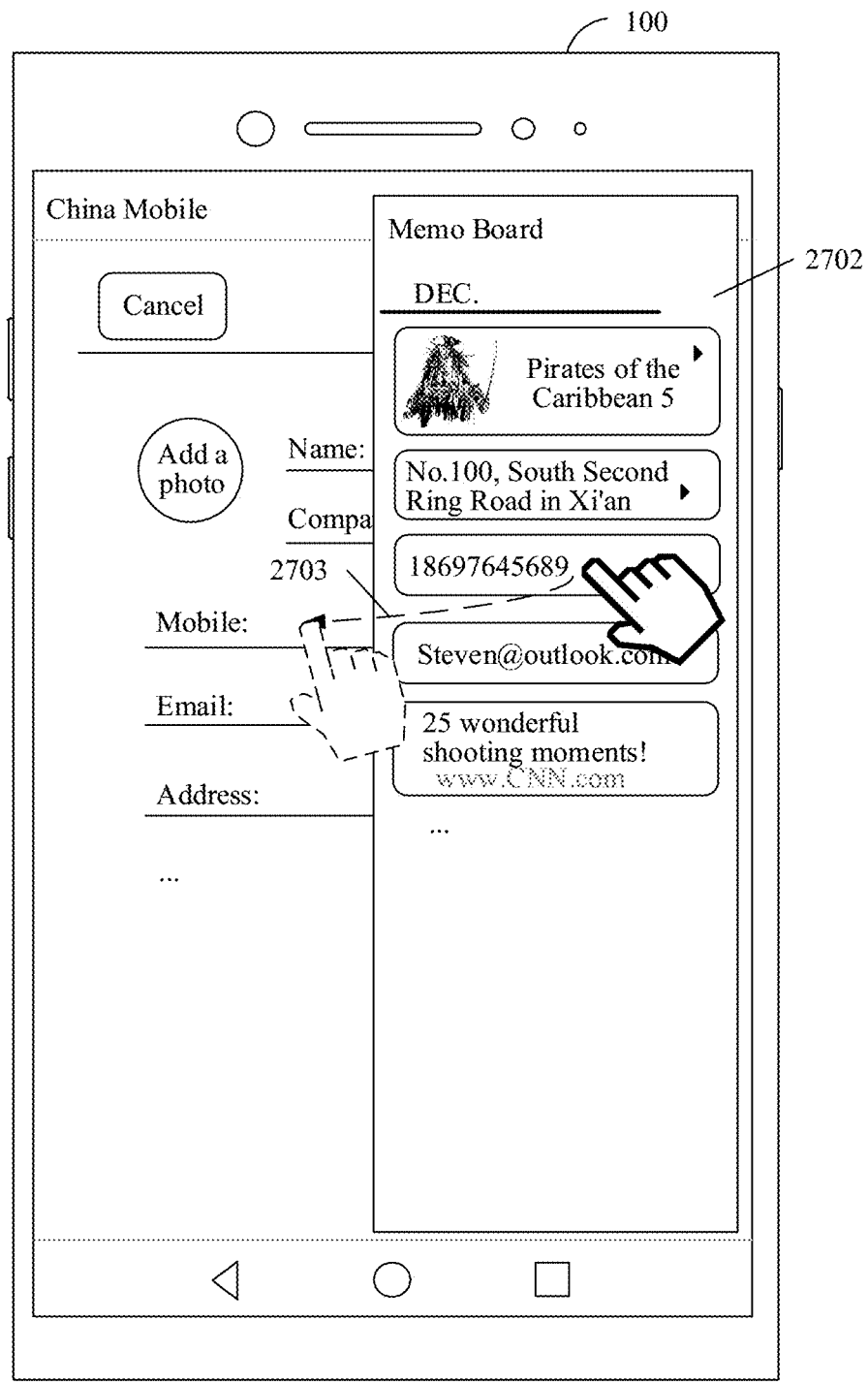
Figure 27C:
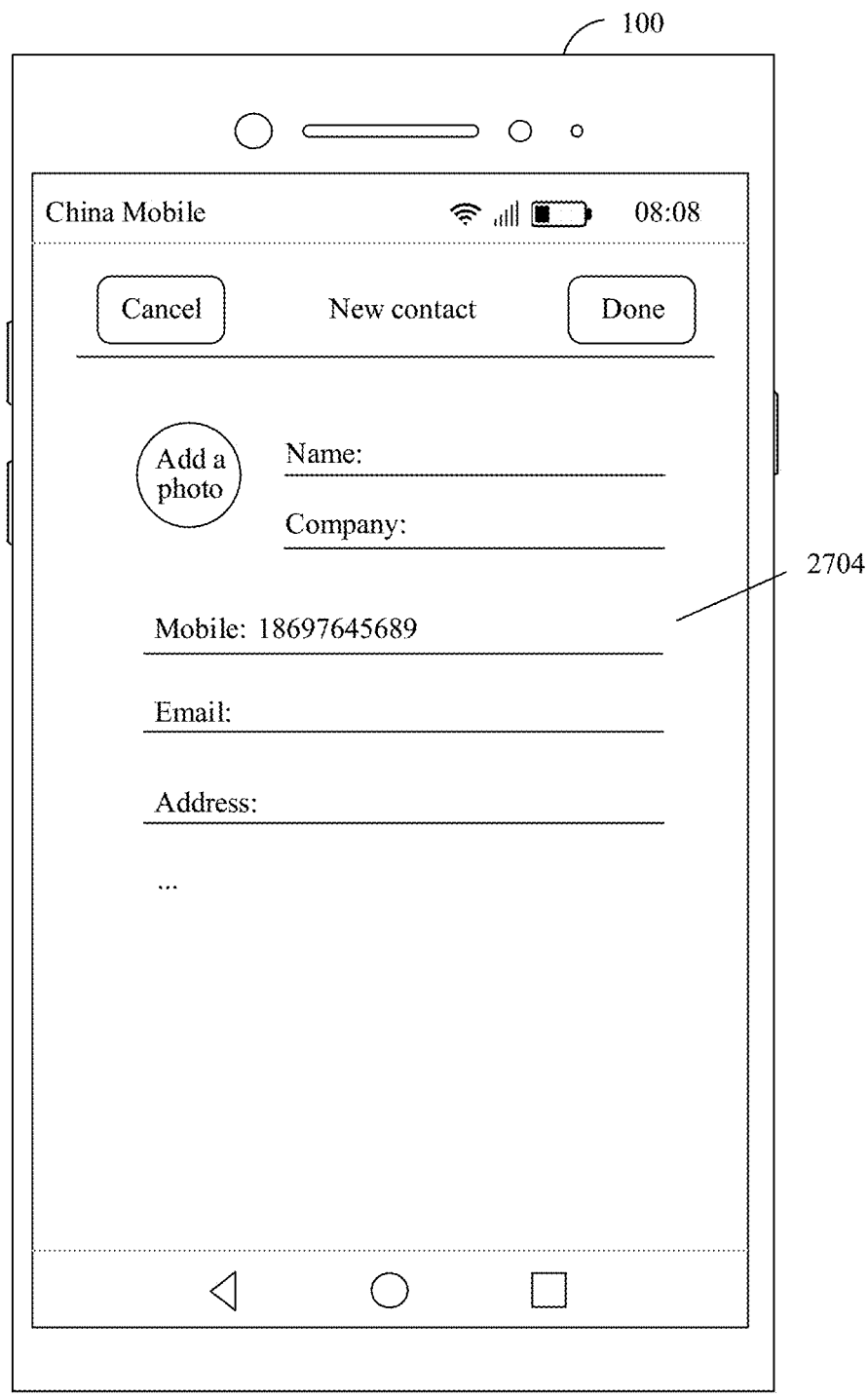

The terminal may further display a memo board on a current screen in response to a second operation. Subsequently, the terminal may place, in response to a drag operation performed by the user on an information item on the memo board, content of the information item selected by the user in an input box corresponding to an end point of a sliding track of the drag operation. For example, it is assumed that the mobile phone 100 currently displays a "new contact" screen 2701 shown in FIG. 27(a). The mobile phone 100 may display, in response to a second operation of the user, a memo board 2702 shown in FIG. 27(b). The mobile phone 100 may place, in response to a drag operation performed by the user on an information item "18698645689" on the memo board 2702, the information item "18698645689" selected by the user in an input box "Mobile" corresponding to an end point of a sliding track 2703 of the drag operation, and display a screen 2704 shown in FIG. 27(c).

Figure 28A:
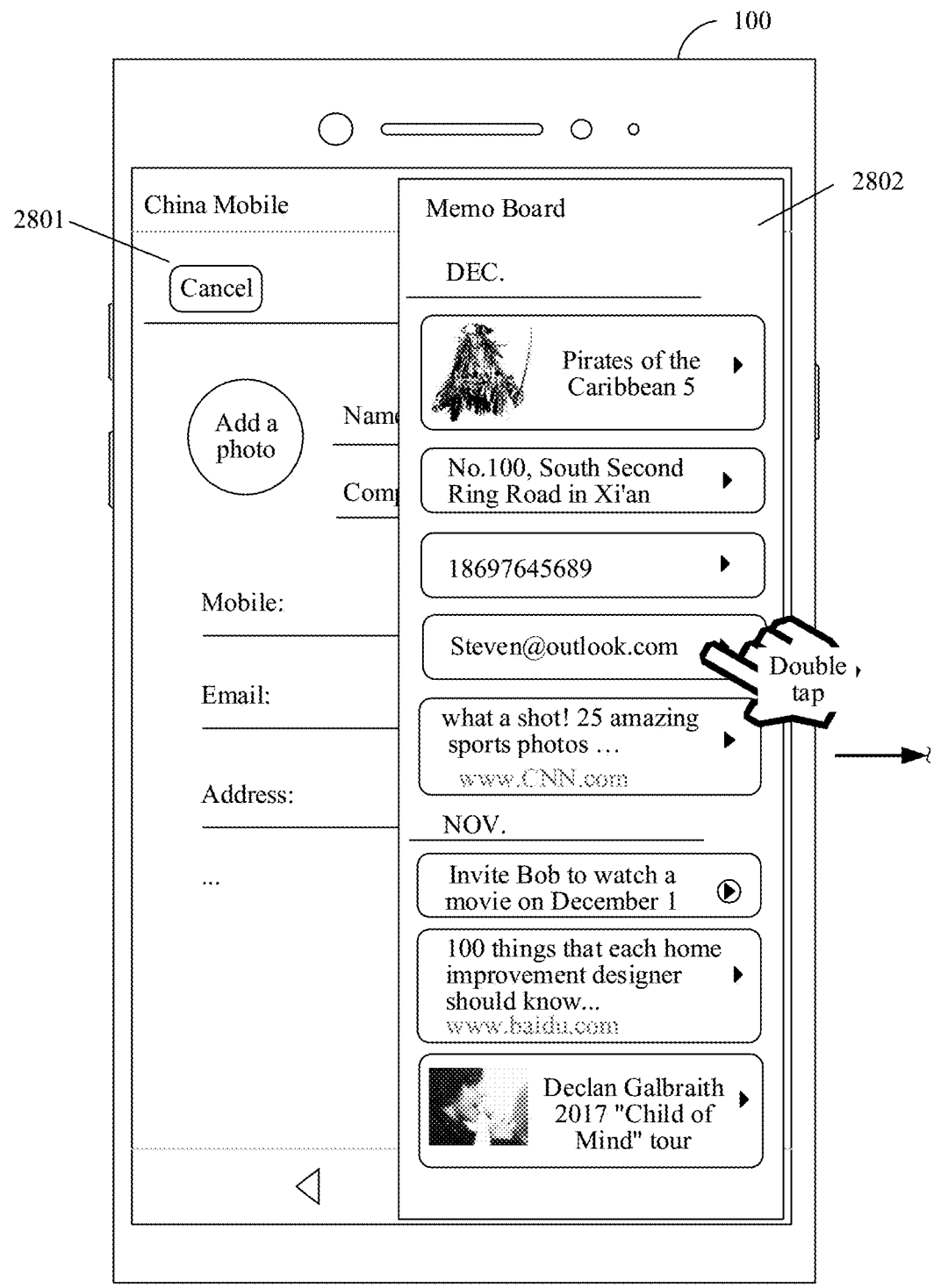
FIG. 28(a) and FIG. 28(b) are a schematic diagram 17 of an instance of a terminal screen according to an embodiment of this application.
Figure 28B:
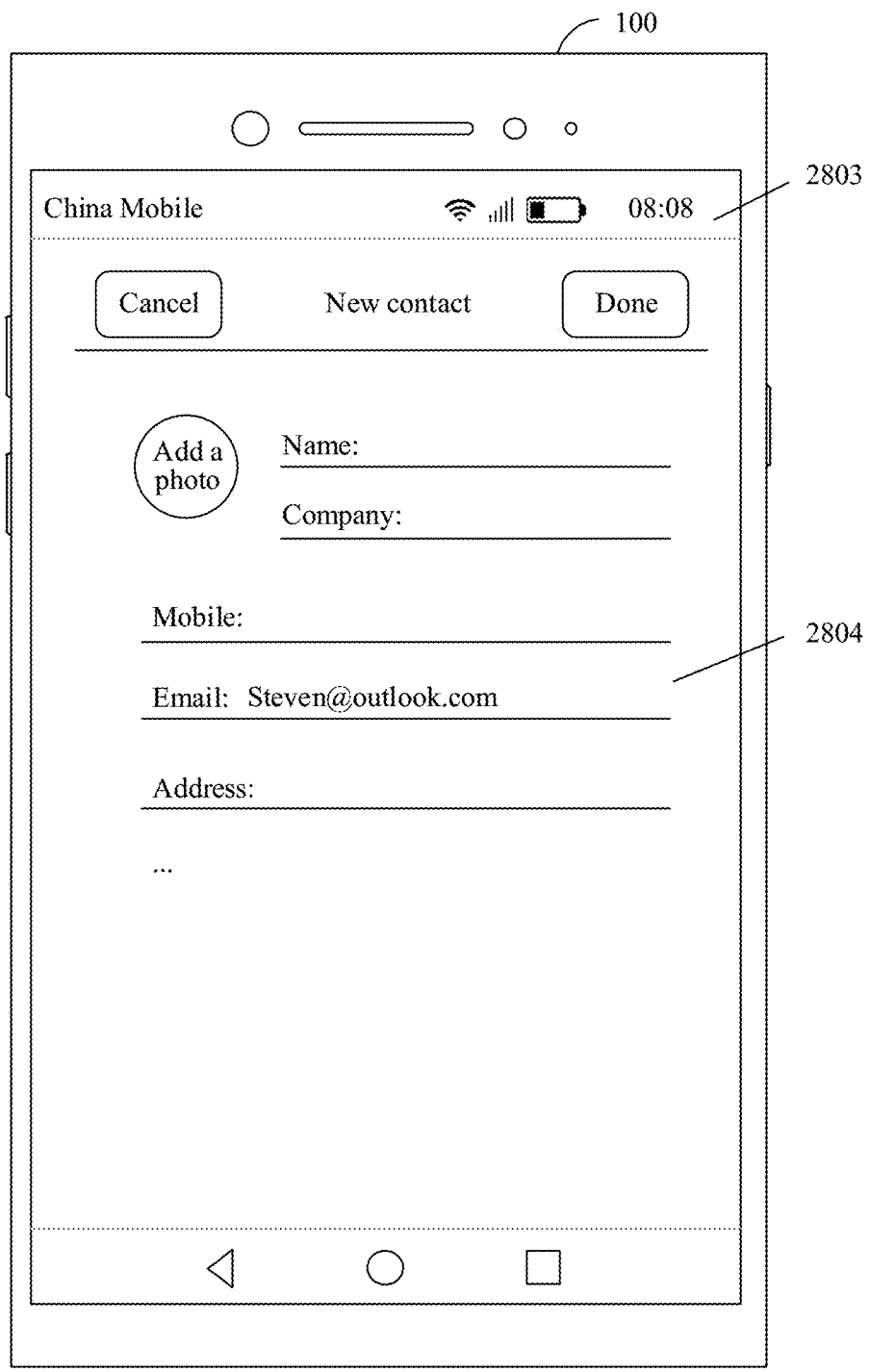

Alternatively, the terminal may automatically place, in response to a selection operation performed by the user on an information item on the memo board, content of the information item selected by the user in an input box that is on the current screen and that matches the content of the information item selected by the user. For example, it is assumed that the mobile phone 100 currently displays a "new contact" screen 2801 shown in FIG. 28(a), and the "new contact" screen 2801 displays a memo board 2802. The mobile phone 100 may place, in response to a selection operation (for example, a double-tap operation) performed by the user on an information item "Steven@outlook.com" on the memo board 2802, the information item "Steven@outlook.com" selected by the user in an input box "Email" 2804 that matches "Steven@outlook.com". The mobile phone 100 may display a "new contact" screen 2803 shown in FIG. 28(b).

In this embodiment of this application, information displayed on the memo board may be collected by the terminal in response to the second operation, or may be information (for example, voice information or text information) that is entered by the user and that is received by the terminal in response to a third operation. For example, the third operation may be a shortcut key or a gesture used to open an information record screen.

Figure 29A:
FIG. 29(a), FIG. 29(b), and FIG. 29(c) are a schematic diagram 18 of an instance of a terminal screen according to an embodiment of this application.
Figure 29B:
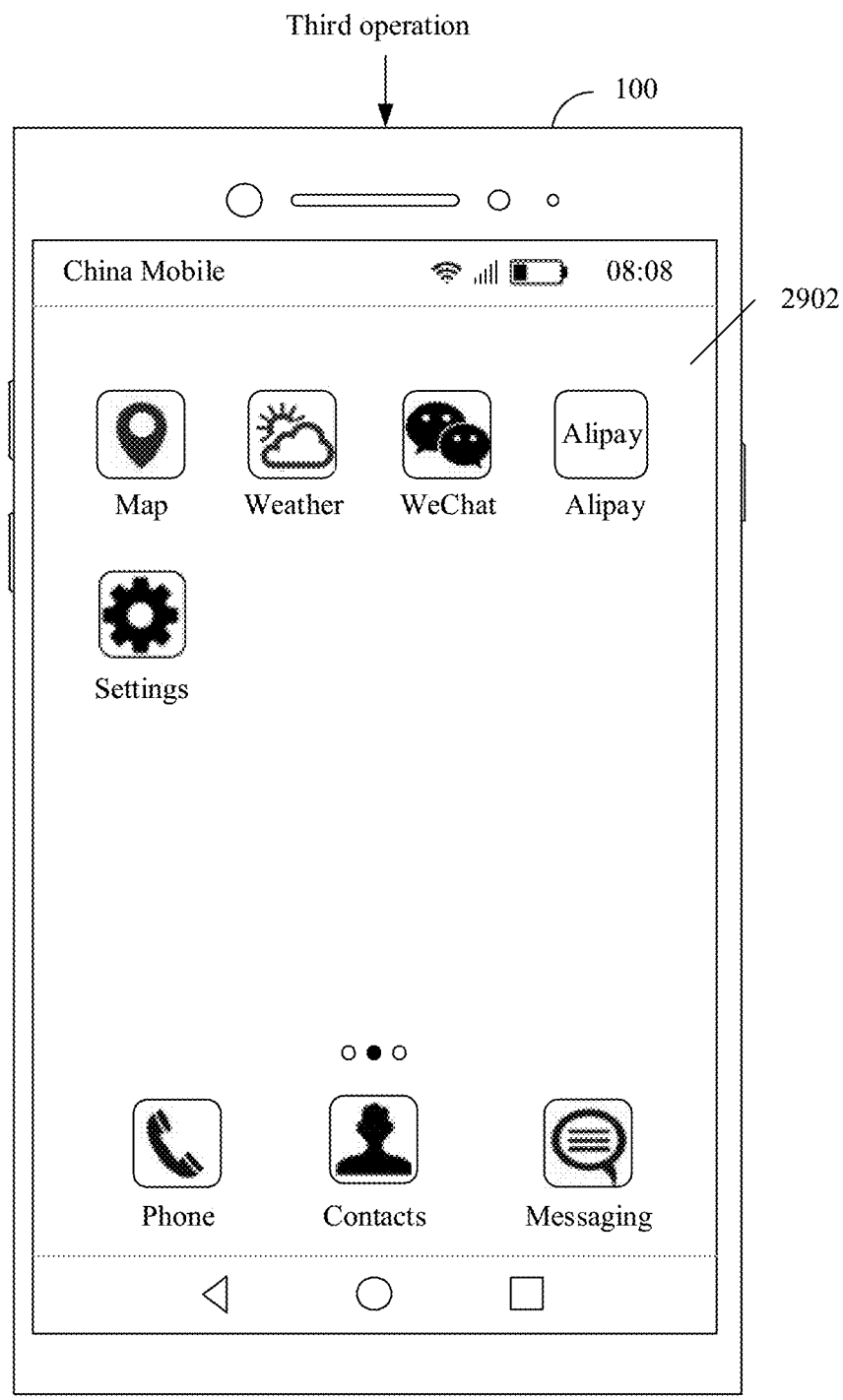
Figure 29C:
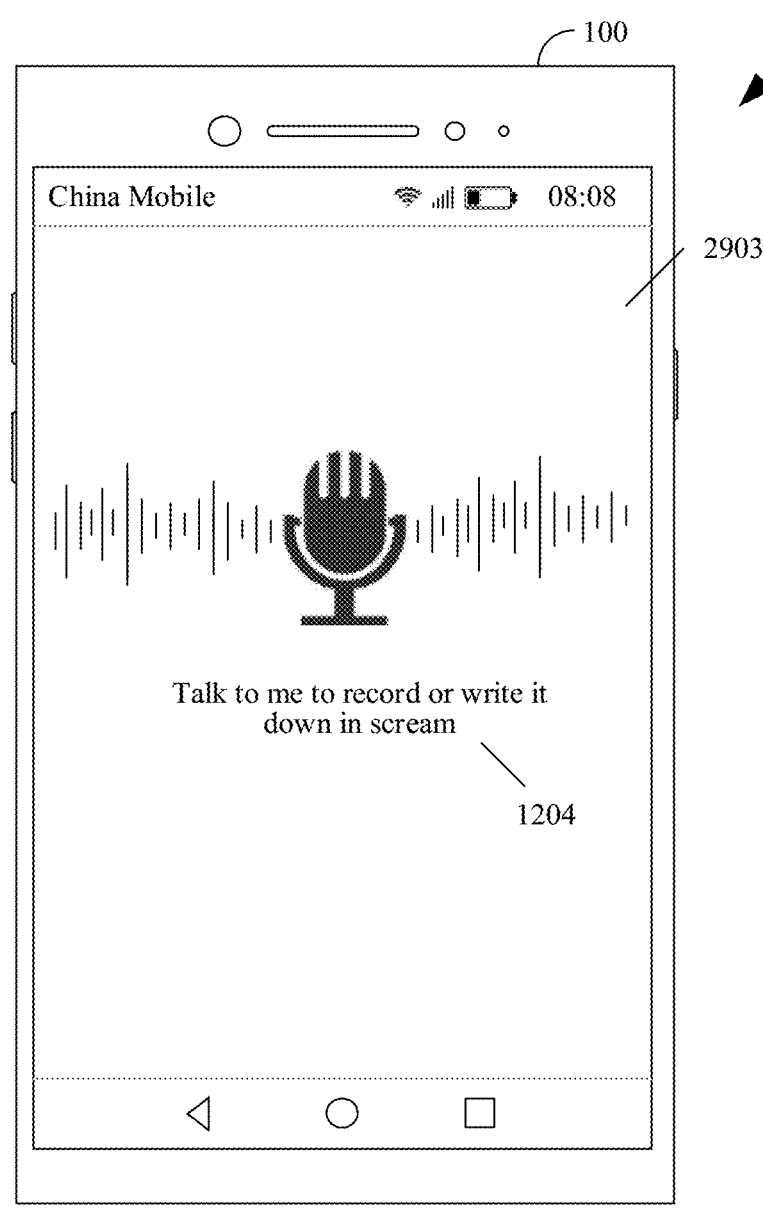

For example, regardless of a specific screen currently displayed by the terminal, the terminal may display the information record screen in response to the third operation of the user. For example, as shown in FIG. 29(a), the mobile phone 100 displays a lock screen 2901. As shown in FIG. 29(b), the mobile phone 100 displays a home screen 2902. The mobile phone 100 may display, in response to a third operation of the user, an information record screen 2903 shown in FIG. 29(c). The information record screen 2903 may include prompt information "Talk to me to record or write it down in scream", to instruct the user to record a voice or enter a text by using the information record screen 2903. When the mobile phone 100 displays the information record screen 2903, the mobile phone 100 may start to record a voice. Alternatively, when the mobile phone 100 displays the information record screen 2903, the mobile phone 100 may start to record a voice in response to a fourth operation (for example, a touch and hold operation performed on a microphone icon on the information record screen 2903) performed by the user on the information record screen 2903.

The terminal may display a text record screen in response to a fifth operation performed by the user on the information record screen. For example, the fifth operation may be a double-tap operation, a preset gesture, or the like. The fifth operation is different from the fourth operation.

Figure 30A:
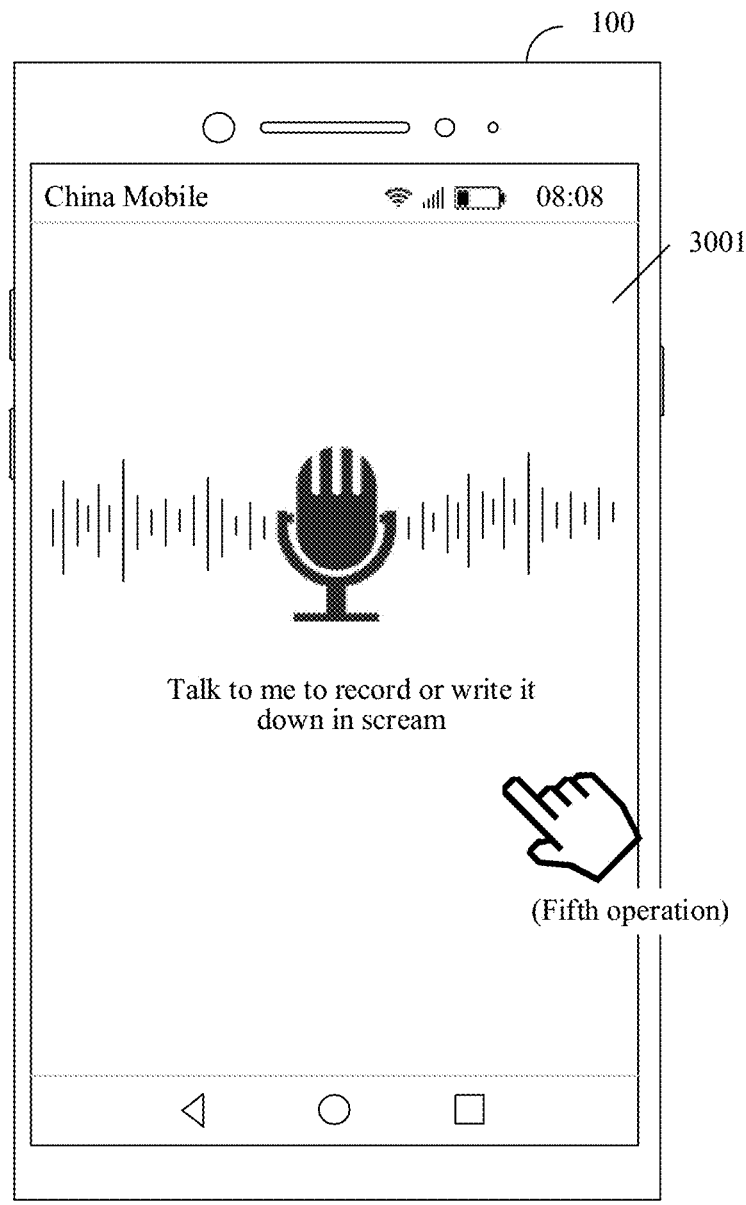
FIG. 30(a), FIG. 30(b), and FIG. 30(c) are a schematic diagram 19 of an instance of a terminal screen according to an embodiment of this application.
Figure 30B:
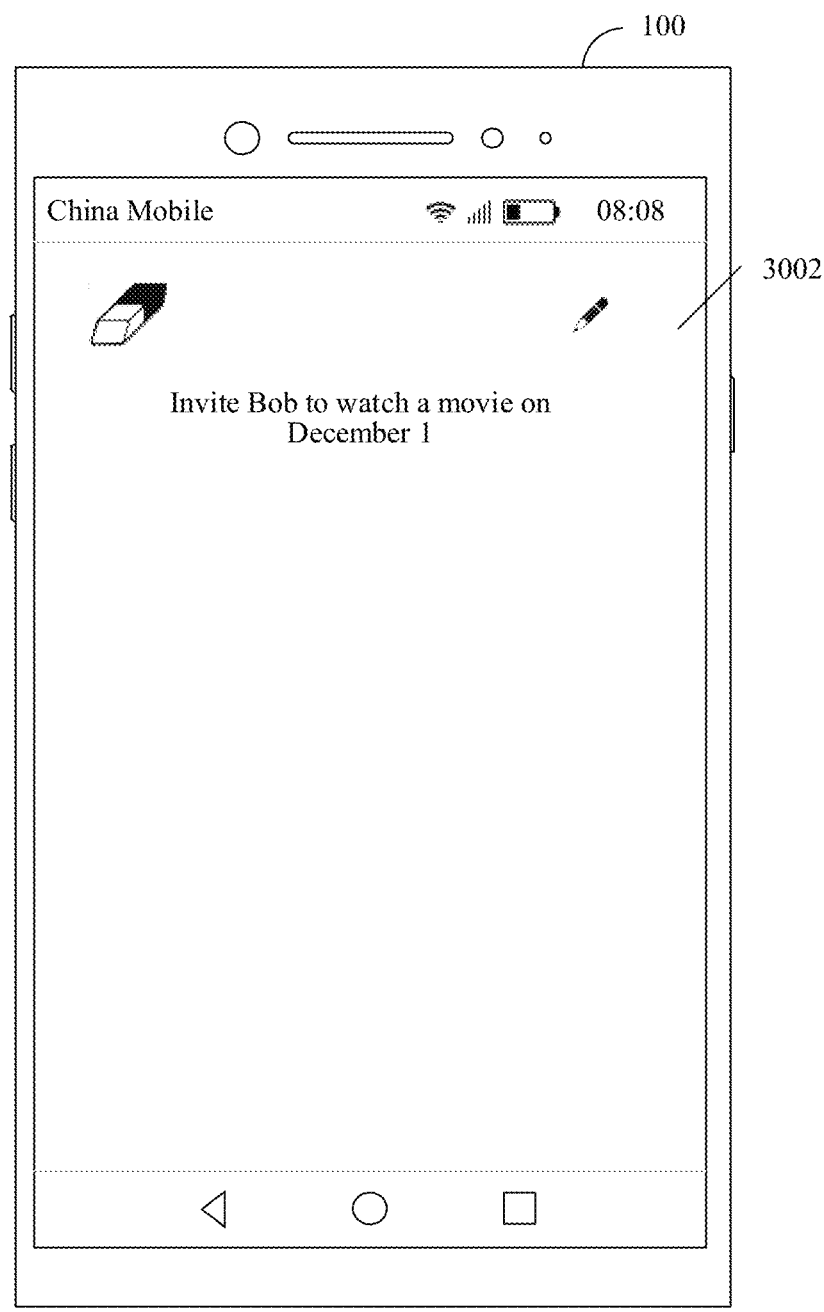
Figure 30C:
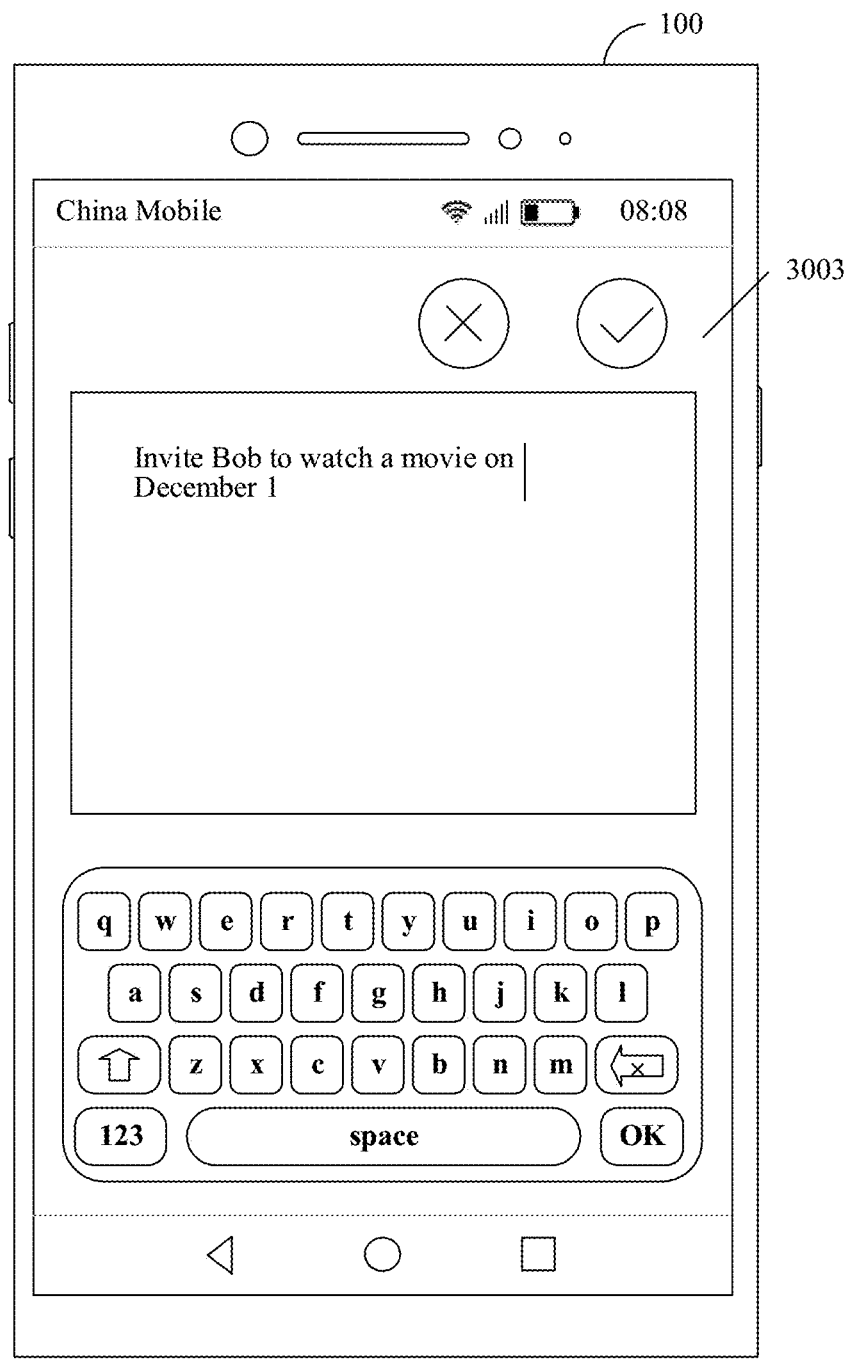

For example, as shown in FIG. 30(a), the mobile phone 100 may display, in response to a fifth operation performed by the user on an information record screen 3001 shown in FIG. 30(a), a text record screen 3002 shown in FIG. 30(b) or a text record screen 3003 shown in FIG. 30(c). The text record screen 3002 may support the user in entering a text through handwriting. For example, the mobile phone 100 may receive a text "Invite Bob to watch a movie on December 1" entered by the user on the text record screen shown in FIG. 30(b) or FIG. 30(c).

As shown in FIG. 23A and FIG. 23B, the terminal may further generate a user profile, to obtain user-related information (for example, identity card information) and a user preference (for example, the user likes to play football, or the user likes to play "Game X"). The terminal may identify content of the user profile, to determine that a task corresponding to the user preference is "view football information". An associated service of the task corresponding to the user preference may include "football information recommendation". Potential tasks of performing the task "view football information" corresponding to the user preference by the user may include football game recommendation, football star news, a football event, and the like.

It may be understood that to implement the foregoing functions, the terminal includes corresponding hardware structures and/or software modules for performing the functions. A person skilled in the art should be easily aware that units, algorithms, and steps in the examples described with reference to the embodiments disclosed in this specification may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in actual implementation.

Figure 31:
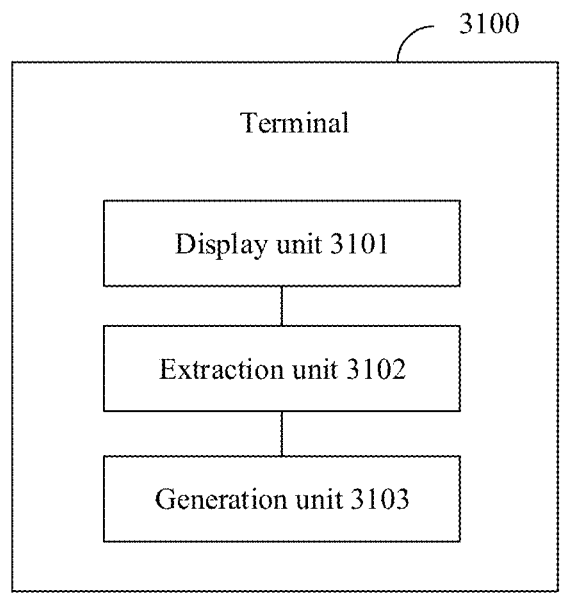
FIG. 31 is a schematic structural composition diagram 1 of a terminal according to an embodiment of this application.

When each function module is obtained through division based on each corresponding function, as shown in FIG. 31, an embodiment of this application provides a terminal 3100. The terminal 3100 includes a display unit 3101, an extraction unit 3102, and a generation unit 3103.

The display unit 3101 is configured to support the terminal 3100 in performing S201, S204, S1401, S1801, S1802, S2201, and S2202 in the foregoing method embodiments, and/or is configured to perform another process of the technology described in this specification. The extraction unit 3102 is configured to support the terminal 3100 in performing S202 and S205 in the foregoing method embodiments, and/or is configured to perform another process of the technology described in this specification. The generation unit 3103 is configured to support the terminal 3100 in performing S203 and S206c in the foregoing method embodiments, and/or is configured to perform another process of the technology described in this specification.

Figure 32:
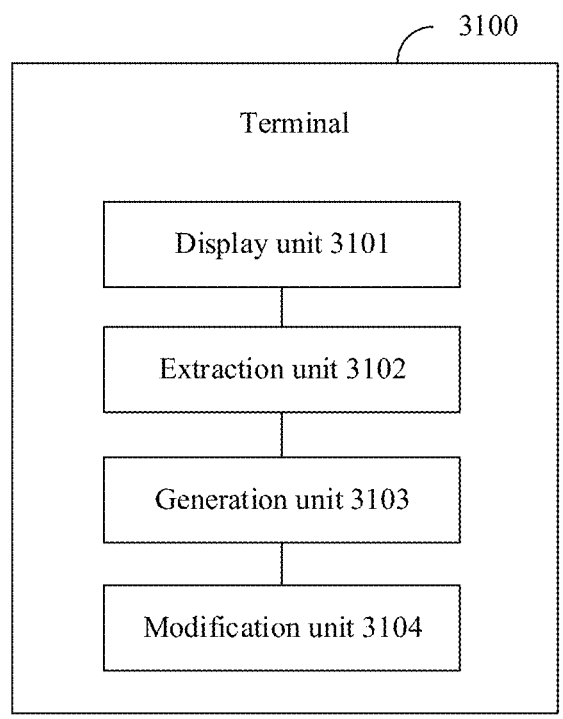
FIG. 32 is a schematic structural composition diagram 2 of a terminal according to an embodiment of this application.

As shown in FIG. 32, the terminal 3100 may further include a modification unit 3104. The modification unit 3104 is configured to support the terminal 3100 in performing S206a, S1402, S206b, S1901, S2001, and S2101 in the foregoing method embodiments, and/or is configured to perform another process of the technology described in this specification.

The terminal 3100 may further include a storage unit. The storage unit is configured to store content on a first screen. The content on the first screen includes at least one of a web page link, a screenshot of the first screen, and first structured information.

The terminal 3100 may further include a receiving unit and a sending unit. The receiving unit is configured to receive information sent by another device. The sending unit is configured to send information to the another device.

Figure 33:
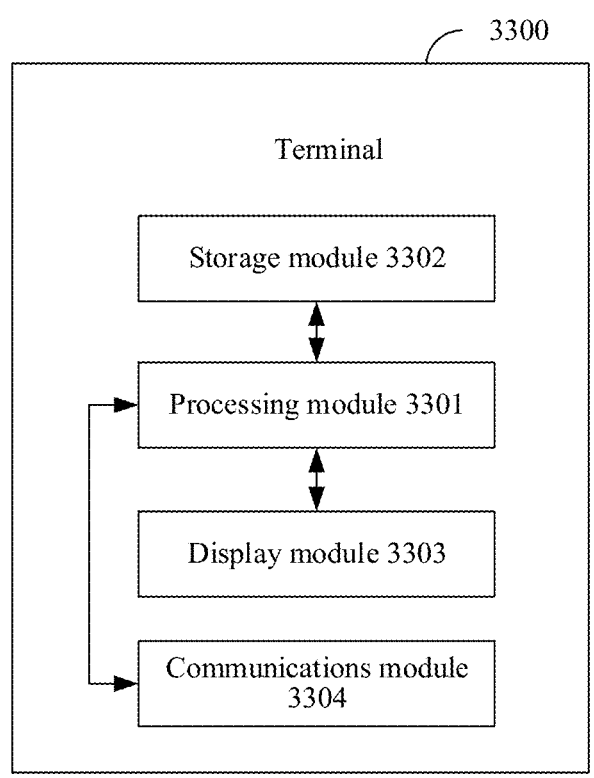
FIG. 33 is a schematic structural composition diagram 3 of a terminal according to an embodiment of this application.

When an integrated unit is used, the extraction unit 3102, the generation unit 3103, the modification unit 3104, and the like may be integrated into one processing module for implementation. FIG. 33 is a possible schematic structural diagram of the terminal in the foregoing embodiments. The terminal 3300 includes a processing module 3301, a storage module 3302, and a display module 3303.

The processing module 3301 is configured to control and manage the terminal 3300. The display module 3303 is configured to: display a screen and receive a touch operation of a user. The storage module 3302 is configured to store program code and data that are of the terminal 3300. The terminal 3300 may further include a communications module 3304, and the communications module 3304 is configured to communicate with another device. For example, the communications module is configured to: receive information from or send information to another device.

The processing module 3301 may be a processor or a controller, and for example, may include a central processing unit (Central Processing Unit, CPU) and a graphics processing unit (Graphics Processing Unit, GPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 3301 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 3304 may be a transceiver, a transceiver circuit, a communications interface, or the like. The storage module 3302 may be a memory.

When the processing module 3301 is a processor (for example, the processor 101 shown in FIG. 1), the communications module is a radio frequency circuit (for example, the radio frequency circuit 102 shown in FIG. 1), the storage module 3302 is a memory (for example, the memory 103 shown in FIG. 1), and the display module 3303 is a display (for example, the display 104 that includes the touchpad 104-1 and the display panel 104-5 shown in FIG. 1), the device provided in this application may be the mobile phone 100 shown in FIG. 1. The communications module 3304 may not only include a radio frequency circuit, but also include a Wi-Fi module and a Bluetooth module. The communications modules such as the radio frequency circuit, the Wi-Fi module, and the Bluetooth module may be collectively referred to as a communications interface. The processor, the communications interface, the touchscreen, and the memory may be coupled together by using a bus.

An embodiment of this application further provides a computer storage medium. The computer storage medium stores computer program code, and when the foregoing processor executes the computer program code, the terminal performs related method steps in any one of FIG. 2, FIG.

14A, FIG. 14C, FIG. 17, FIG. 18, FIG. 19, FIG. 20, and FIG. 21, to implement the methods in the foregoing embodiments.

An embodiment of this application further provides a computer program product. When the computer program product is run on a computer, the computer is enabled to perform related method steps in any one of FIG. 2, FIG. 14A, FIG. 14C, FIG. 17, FIG. 18, FIG. 19, FIG. 20, and FIG. 21, to implement the methods in the foregoing embodiments.

The terminal 3100, the terminal 3300, the computer storage medium, and the computer program product provided in this application each are configured to perform the corresponding method provided above. Therefore, for beneficial effects that can be achieved by the terminal 3100, the terminal 3300, the computer storage medium, and the computer program product, refer to the beneficial effects in the corresponding method provided above. Details are not described herein again.

In the descriptions in the foregoing implementations, a person skilled in the art may clearly understand that for the purpose of convenient and brief description, division into the foregoing function modules is merely used as an example for description. In actual application, the foregoing functions can be allocated to different function modules for implementation based on a requirement. To be specific, an inner structure of an apparatus is divided into different function modules to implement all or some of the functions described above. For a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a computer software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal, comprising:
   a processor;
   a display electronically coupled to the processor and configured to display a first interface and a second interface and receive input from a user; and
   a memory electronically coupled to the processor and configured to store computer-executable instructions, which, when executed by the processor, cause the processor to carry out:
   extracting first structured information from the first interface in response to a first operation performed by the user on the first interface, wherein the first structured information instructs the user to perform a first task at a first location at a first time;
   generating a first prompt message based on the first structured information, wherein the first prompt message reminds the user to perform the first task at the first location at the first time;
   extracting second structured information from the second interface in response to the first operation performed by the user on the second interface, wherein the second structured information instructs the user to perform a second task at a second location at a second time; and
   when the first time and the second time overlap at least partially and the first location is different from the second location, automatically updating the first time in the first prompt message to an updated first time that does not overlap with the second time.

2. The terminal according to claim 1, wherein the computer-executable instructions further cause the processor to carry out:
   prompting the user with first change information, wherein the first change information indicates that the first time in the first prompt message is to be updated and the updated first time and the second time do not overlap; and
   automatically updating the first time, in response to a confirmation operation performed by the user on the first change information, to the updated first time that does not overlap with the second time.

3. The terminal according to claim 1, wherein the memory is further configured to carry out:
   storing content of the first interface in response to the first operation performed on the first interface, wherein the content of the first interface comprises at least one of a group of a web page link, a screenshot of the first interface, and the first structured information.

4. The terminal according to claim 3, wherein the display is further configured to carry out:
- displaying a memo board on a current interface in response to a second operation of the user, wherein the memo board includes at least one first information item corresponding to the content stored in the memory; and
- displaying a third interface in response to a selection operation performed by the user on the at least one first information item, wherein the third interface comprises content corresponding to the first information item selected by the user.

5. The terminal according to claim 4, wherein the memo board displayed by the display further comprises at least one second information item, the at least one second information item including a recommendation to the user for at least one of a group of at least one associated service and at least one potential service, wherein the at least one associated service is associated with the first task, and the at least one potential service is associated with a potential task of the first task, and
- wherein the display is further configured to carry out:
  - displaying a fourth interface in response to a selection operation performed by the user on the at least one second information item, wherein the fourth interface includes a service recommendation interface corresponding to the second information item selected by the user.

6. The terminal according to claim 4, wherein the display includes a first control configured to carry out:
- after the processor automatically updates the first time in the first prompt message, sending an updated first prompt message, wherein the first control comprises one of a group of a memo board, a notification bar, HiBoard, a widget, and an instant message.

7. A terminal, comprising:
- a processor;
- a display electronically coupled to the processor and configured to display a first interface and a second interface and receive input from a user; and
- a memory electronically coupled to the processor, the memory storing computer-executable instructions, which, when executed by the processor, cause the processor to carry out:
  - extracting first structured information from the first interface in response to a first operation performed by the user on the first interface, wherein the first structured information instructs the user to perform a first task at a first location at a first time;
  - generating a first prompt message based on the first structured information, wherein the first prompt message reminds the user to perform the first task at the first location at the first time;
  - extracting second structured information from the second interface in response to the first operation performed on the second interface, wherein the second structured information instructs the user to perform a second task at a second location at a second time; and
  - when the first time and the second time overlap at least partially and the first location is different from the second location, automatically adding first instruction information to the first prompt message, wherein the first instruction information instructs the user to perform the first task at a third time, and the third time and the second time do not overlap.

8. The terminal according to claim 7, wherein the display includes a first control configured to carry out:
- after the processor automatically adds the first instruction information to the first prompt message, sending the first prompt message comprising the first instruction information, wherein the first control comprises one of a group of a memo board, a notification bar, HiBoard, a widget, and an instant message.

9. A terminal, comprising:
- a processor;
- a display electronically coupled to the processor and configured to display a first interface and a second interface and receive input from a user; and
- a memory electronically coupled to the processor and configured to store computer-executable instructions, which, when executed by the processor, cause the processor to carry out:
  - extracting first structured information from the first interface in response to a first operation performed by the user on the first interface, wherein the first structured information instructs the user to perform a first task at a first location at a first time;
  - generating a first prompt message based on the first structured information, wherein the first prompt message reminds, at a second time, the user to perform the first task at the first location at the first time;
  - extracting second structured information from the second interface in response to the first operation performed on the second interface, wherein the second structured information instructs the user to perform a second task at a second location at a third time; and
  - generating a second prompt message when the first time and the third time overlap at least partially and the first location is different from the second location, wherein the second prompt message reminds, at a fourth time, the user to perform the first task at the first location at the first time.

10. The terminal according to claim 9, wherein the display is further configured to carry out:
- after the processor generates the first prompt message based on the first structured information, sending the first prompt message at the second time to remind the user to perform the first task at the first location at the first time; and
- after the processor generates the second prompt message, sending the second prompt message at the fourth time to remind the user to perform the first task at the first location at the first time.

\* \* \* \* \*